US011789706B2

(12) United States Patent
Ramanathan

(10) Patent No.: US 11,789,706 B2
(45) Date of Patent: *Oct. 17, 2023

(54) DEVELOPMENT SYSTEM WITH IMPROVED METHODOLOGY FOR CREATION AND REUSE OF SOFTWARE ASSETS

(71) Applicant: Embarcadero Technologies, Inc., Austin, TX (US)

(72) Inventor: Ravikumar Ramanathan, Aptos, CA (US)

(73) Assignee: Embarcadero Technologies, Inc., Austin, TX (US)

(*) Notice: Subject to any disclaimer, the term of this patent is extended or adjusted under 35 U.S.C. 154(b) by 109 days.

This patent is subject to a terminal disclaimer.

(21) Appl. No.: 16/984,582

(22) Filed: Aug. 4, 2020

(65) Prior Publication Data

US 2021/0109721 A1 Apr. 15, 2021

Related U.S. Application Data

(63) Continuation of application No. 15/427,938, filed on Feb. 8, 2017, now Pat. No. 10,768,909, which is a (Continued)

(51) Int. Cl.
*G06F 8/36* (2018.01)
*G06F 8/75* (2018.01)
(Continued)

(52) U.S. Cl.
CPC ............ *G06F 8/36* (2013.01); *G06F 8/71* (2013.01); *G06F 8/75* (2013.01); *G06F 8/77* (2013.01); *G06F 8/70* (2013.01)

(58) Field of Classification Search
CPC ...... G06F 8/36; G06F 8/71; G06F 8/75; G06F 8/77; G06F 8/70
See application file for complete search history.

(56) References Cited

U.S. PATENT DOCUMENTS 5,546,507 A * 8/1996 Staub ................. G06N 5/025
706/11
6,763,515 B1 * 7/2004 Vazquez ................. G06F 8/36
717/109

(Continued)

OTHER PUBLICATIONS

CodeGear by Borland. JBuilder 2007. Copyright 2007.
(Continued)

*Primary Examiner* — Matthew J Brophy

(57) ABSTRACT

In a computer-implemented method for facilitating creation of a reusable application, during development of the reusable application, a plurality of artifacts associated with source code of the reusable application is received, wherein an artifact of the plurality of artifacts includes information related to the development of the reusable application. The plurality of artifacts is maintained as metadata for the source code of the reusable application. An application module including the source code of the reusable application and the metadata is generated, wherein the application module is configured for use by a developer for facilitating creation of a new version of the reusable application, and wherein the metadata is accessible by the developer during the creation of the new version of the reusable application for accessing the information related to the development of the reusable application.

19 Claims, 46 Drawing Sheets

Related U.S. Application Data continuation of application No. 14/941,370, filed on Nov. 13, 2015, now Pat. No. 9,600,246, which is a continuation of application No. 12/388,433, filed on Feb. 18, 2009, now Pat. No. 9,218,166.

(60) Provisional application No. 61/030,209, filed on Feb. 20, 2008.

(51) Int. Cl.
*G06F 8/71* (2018.01)
*G06F 8/77* (2018.01)
*G06F 8/70* (2018.01)

(56) References Cited

U.S. PATENT DOCUMENTS

| | | | |
|---|---|---|---|
| 6,854,107 B2 | 2/2005 | Green et al. | |
| 6,931,625 B1* | 8/2005 | Coad | G06F 8/20 717/109 |
| 6,993,710 B1* | 1/2006 | Coad | G06F 8/77 715/767 |
| 7,203,938 B2* | 4/2007 | Ambrose | G06F 8/20 717/169 |
| 7,222,333 B1* | 5/2007 | Mor | G06F 8/41 709/201 |
| 7,316,000 B2 | 1/2008 | Poole et al. | |
| 7,318,215 B1* | 1/2008 | Krishnan | G06F 8/20 707/999.102 |
| 7,321,894 B2* | 1/2008 | Degtyar | G06F 8/20 707/999.102 |
| 7,392,162 B1* | 6/2008 | Srinivasan | G06F 8/10 703/22 |
| 7,437,712 B1* | 10/2008 | Brown | G06F 8/71 717/121 |
| 7,743,382 B2* | 6/2010 | Schumacher | G06F 8/10 710/200 |
| 7,761,848 B1* | 7/2010 | Chaffin | G06F 8/30 726/8 |
| 7,870,184 B2* | 1/2011 | Bauer | G06Q 10/10 709/201 |
| 7,873,958 B2* | 1/2011 | Wiltamuth | G06F 9/449 717/122 |
| 7,958,494 B2 | 6/2011 | Chaar et al. | |
| 8,091,071 B2* | 1/2012 | Tsantilis | G06F 8/36 715/240 |
| 8,095,911 B2* | 1/2012 | Ronen | G06F 8/36 717/121 |
| 8,141,040 B2 | 3/2012 | Chaar et al. | |
| 8,156,467 B2* | 4/2012 | Webster | G06F 8/36 717/113 |
| 8,175,936 B2* | 5/2012 | Ronen | G06Q 30/0641 705/26.7 |
| 8,359,566 B2 | 1/2013 | Chaar et al. | |
| 8,527,939 B2* | 9/2013 | Elad | G06F 9/453 715/708 |
| 8,566,777 B2 | 10/2013 | Chaar et al. | |
| 8,689,178 B2* | 4/2014 | Ambrose | G06F 8/34 717/121 |
| 9,009,656 B2* | 4/2015 | Drake | G06F 8/36 717/107 |
| 9,600,246 B2 | 3/2017 | Ramanathan | |
| 2002/0038449 A1* | 3/2002 | Green | G06F 8/20 717/100 |
| 2002/0095650 A1* | 7/2002 | Green | G06F 8/20 717/107 |
| 2002/0104067 A1* | 8/2002 | Green | G06F 8/24 717/107 |
| 2002/0174082 A1* | 11/2002 | Miloushev | G06F 8/36 706/47 |
| 2002/0198770 A1* | 12/2002 | Jameson | G06Q 10/10 |
| 2003/0135850 A1* | 7/2003 | Miloushev | G06F 8/70 717/165 |
| 2004/0117759 A1* | 6/2004 | Rippert, Jr. | G06F 8/20 717/113 |
| 2004/0133858 A1* | 7/2004 | Barnett | G06F 16/93 715/255 |
| 2004/0205691 A1* | 10/2004 | Poole | G06F 8/20 717/100 |
| 2005/0138057 A1* | 6/2005 | Bender | G06F 9/451 707/999.102 |
| 2005/0198618 A1* | 9/2005 | Lalonde | G06F 8/34 717/110 |
| 2005/0198651 A1* | 9/2005 | Weil | G06F 8/34 719/330 |
| 2006/0026568 A1* | 2/2006 | Wiltamuth | G06F 8/71 717/122 |
| 2006/0271537 A1* | 11/2006 | Chandrasekharan | G06F 8/36 |
| 2006/0277525 A1* | 12/2006 | Najmabadi | G06N 5/04 717/106 |
| 2007/0055965 A1* | 3/2007 | Colyer | G06F 8/316 717/163 |
| 2007/0234290 A1* | 10/2007 | Ronen | G06F 8/36 717/120 |
| 2007/0234291 A1* | 10/2007 | Ronen | G06F 8/36 717/120 |
| 2007/0250405 A1* | 10/2007 | Ronen | G06Q 30/0641 705/26.1 |
| 2007/0250481 A1* | 10/2007 | Fiedler | G06F 8/36 |
| 2007/0271562 A1* | 11/2007 | Schumacher | G06F 8/34 718/100 |
| 2008/0082959 A1* | 4/2008 | Fowler | G06F 9/44505 717/104 |
| 2008/0154965 A1* | 6/2008 | Pedersen | G06F 8/36 |
| 2008/0229278 A1* | 9/2008 | Liu | G06F 8/36 717/106 |
| 2008/0255696 A1* | 10/2008 | Chaar | G06F 8/10 700/108 |
| 2008/0256505 A1* | 10/2008 | Chaar | G06F 8/10 717/100 |
| 2008/0256506 A1* | 10/2008 | Chaar | G06F 8/36 717/101 |
| 2008/0256516 A1* | 10/2008 | Chaar | G06F 8/36 717/121 |
| 2008/0256529 A1* | 10/2008 | Chaar | G06F 8/20 717/174 |
| 2009/0064196 A1* | 3/2009 | Richardson | G06F 8/24 719/327 |
| 2009/0100406 A1* | 4/2009 | Greenfield | G06F 8/10 717/104 |
| 2009/0210855 A1 | 8/2009 | Ramanathan et al. | |
| 2017/0147298 A1 | 5/2017 | Ramanathan | |

OTHER PUBLICATIONS

Gaedke, et al., "A Repository to Facilitate Reuse In Component-Based Web Engineering", International Workshop on Web Engineering at the 8th International World-Wide Web Conference (WWW8), Toronto, Ontario, Canada, May 11, 1999, 7.

Lobo, et al., "A Systematic Approach for The Evolution of Reusable Software Components", In ECOOP' 2005 Workshop on Architecture-Centric Evolution, Glasgow, Jul. 2005, 17.

* cited by examiner

DEVELOPMENT SYSTEM WITH IMPROVED METHODOLOGY FOR CREATION AND REUSE OF SOFTWARE ASSETS

CROSS REFERENCE TO RELATED APPLICATIONS

This application claims priority to and is a continuation of the patent application, Ser. No. 15/427,938, entitled "DEVELOPMENT SYSTEM WITH IMPROVED METHODOLOGY FOR CREATION AND REUSE OF SOFTWARE ASSETS," with filing date Feb. 8, 2017, by Ravikumar Ramanathan, and assigned to the assignee of the present invention, the disclosure of which is hereby incorporated herein by reference in its entirety.

The application with Ser. No. 15/427,938 claims priority to and is a continuation of the then patent application, Ser. No. 14/941,370, now issued as U.S. Pat. No. 9,600,246, entitled "DEVELOPMENT SYSTEM WITH IMPROVED METHODOLOGY FOR CREATION AND REUSE OF SOFTWARE ASSETS," with filing date Nov. 13, 2015, by Ravikumar Ramanathan, and assigned to the assignee of the present invention, the disclosure of which is hereby incorporated herein by reference in its entirety.

The application with Ser. No. 14/941,370 claims priority to and is a continuation of the then patent application, Ser. No. 12/388,433, now issued as U.S. Pat. No. 9,218,166, entitled "DEVELOPMENT SYSTEM WITH IMPROVED METHODOLOGY FOR CREATION AND REUSE OF SOFTWARE ASSETS," with filing date Feb. 18, 2009, by Ravikumar Ramanathan, and assigned to the assignee of the present invention, the disclosure of which is hereby incorporated herein by reference in its entirety.

The application with Ser. No. 12/388,433 claims priority to the then U.S. Provisional Patent Application with Ser. No. 61/030,209, entitled "DEVELOPMENT SYSTEM WITH IMPROVED METHODOLOGY FOR CREATION AND REUSE OF SOFTWARE ASSETS," filed Feb. 20, 2008, by Ravikumar Ramanathan, and assigned to the assignee of the present application. The application with Ser. No. 12/388,433 incorporated the Provisional Patent Application 61/030,209 in its entirety by reference.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 80427 Bytes, created: Feb. 18, 2009 3:23:58 PM; Object ID: File No. 1; Object Contents: Source code.

BACKGROUND OF INVENTION

1. Field of the Invention

The present invention relates generally to the creation of computer programs and, more particularly, to a development system with methodologies for capturing and facilitating reuse of software development knowledge and intent.

2. Description of the Background Art

Before a digital computer may accomplish a desired task, it must receive an appropriate set of instructions. Executed by the computer's microprocessor, these instructions collectively referred to as a "computer program", direct the operation of the computer. Expectedly, the computer must understand the instructions which it receives before it may undertake the specified activity.

Owing to their digital nature, computers essentially only understand "machine code", i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks.

While it is possible for humans to compose meaningful programs in machine code, practically all software development today employs one or more of the available programming languages. The most widely used programming languages are the "high-level" languages, such as C, C++, Pascal, Java, or more recently Perl, PHP, and C#. These languages allow data structures and algorithms to be expressed in a style of writing that is easily read and understood by fellow programmers.

A program called a "compiler" translates these instructions into the requisite machine language. In the context of this translation, the program written in the high-level language is called the "source code" or source program. The ultimate output of the compiler is a compiled module such as a compiled C "object module", which includes instructions for execution ultimately by a target processor, or a compiled Java class, which includes bytecodes for execution ultimately by a Java virtual machine. A Java compiler generates platform-neutral "bytecodes", an architecturally neutral, intermediate format designed for deploying application code efficiently to multiple platforms.

Integrated development environments, such as Borland's JBuilder® and C# Builder, are the preferred application development environments for quickly creating production applications. Such environments are characterized by an integrated development environment (IDE) providing a form painter, a property getter/setter manager ("inspector"), a project manager, a tool palette (with objects which the user can drag and drop on forms), an editor, a debugger, and a compiler. In general operation, the user "paints" objects on one or more forms, using the form painter. Attributes and properties of the objects on the forms can be modified using the property manager or inspector. In conjunction with this operation, the user attaches or associates program code with particular objects on the screen (e.g., button object). Typically, code is generated by the IDE in response to user actions in the form painter and the user then manipulates the generated code using the editor. Changes made by the user to code in the editor are reflected in the form painter, and vice versa. After the program code has been developed, the compiler is used to generate binary code (e.g., Java bytecode) for execution on a machine (e.g., a Java virtual machine).

During the process of software development, the developer uses the IDE to write a large amount of code. As a result, most projects of even modest complexity will result in the creation of large sections of new source code. As software development today has remained a time and resource intensive task, there is great interest in improving the efficiency of developers. Most of the efforts to date have focused on improving reusability—that is, the reuse of source code. For example, "application generators" have long been used to generate scaffolding or boilerplate sections of code (i.e., recurring, common code/functionality), which may be dumped into a project in the IDE. Notwithstanding the efficiency gain realized by using application generators, software development still remains a resource-consuming task. Thus, there is much interest in further improving the software development process.

Today, the development of any particular program is heavily dependent on the knowledge of the individual or individuals doing the actual development. A persistent problem faced by all developers is how to transfer knowledge between team members, such as transferring an architect's intent in code for subsequent developers to build on. Stating the problem more generally, prior art development systems fail to capture developer intent and thus lose the opportunity to allow the developer's knowledge to be reused. If one member of the team developed special knowledge, that knowledge remains in the developer's head and is not shared through the IDE with other team members. This leads to a situation where developers are constantly reinventing "the same wheel." Once the developer leaves the team, for example, it is not uncommon for that developer's code to essentially become a "black box," that is, code whose functionality is poorly understood by other team members. In that scenario, the reusability of the code may be limited. In the real world, this problem frequently arises when team members specialize in one area (e.g., implementing the Web interface of an application) need to know where to fix a problem in another area (e.g., fixing the persistence layer). For instance, where—that is, at what specific code snippets and reusable components—do the Web interface team members even begin? Do they have appropriate access to those items, or are those items even available anymore?

Consider how much "other people's code" a Java developer faces. In Java programs, it is not uncommon for 80% of the code to be support code (i.e., scaffolding or boilerplate code), with only about 20% of the code reflecting the program logic that the developer really wanted to write. Using a traditional IDE, the developer can navigate the project in a file-based hierarchical manner (i.e., projects, folders, files, etc.). However, since the ratio between support code and custom code has become so lopsided, the task of navigating the code in an IDE becomes burdensome. What the developer really wants is a sensible way to navigate the code in an application-centric manner (i.e., accounting, payment system, etc.), not an IDE-centric manner.

The fact of the matter is that applications are becoming more complex and involve increasing numbers of layers and frameworks. As a result, developers are obliged to become specialists with detailed, but tightly circumscribed knowledge of a small cadre of technologies that inhibits expertise or even exposure to technologies in other parts of the same application. The result is that knowledge becomes increasingly "siloed" and knowledge transfer is difficult and, at times, nearly impossible. Even within the same subteam, members can find it difficult to leave useful "bread crumb" trails for developers who will come behind them. Likewise, they have difficulty mining the knowledge of existing team members unless they work geographically close enough and can ask in person. As projects become more complex, this problem emerges as a gating factor to timely product delivery, correct functionality, responsiveness to changing requirements, and (crucially) the ability to promptly and properly resolve defects. Despite being pervasive, the problem is little understood and, until now, inadequately addressed by prior art developer tools.

SUMMARY OF INVENTION

A development system with improved methodology for creation and reuse of software assets is shown and described. In one embodiment, for example, in a development system, a method of the present invention is described for facilitating creation of a reusable application, the method comprises steps of: during development of the application, capturing knowledge and intent of the application's original developer alongside source code created for the application; producing an archival module storing the source code for the application together with metadata capturing the knowledge and intent of the original developer, the metadata including at least one script guiding subsequent developers in use and modification of the source code for the application; and consuming the archival module by a follow-on developer, including executing the at least one script for facilitating creation of a reusable version of the application.

In another embodiment, for example, a development system of the present invention that facilitates creation of a reusable application is described that comprises: a development system operating on a computer having at least a processor and a memory; a producer module for recording knowledge and intent of the application's original developer as the developer creates source code for the application, and for storing the source code for the application together with metadata capturing the knowledge and intent of the original developer, the metadata comprising information sufficient to facilitate reuse of the source code by subsequent developers; and a module for consuming the source code and metadata by a follow-on developer, including executing, based on the metadata, instructions that specify coding sequences that facilitate creation of a reusable version of the application.

In yet another embodiment, for example, in a development system, a method of the present invention is described for guiding development of an application by a plurality of developers, the method comprises steps of: during development of an application by a first developer, capturing meta data describing instructions of the first developer for guiding subsequent developers in development and modification of the application as the first developer creates source code for the application; exporting the application and captured meta data into at least one module which associates the application source code with instructions from the first developer; and executing the at least one module during subsequent development and modification of the application by a second developer, including executing instructions of the first developer during development and modification of the application source code.

DETAILED DESCRIPTION

Glossary

Figure 1:
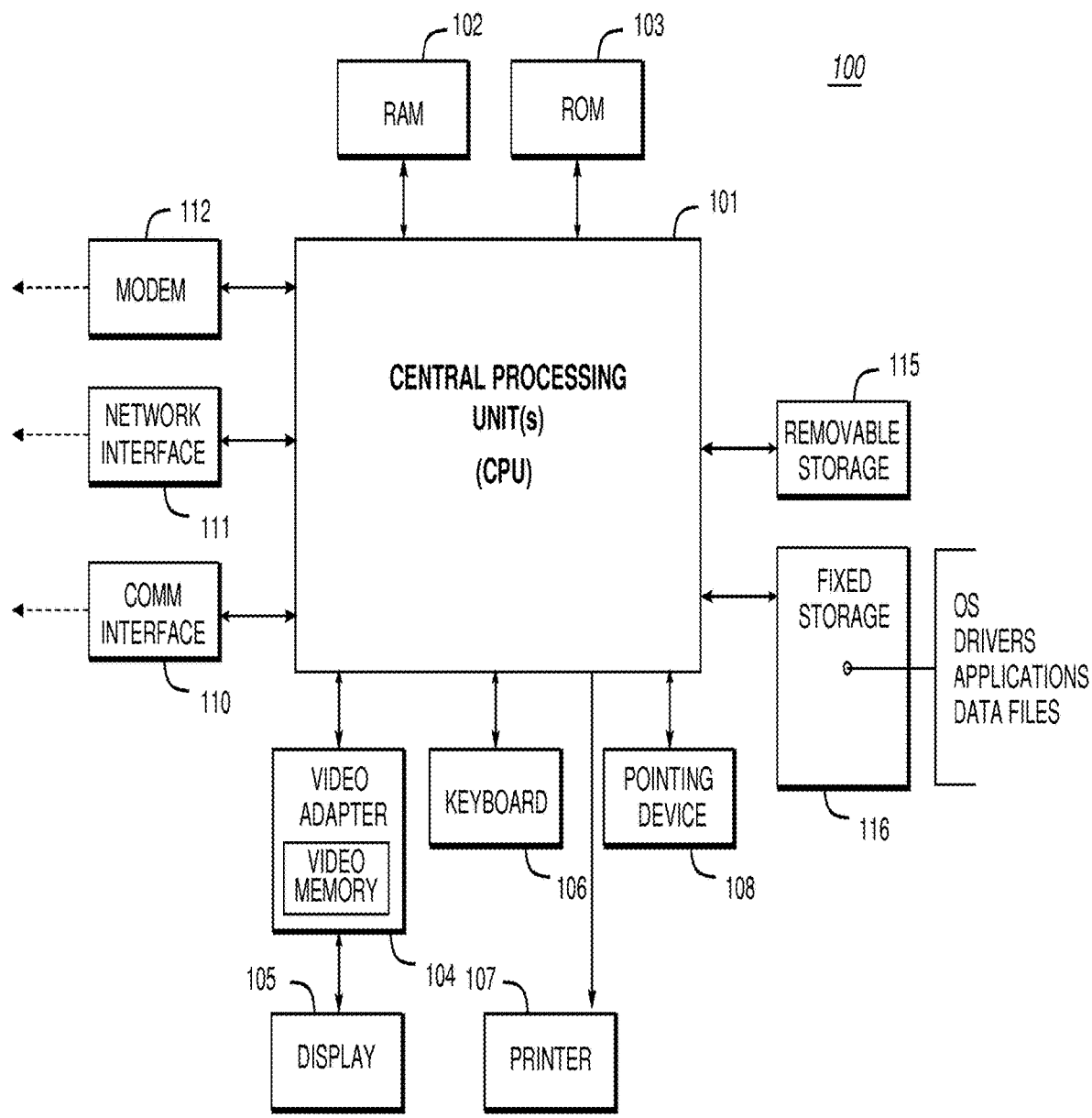
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Bytecode: A virtual machine executes virtual machine low-level code instructions called bytecodes. Both the Sun Microsystems Java virtual machine and the Microsoft .NET virtual machine provide a compiler to transform the respective source program (i.e., a Java program or a C#program, respectively) into virtual machine bytecodes.

Compiler: A compiler is a program which translates source code into binary code to be executed by a computer. The compiler derives its name from the way it works, looking at the entire piece of source code and collecting and reorganizing the instructions. Thus, a compiler differs from an interpreter which analyzes and executes each line of code in succession, without looking at the entire program. A "Java compiler" translates source code written in the Java programming language into bytecode for the Java virtual machine.

DOM: The Document Object Model (DOM) is a platform- and language-neutral interface that allows programs and scripts to dynamically access and update the content, structure and style of documents. The document can be further processed and the results of that processing can be incorporated back into the presented page. For further information regarding the Document Object Model, see e.g., "Document Object Model (DOM) Activity Statement" available from the World Wide Web consortium (W3C), the disclosure of which is hereby incorporated by reference. A copy of this document is available via the Internet (e.g., currently at www.w3.org/DOM).

Eclipse: A multi-language software development platform, available from The Eclipse Foundation (eclipse.org), that includes an IDE and a plug-in system to extend it. It is written primarily in Java and is used to develop applications in this language and, by means of the various plug-ins, in other languages as well.

HTML: HTML stands for HyperText Markup Language, the authoring language used to create documents on the World Wide Web. HTML defines the structure and layout of a Web document by using a variety of tags and attributes. For further description of HTML, see e.g., "HTML 4.01 Specification", a World Wide Web consortium recommendation dated Dec. 24, 1999, the disclosure of which is hereby incorporated by reference. A copy of this specification is available via the Internet (e.g., currently at www.w3.org/TR/REC-html40).

Java: Java is a general purpose programming language developed by Sun Microsystems. Java is an object-oriented language similar to C++, but simplified to eliminate language features that cause common programming errors. Java source code files (files with a java extension) are compiled into a format called bytecode (files with a class extension), which can then be executed by a Java interpreter. Compiled Java code can run on most computers because Java interpreters and runtime environments, known as Java virtual machines (VMs), exist for most operating systems, including UNIX, the Macintosh OS, and Windows. Bytecode can also be converted directly into machine language instructions by a just-in-time (JIT) compiler. Further description of the Java Language environment can be found in the technical, trade, and patent literature; see e.g., Gosling, J. et al., "The Java Language Environment: A White Paper," Sun Microsystems Computer Company, October 1995, the disclosure of which is hereby incorporated by reference. For additional information on the Java programming language (e.g., version 2), see e.g., "Java 2 SDK, Standard Edition Documentation, version 1.4.2," from Sun Microsystems, the disclosure of which is hereby incorporated by reference. A copy of this documentation is available via the Internet (e.g., currently at java.sun.com/j2se/1.4.2/docs/index.html).

JavaScript: JavaScript was designed by Netscape as an easy-to-use object-oriented scripting language that serves as an adjunct to the Java programming language. JavaScript is a small, lightweight language that is designed to be embedded in other products and applications, such as Web browsers. Inside a host environment, JavaScript can be connected to the objects of its environment to provide programmatic control over such objects. JavaScript code can be added to standard HTML pages to create interactive documents and has found considerable use in the creation of interactive Web-based forms. Most modern browsers, including those from Microsoft and Netscape, contain JavaScript support. For additional information on JavaScript, see e.g., "Core JavaScript Guide 1.5", from Netscape, the disclosure of which is hereby incorporated by reference. A copy of this documentation is available via the Internet (e.g., currently at devedge.netscape.com).

Network: A network is a group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term "network" refers broadly to any group of two or more computer systems or devices that are linked together from time to time (or permanently).

TCP: TCP stands for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent. For an introduction to TCP, see e.g., "RFC 793: Transmission Control Program DARPA Internet Program Protocol Specification", the disclosure of which is hereby incorporated by reference. A copy of RFC 793 is available via the Internet (e.g., currently at www.ietf.org/rfc/rfc793.txt).

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., "RFC 1180: A TCP/IP Tutorial", the disclosure of which is hereby incorporated by reference. A copy of RFC 1180 is available via the Internet (e.g., currently at www.ietf.org/rfc/rfc 1180.txt).

UML: UML standards for the Unified Modeling Language, a standard graphical language for modeling object-oriented systems. For further information on UML, see e.g., "OMG Unified Modeling Language Specification (Version 1.5, March 2003)" available from the Object Management Group, Inc., the disclosure of which is hereby incorporated by reference. A copy of this specification is available via the Internet (e.g., currently at www.omg.org).

Winsock: Windows Sockets 2 (Winsock) is a Microsoft-provided interface that enables programmers to create advanced Internet, intranet, and other network-capable applications to transmit application data across the wire, independent of the network protocol being used. With Winsock, programmers are provided access to advanced Microsoft Windows networking capabilities such as multicast and Quality of Service (QOS). Winsock follows the Windows Open System Architecture (WOSA) model; it defines a standard service provider interface (SPI) between the application programming interface (API), with its exported functions and the protocol stacks. It uses the sockets paradigm that was first popularized by Berkeley Software Distribution (BSD) UNIX. It was later adapted for Windows in Windows Sockets 1.1, with which Windows Sockets 2 applications are backward compatible. Winsock programming previously centered around TCP/IP. Some programming practices that worked with TCP/IP do not work with every protocol. As a result, the Windows Sockets 2 API adds functions where necessary to handle several protocols. For further information regarding Winsock, see e.g., "Winsock Reference", available from Microsoft Corporation, the disclosure of which is hereby incorporated by reference. A copy of this documentation is available via the Internet (e.g., currently at msdn.microsoft.com/library/default.asp?url=/library/en-us/winsock/winsock-/winsock_reference.asp).

XML: XML stands for Extensible Markup Language, a specification developed by the World Wide Web Consortium (W3C). XML is a pared-down version of the Standard Generalized Markup Language (SGML), a system for organizing and tagging elements of a document. XML is designed especially for Web documents. It allows designers to create their own customized tags, enabling the definition, transmission, validation, and interpretation of data between applications and between organizations. For further description of XML, see e.g., "Extensible Markup Language (XML) 1.0", (2nd Edition, Oct. 6, 2000) a recommended specification from the W3C, the disclosure of which is hereby incorporated by reference. A copy of this specification is available via the Internet (e.g., currently at www.w3.org/TR/REC-xml).

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware and Software (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111

(e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, Microsoft Windows NT, Microsoft Windows 2000, Microsoft Windows XP, or Microsoft Windows Vista (Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

The above-described computer hardware and software are presented for purposes of illustrating the basic underlying computer components that may be employed for implementing the present invention. For purposes of discussion, the following description will present examples in which it will be assumed that there exists a computer (e.g., desktop computer) or processing environment capable of hosting a development environment that implements and supports the methodologies of the present invention presented in detail below.

Development Environment Providing "Application Factories"

In accordance with the present invention, a development environment for developing software applications includes a subsystem providing "Application Factories." Application Factories represent an infrastructure that facilitates creation and reuse of specialized metadata-driven templates for pre-built applications. They contain a description of the application, configuration information, application development logic, and "breadcrumbs" (i.e., developer trail markers) to use and build out each of the components that comprise an application. They are devised by architects or senior developers for either repetitive programs or one-off applications, in which the designer can specify all the information a more junior developer will need to write the final product. For the follow-on (e.g., junior) developer, the experience is vastly different from the typical (prior art) exercise of looking at abstract UML (Unified Modeling Language) diagrams or CRC (Class-Responsibility-collaborator) cards and figuring out what code needs to be written. Rather, it is a navigation experience through rich development content provided by the Application Factories facility. This navigation consists of following the steps in the template: reading the logic and explanation of constraints; following the breadcrumbs to various resources' and then writing the code.

More particularly, "Application Factories" represent an automated facility for capturing the development process itself, including development "artifacts" and behavior, for reuse at a future point in time. Here, the developer can push his or her knowledge (i.e., knowledge gained from development activities) back into the developer's integrated development environment (i.e., IDE). In the currently preferred embodiment, this captured knowledge is maintained as metadata stored alongside the application under development (i.e., maintained alongside the source code and other files that comprise the application under development). Preferably, the metadata is maintained as a "metadata project," and thus can be controlled with the IDE's existing project management tools (e.g., version control). The IDE becomes a consumer of the metadata and adapts itself to the application under development—that is, transforming from an IDE-centric approach focused on different subsystems of the IDE (e.g., file-based navigators (project pane), editors, inspectors, plug-ins, etc.) to an application-centric approach focused on the fundamental aspects of the application under development (e.g., payment modules, inventory modules, etc.).

Artifacts are not development code per se but are in effect "sidecar" items or metadata that very much belong with the application, and thus are desirable to capture and track as part of the application in an automated fashion. Artifacts may be manifested, for example, as scripts or templates (to be filled in by the developer) that guide additional development or maintenance of the program code. For example, an application factory for a financial application could capture the original developer's intent into a script that, when run by a follow-on developer, guides code development by the (sample) sequence of: "(1) Reuse the graphical interface module from the derivatives application at /code/derivapp/mainUI.java; and (2) Tie that module to the bond-trading DB instead of the options system."

Besides supporting scripts and templates, Application Factories capture and track other useful artifacts, such as architecture diagrams, code completion metadata, as well as various technologies for extending the application. Used this way, Application Factories transform development into a series of actions that convert purpose-designed artifacts and templates into straightforward coding sequences. The artifacts themselves can also be inserted into the code by developers as they work to indicate the reasons for implementation decisions, with embedded suggestions on how to modify the code in the event future changes are necessary.

Thus using Application Factories, the original developer does not merely create a source code file but instead creates a content-rich application module that includes not only the source code but also metadata capturing the trails and actions of that developer. This metadata is maintained alongside the source code, so that the application's structure, evolution, and logic are readily accessible. By thoughtfully tracking and including these artifacts and visible behavior at the decision time, the developers using the Application Factories facility can provide support for future maintainers and give them appropriate signposts by which they can navigate the code successfully.

By allowing developers to navigate an application based on an application-centric approach, Application Factories allow the developer to easily navigate an application in terms of its different functional parts (e.g., payment module), instead of requiring the developer to navigate based on an IDE-centric approach (e.g., project folders and individual source code files). The file system is preserved underneath but it is presented using an application-centric navigational approach. This approach allows the developer to easily view and contemplate the application in terms of the application's structure, evolution, and logic, rather than as a multitude of project folders and files. Moreover, by capturing the trails and actions of earlier developers, the barrier or learning curve for re-creating a given development task (e.g., create a PayPal checkout cart) is substantially reduced. In this manner, Application Factories provide a development environment in which applications along with attached metadata are shared as reusable software assets.

The Application Factories functionality introduces an application-driven development paradigm, where the structure, evolution, and logic behind the development of the application are checked into version control along with the source code for the application itself. Major software development processes use a bewildering array of frameworks and technologies to build even the simplest of applications. In addition, many typical applications are built over and over again from the ground up, resulting in duplicated efforts. Such methods involve a steep learning curve for developers, requiring knowledge of the frameworks and technologies along with application-specific models and behaviors. Due to the scope of this effort, it is very common to have teams narrowly focused on the many aspects of the application. However, it is absolutely required that each feature fit into the overall architecture. The problem multiplies over the age of the project as more features get added and teams are in flux. The Application Factories facility of the present invention fundamentally addresses this issue by attaching application-specific metadata throughout the life of the application's development. Application Factories provide developers with the ability to attach actionable behavior to application modules. These behaviors go all the way from complete code generation to laying bread crumbs for newer developers to follow and implement, as the Application Factories facility records a developer's intent when a particular piece of code was written. This allows the workings of the code to be easily ascertained at a later date.

Application Factories also facilitate the process of capturing the original developer's intent and context by providing in-line IDE tools for making notes about code, as well as creating bread crumb trails to project- and file-specific developer knowledge. This metadata stays attached to the code and can be opened by any subsequent developer to understand the context and purpose of code snippets, methods, and classes. Using a given Application Factory project, system architects can develop templates that include Application Factory pointers. These pointers help developers understand the rationale and correct technique for implementing specific features. The system architect includes code and Application Factory tags that explain to the developer what custom code needs to be written and how to configure the application. With these templates in place, sites can use application templates to quickly customize, build, and deploy applications.

The Application Factories functionality provides core tools to create: [0069] Tags—keywords associated with a piece of information [0070] Application Diagram—visual representation of application architecture and functionality [0071] Scripts—code generating/templating mechanism providing a way to generate template code [0072] Readme—overview of application functionality [0073] Cheat Sheet—cheat sheet providing important steps for using the application and scripts Each application can become an Application Factory Module (also known as an application module) by creating the Application Factory project for an application. Attached with the Module is Application Factory metadata in the form of an Application Factory project. Currently each workspace supports a single application (which could include multiple projects) and a single Application Factory project. A new project can be created using the new Application Factory wizard (in the IDE, available under File New Project or Other Application Factory). This wizard creates a template readme and cheat sheet along with an empty tag repository and application diagram. The project structure is created and global scripts and templates can be pulled into the new project as well.

The Application Factory project includes the Tags, Application Diagram(s), and Application Module Scripts as the application's artifacts. A tag is a keyword associated with a piece of information. Tags are typically used to group related resources. The application module project contains a set of tags that provide an organizational and navigational mechanism for the application. This tag repository for an application is stored in the Application Factory project. Each tag is associated with multiple resources in the application (defined as a set of projects in a workspace). Tags can have parent-child relationships and can be related to each other. Each tag can have a description and associated notes. A "Tag View" is used to create and manage tags for an application. The Tag View provides the ability to focus the workspace on the file set associated with each tag. This provides an easy way to navigate through the application. Tags and selected resources can be marked as Application Diagram candidates. This allows the tags and associated relationships to be exposed in the Application Diagram associated with the module. For example, a set of high-level parent tags can be exposed via the Application Diagram to describe application functionality.

The Application Diagram describes application architecture and functionality. This diagram can include application architecture, employed technologies, third-party dependencies, and so forth. The diagram is useful as a tool to describe how the internals of the application work to a new user. The Application Diagram is stored in the Application Factory project. The diagram surfaces information from the tags, mainly tags marked as diagram candidates. The diagram also displays description/notes for tags. It also represents parent-child relationships and related tags. The diagram provides a high-level summary of the application. The Application Diagram can be displayed by using a context-menu item (right-clicking) on the Application Factory project file.

Application module scripts are code generation/templating mechanisms that provide a way to generate template code. Template code can be a convenient starting point for new users. In the presently preferred embodiment, the scripts are written using JavaScript and use FreeMarker (template engine, available from freemarker.org) templates to perform the task of template code generation. This template code includes generation of new resources, as well as modification of existing resources. Both scripts and templates are stored in the Application Factory project. Each script contains a description of script functionality and uses a standard Java API (DOM) to locate/generate resources. The currently preferred scripting mechanism (that is, running scripts and so forth) is based on Eclipse Monkey, a JavaScript project within Eclipse. The currently preferred IDE (i.e., JBuilder, the commercial embodiment) provides wizards to generate template scripts and script recipes that can be used to generate complex scripts/templates. The generated scripts use standard UI widgets to prompt for parameters (for example, project names, package names, search/replace patterns, and so forth). Scripts can also be generated by mining VCS commit history for commonly used patterns. Script run history is available for the Application Factory project, any file in the workspace, and any script using the Archeology view.

System Components

Figure 2A:
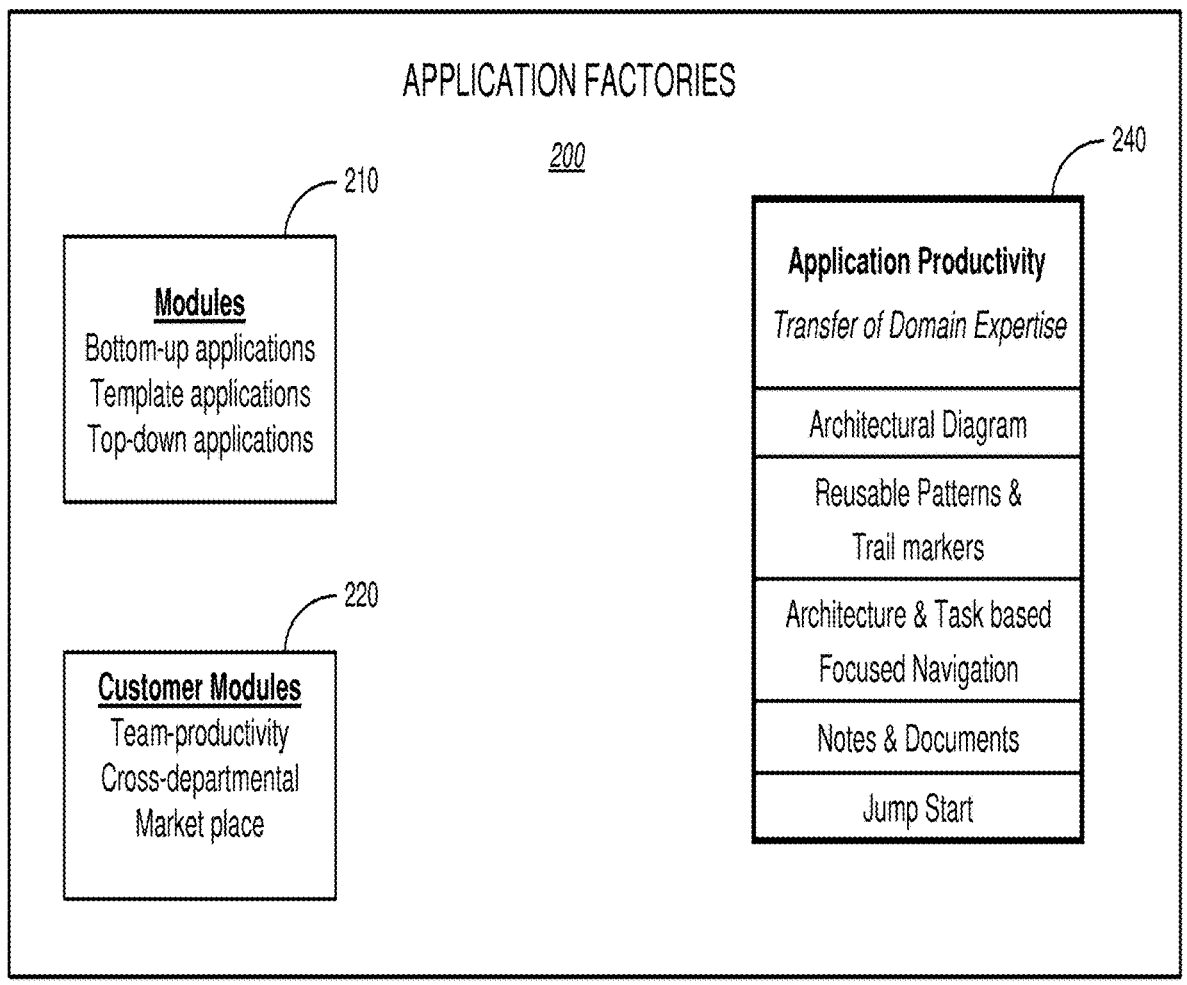
FIG. 2A is a high-level block diagram providing a conceptual view of Application Factories of the present invention.

FIG. 2A is a high-level block diagram providing a conceptual view of Application Factories. As shown, Application Factories 200 comprises various "modules" as shown on the left-hand side of the diagram, including "built-in" modules 210 and customer modules 220. Built-in modules 210 include base modules for building applications. These may be further divided into: bottom-up applications, template applications, and top-down applications. The bottom-up applications module is used for the developer who is creating an application from scratch. The template applications module provides full-built applications, which a developer may use as an example or as a template. The top-down applications module is for a fully functional application that is highly customizable (i.e., the developer will make substantial changes to it before deployment). The customer modules 220 represents a repository for holding customer-created modules. These include, for example, modules that the customer has created for team productivity, cross-departmental use, and marketplace deployment.

The right-hand side of FIG. 2A includes Application Productivity 240, which represents the means by which the Application Factories 200 supports the creation and use of the modules 210, 220. Application Productivity 240 includes the various tools and features of the present invention that facilitate the transfer of domain expertise (i.e., transfer of a developer's knowledge gained during development) back into the IDE. As shown, these tools include: Architectural Diagram ("white boarding") support, Reusable Patterns and Trail Markers, Architecture and Task-based (focused) Navigation, Notes and Documents support, and "Jump Start." These will be briefly described in turn.

The Architectural Diagram support is elevated in importance, such that the developer's core architectural diagram(s) receives prominent attention in the project. Anytime the project is opened, the architectural diagram(s) is displayed upfront (i.e., displaying a white board about the application upfront), allowing quick assimilation of the key aspects of an application's architecture. Reusable Patterns and Trail Markers incorporate developer knowledge in a manner that facilitates reuse. Using Application Factories, one does not always have the burden of producing source code. Instead, the expert (producing) developer may create skeleton code (i.e., scaffolding) together with "to do" items. The producing developer may create as much (i.e., full-fledged patterns) or as little (i.e., trail markers) source code as appropriate for use by consuming developers for the task at hand. Architecture and Task-based (focused) Navigation refers to the preferred method for navigating applications in the Application Factories environment. As previously described, an application project is no longer presented merely as a collection of folders and files. Instead, the application is presented in terms of its architecture and feature implementation. In this manner, one can navigate the application project based on the application's own constructs, rather than the IDE-centric view of folders and files. Notes and Documents refer to the enhanced documentation available through use of metadata maintained with the application project. Finally, "Jump Start" refers to the facility of Application Factories that supports a high-level starting point (e.g., shopping cart), so that developers need not start from the beginning every time.

Figure 2B:
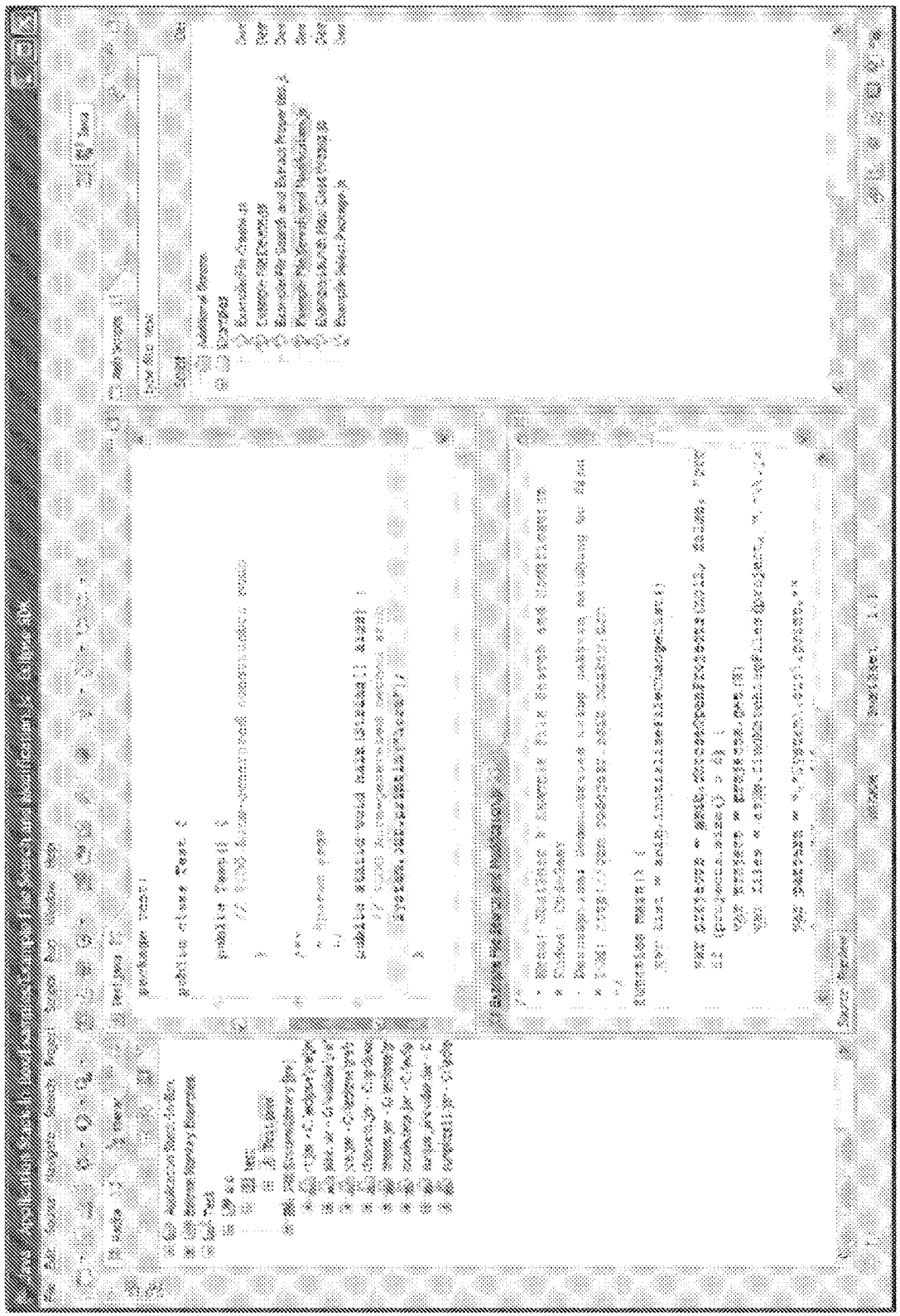
FIG. 2B is a bitmap screenshot illustrating use of Application Factories inside the Eclipse development environment.

FIG. 2B shows how this process appears inside Eclipse. In the central pane, the focus (cursor position) is located on a line that needs to be modified. In the right pane, the corresponding script is highlighted (in this case, a Javascript file). In the bottom central pane, the script appears with the template names of variables highlighted for the developer to attend to. In the top central pane, the task associated with the highlighted line is displayed, which in this case is part of an auto-generated stub. This example illustrates a principal application of Application Factories: a body of code is auto-generated, say from a UML tool. The architect goes through the generated code inserting scripts and tags for the (follow-on) developers; the developers then use it as a basic template for future instances of the specific application, or one-off variants. A site can easily maintain a collection of these templates for retrieval as needed, without fear that if the designer of the forms or the programmer who most works on the applications were absent that the work would have to wait. Development artifacts and "breadcrumbs" are captured, thus making it possible for almost any developer to step into the specialist's shoes and move the task forward.

Application Factories make it possible to run scripts and capture changed artifacts as part of the script Archeology. In a typical scenario, as an Application Factory is opened, a developer goes to the first navigable item and then performs the following sequence: [0083] Runs a script, or s/he could be prompted for a script to run; [0084] (The developer then switches to a snippet resolver phase for the changes made by the script, which includes:) [0085] Reviewing each change and the reason why the change was made; [0086] Making any in-place edits to the changes performed by the script; [0087] Tagging the changes as needed; [0088] Scroll to the script line which produced the change and if need be customizing or modifying it; [0089] Committing the changes to a "changeset"; and [0090] Repeat as needed with other scripts.

Figure 2C:
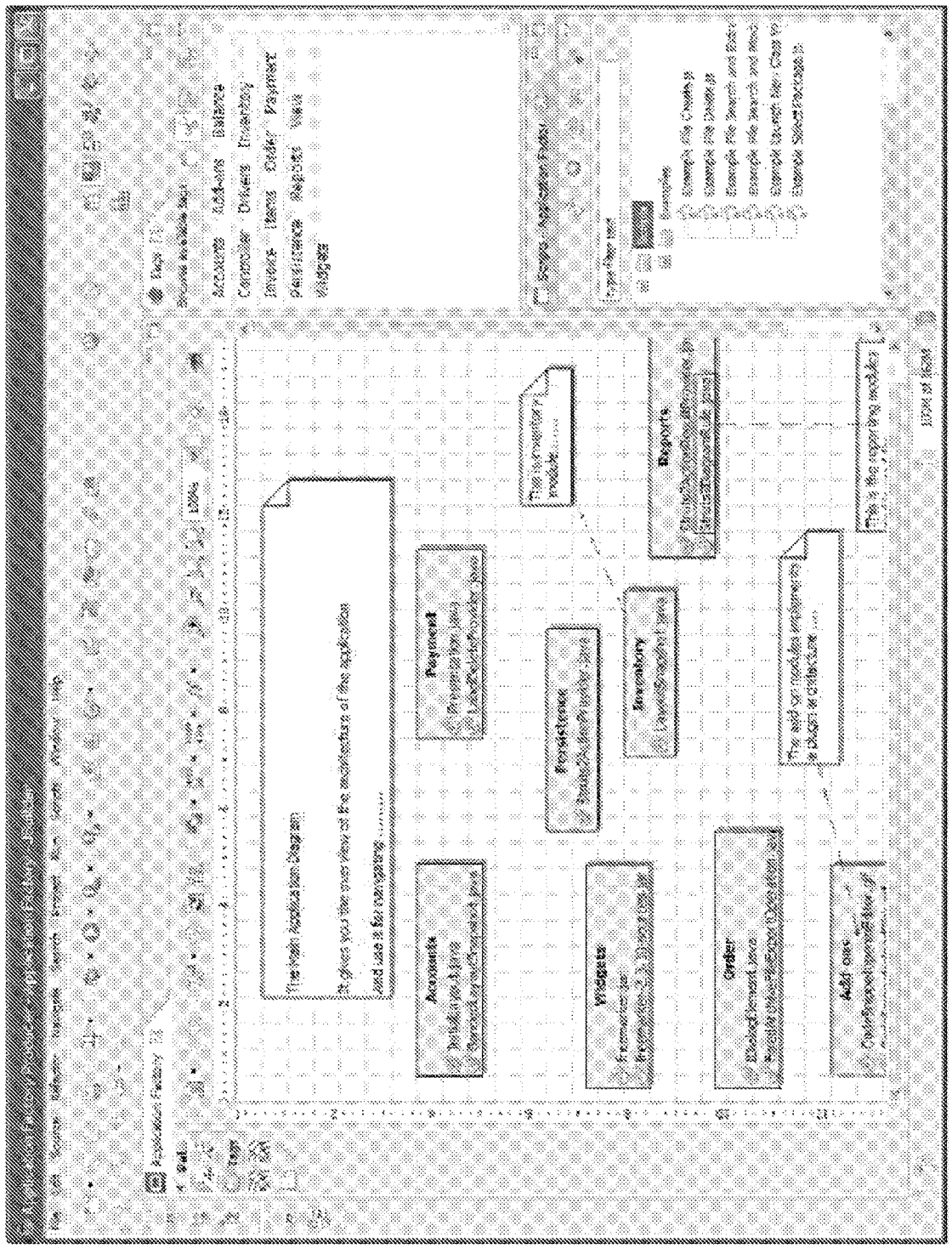
FIG. 2C shows a simple Eclipse dialog that enables a developer to manage the Tags feature of the present invention, for different parts of an application.

FIG. 2C shows a simple Eclipse dialog that enables a developer to manage the tags for different parts of an application. Application Factories provide focused navigation that enables developers to go back and forth easily between the Factory tags and the application, so that navigation is truly seamless. This feature avoids developers having to search through reams of code to find the items they need to change (which on a new project is a key productivity aid).

Usage Modes

Consumer Mode/Role

The Application Factory Module "Consumer" uses previously-created Application Factory Modules to rapidly build other applications. In this role, the "Consumer" (follow-on developer) would work with the application projects as any developer normally does. In addition, the Consumer makes use of Application Factory scripts as needed. A Consumer can be defined as a team member who is new to Application Factory and who is mandated to work with Application Modules. This user starts by checking out or installing an Application Module. An Application Module could be a single project or multiple projects along with the Application Factory project for the application. The Consumer then proceeds to learn about the application using the application diagram, tags and scripts. The Consumer can then proceed with assigned tasks. This might include adding tags/scripts in this process, which can then be re-exported as a new Application Module to share with the rest of the team. The Consumer works with the application projects in the normal manner and makes use of Application Factory scripts as needed. Using the Application Factory, the Consumer has a deployable application from the very beginning with an automatically-created action trail. The Consumer learns while using Application Factory tools on action trails and tags and can choose to modify/add tags. This knowledge, along with the project itself, can then be shared with the rest of the development team. When comfortable with the Application Factory functionality, the Consumer can customize and create application-specific behavior. The Consumer can use the extensive application creation tools (Producer version only) or the Consumer can use the script wizard to create a rich skeleton and work directly with scripts. After the Consumer enhances an Application Module, it can be shared for reuse by exporting as an archive and publishing the Application Module (Producer version only) or by exporting the enhanced module through version control.

Figure 3A:
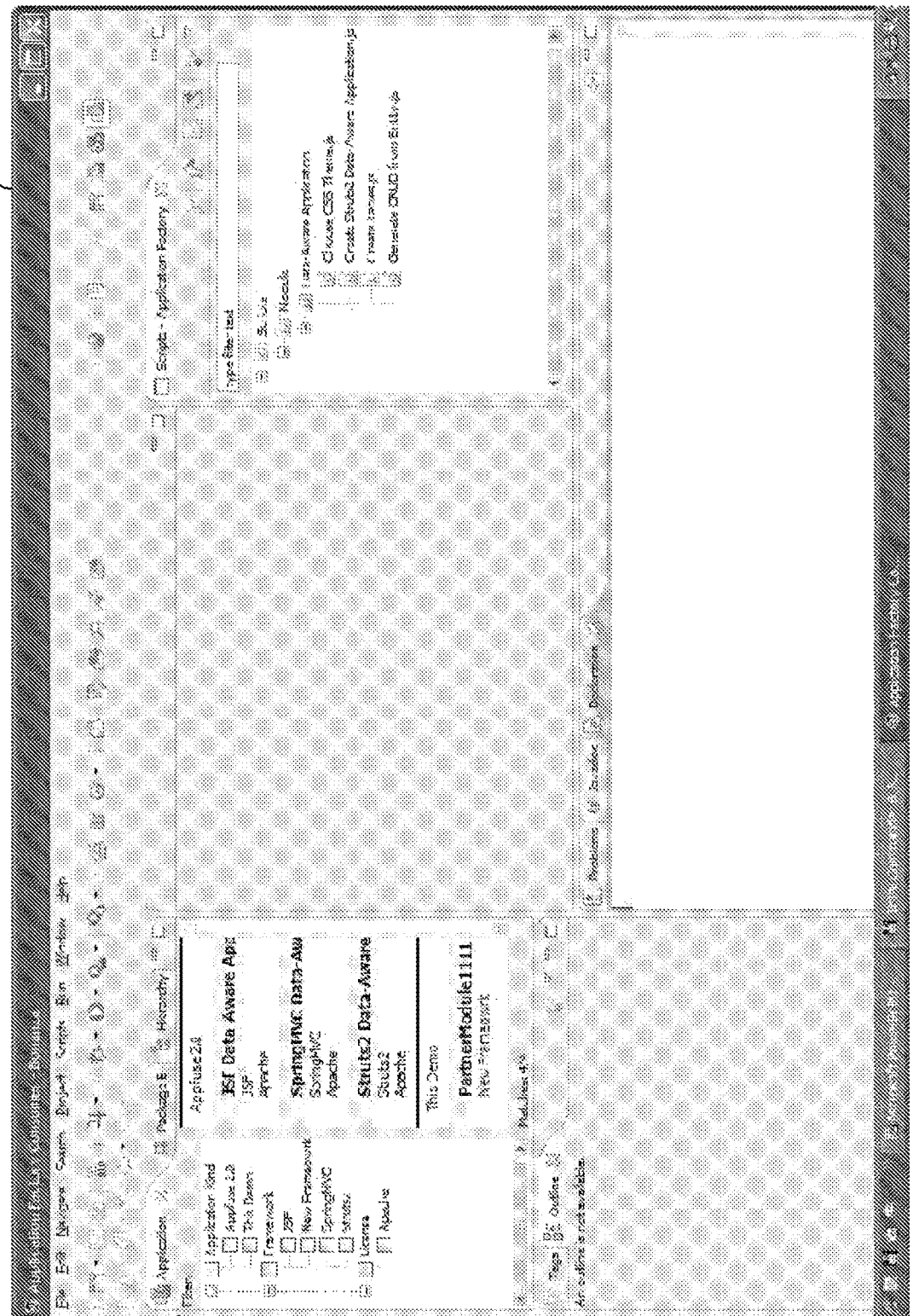
FIG. 3A is a bitmap screenshot illustrating the currently preferred development environment (commercial embodiment of JBuilder® 2008) used for implementing Application Factories of the present invention.

Operation of this mode (Consumer mode) is perhaps best described by demonstrating usage of the user interface. FIG. 3A is a bitmap screenshot illustrating the development environment implementing Application Factories. Here, the figure illustrates the Application Factories consumer perspective 300. (Other perspectives, described below, include the producer perspective (Producer mode) and modeling perspective.) In typical (prior art) development environments, the developer at this point would be required to start a new project afresh. In the Application Factories environment of the present invention, however, that approach is eschewed in favor of the Application Factory Explorer 301 (left-hand side of the interface), which allows the developer to change the starting point of application development. The Application Factory Explorer 301 provides a tree or hierarchical view of a configurable set of categorizations. Here, the Explorer can accommodate any arbitrary set of categorizations, thereby allowing users complete flexibility in how they categorize the various facets or aspects of the application under development. For the example shown, categories include Application Kind, License and Framework. As shown, each category is associated with a user-selectable checkbox, allowing one to filter the particular application facets from display.

Figure 3B:
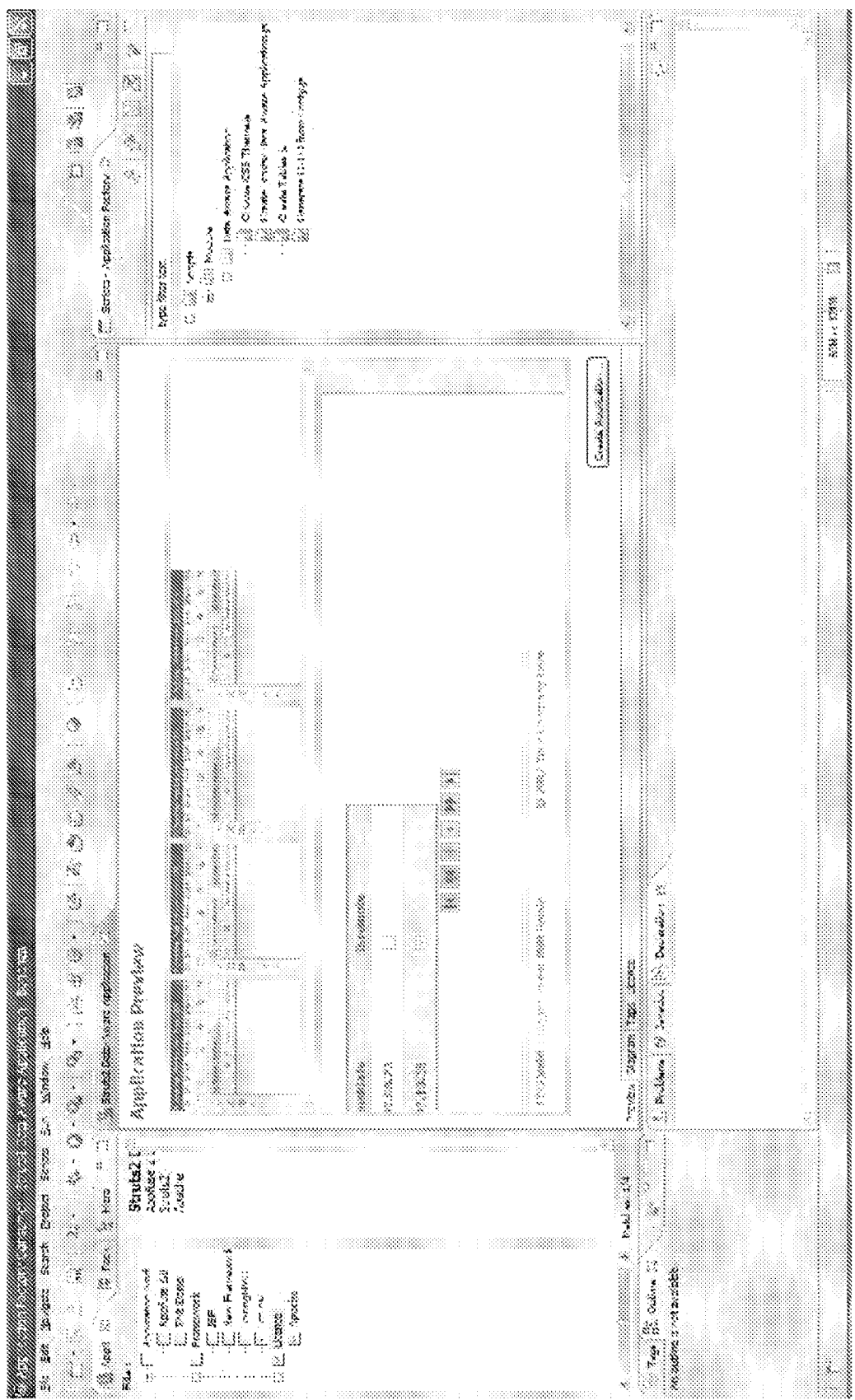
FIG. 3B is a bitmap screenshot illustrating the Application Preview feature of the present invention.
Figure 3C:
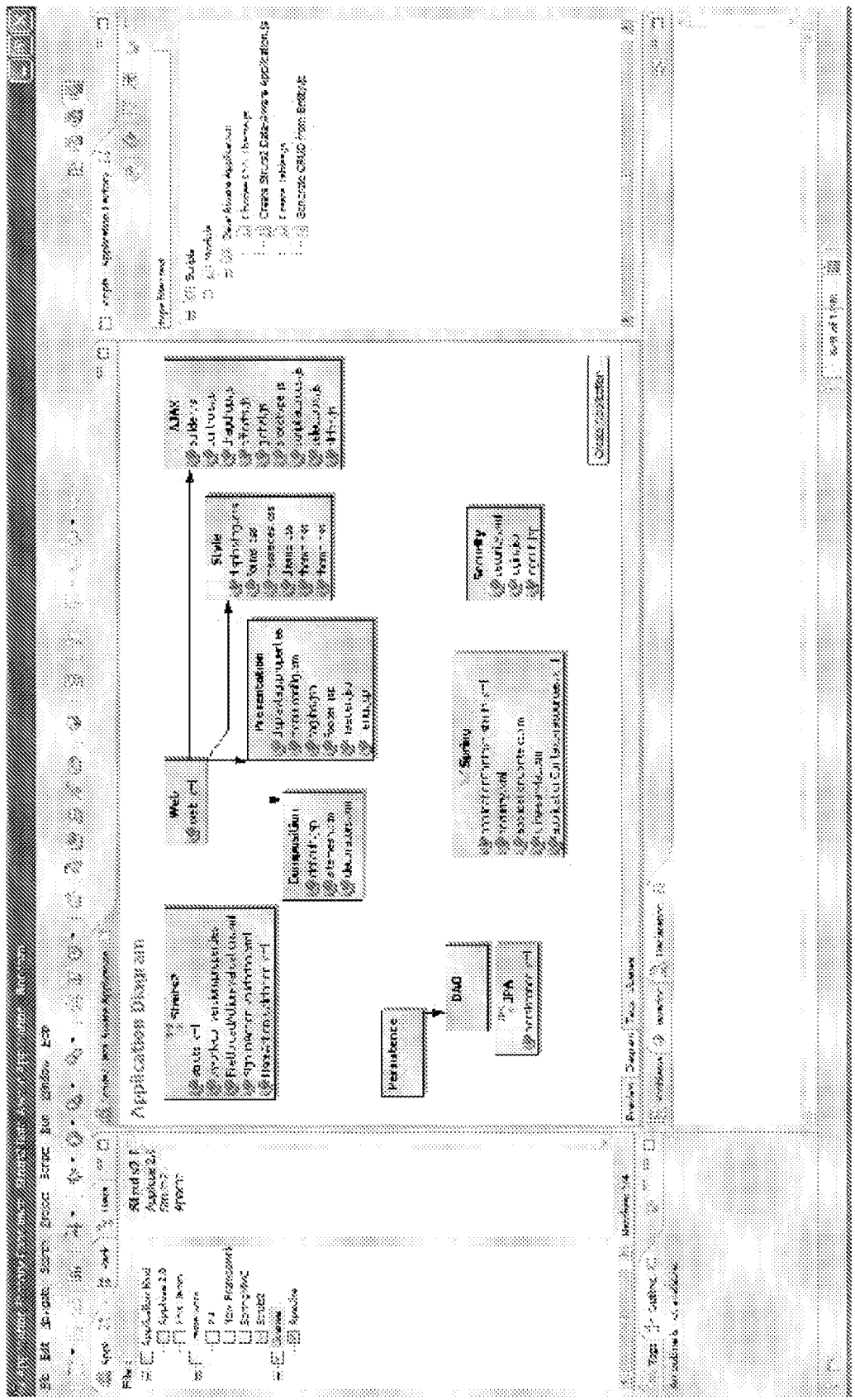
FIG. 3C is a bitmap screenshot illustrating the diagrammatic (Application Diagram) view or "white board" of an application under development, as provided by the system of the present invention.

Upfront, the Application Factories IDE provides four different views of the application under development: an Application Preview, a Diagrammatic (white board) View, a Tag View, and a Licensing View. FIG. 3B is a bitmap screen shot illustrating the Application Preview feature of the present invention. This feature allows the developer/user to immediately see a screen shot of the application under development. This gives the developer a good idea of what the application will look like, before the developer has even written one line of code. Creation of the screen shot occurs during the producer mode (described below). FIG. 3C is a bitmap screenshot illustrating the Diagrammatic (Application Diagram) View or white board of an application under development, as provided by the currently preferred embodiment of system of the present invention. This provides a white board built into the IDE that allows the (producing) developer to provide a high-level view or overview of the application. This overview allows anyone coming into the application (e.g., a new Consumer developer) to be first presented with meaningful documentation of the application.

Figure 3D:
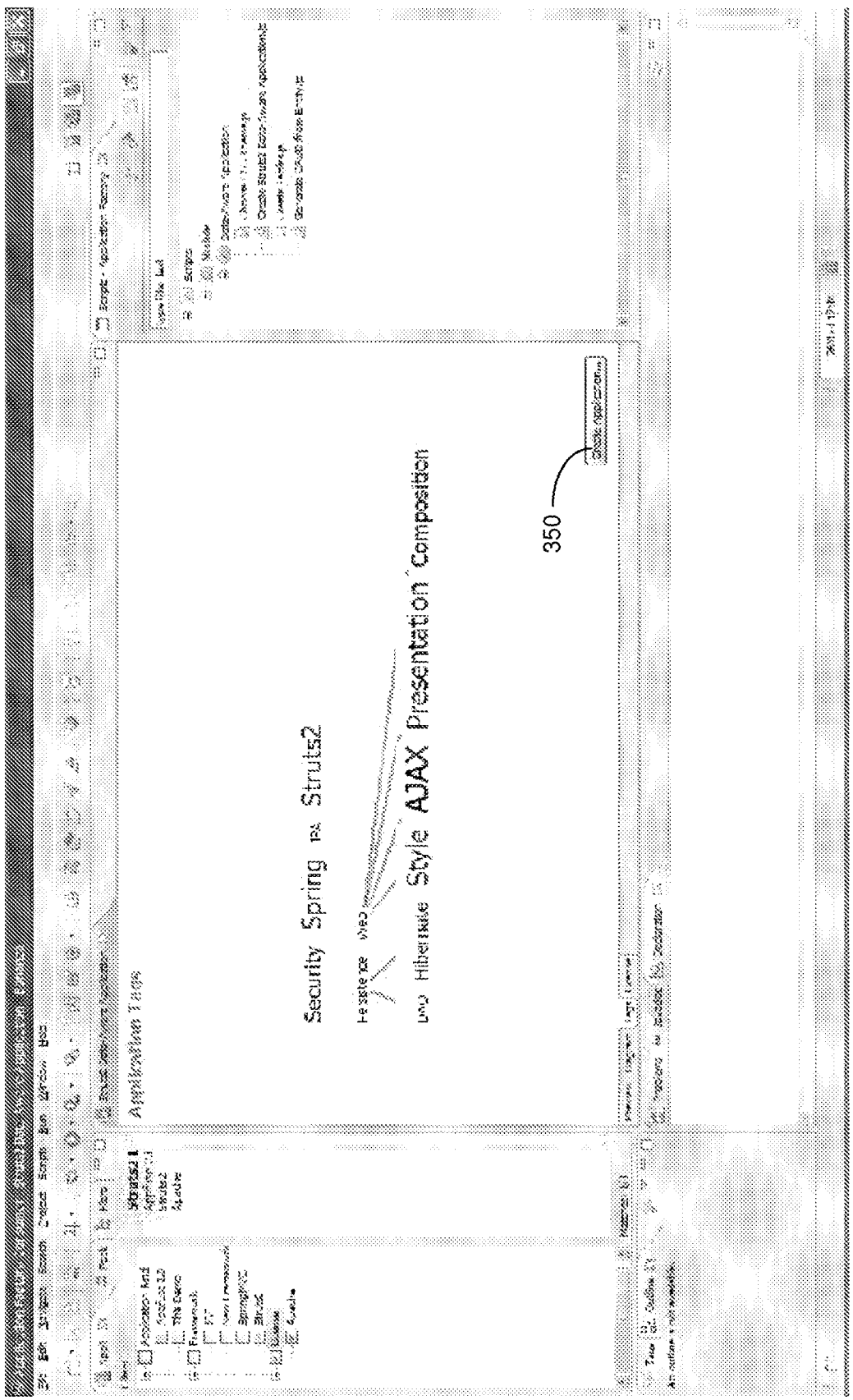
FIG. 3D is a bitmap screenshot illustrating a "Tag View" of the application.

FIG. 3D is a bitmap screenshot illustrating the "Tag View" of the application. This is a lower-level or in-depth view of the application. The Application Factory project contains a set of tags that provide an organizational and navigational mechanism for the application. This tag repository for an application is stored in the Application Factory project. Each tag can be associated with multiple resources in the application (defined as a set of projects in a workspace). Tags can have parent-child relationships and can be related to each other. Each tag can have a description and notes. The Tag View is used to create and manage tags and resource associations for an application. The Tag View provides the ability to focus the workspace on the file set associated with each tag. This provides an easy way to navigate through the application. Tags and selected resources can be marked as Application Diagram candidates. This allows the tags and associated relationships to be exposed in the Application Diagram associated with the module. In this manner, a set of high-level parent tags can be exposed via the Application Diagram to describe application functionality. The Licensing View (not shown) contains licensing information pertinent to the elements of the application under development. After the (consuming or follow-on) developer has reviewed these different views (as desired), he or she may invoke "Create Application" button 350 as shown at FIG. 3D, whereupon the application is created.

Figure 4A:
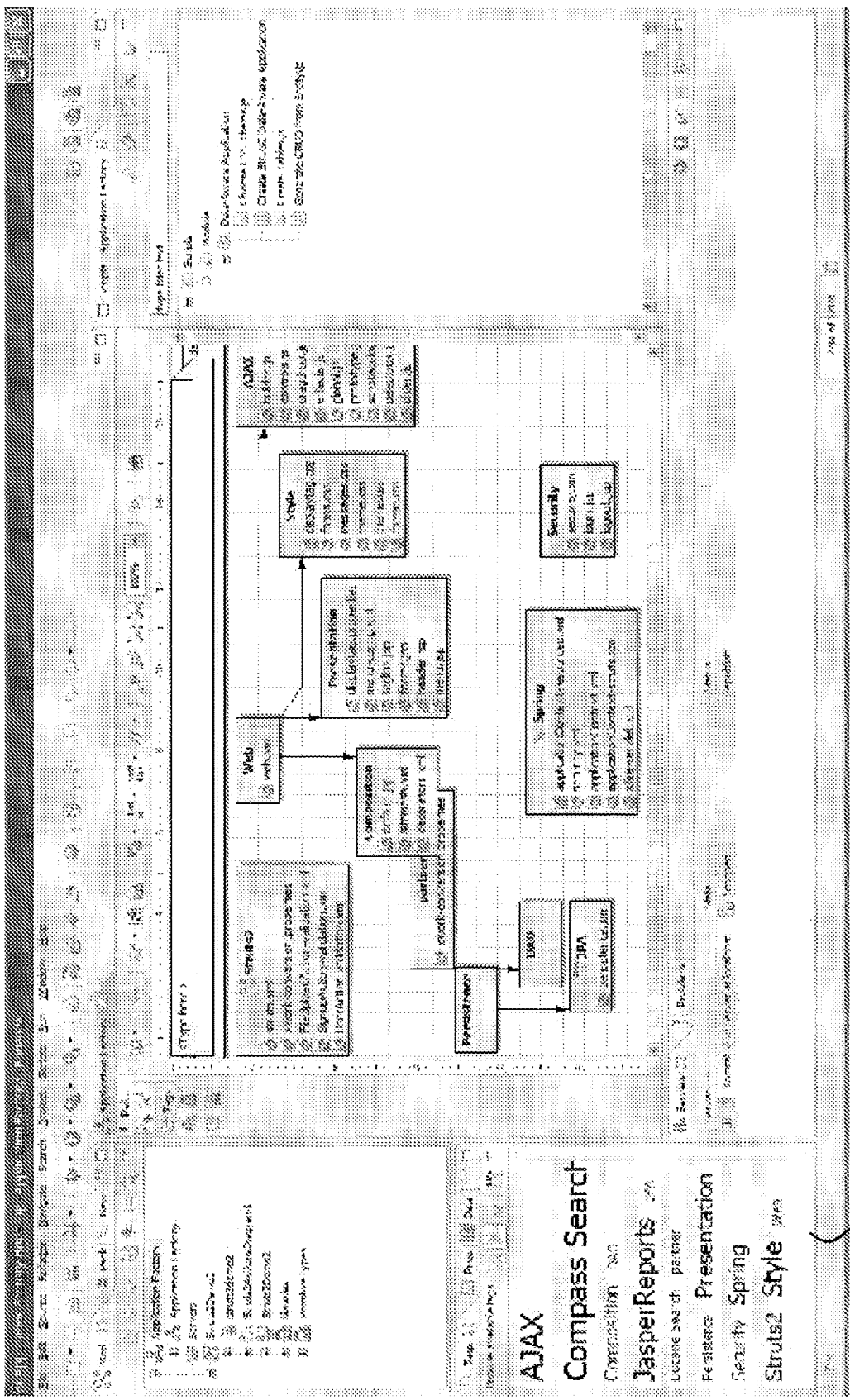
FIG. 4A-E are bitmap screenshots illustrating creation of a sample application, for demonstrating use of metadata, tags, and navigation features of the present invention.
Figure 4B:
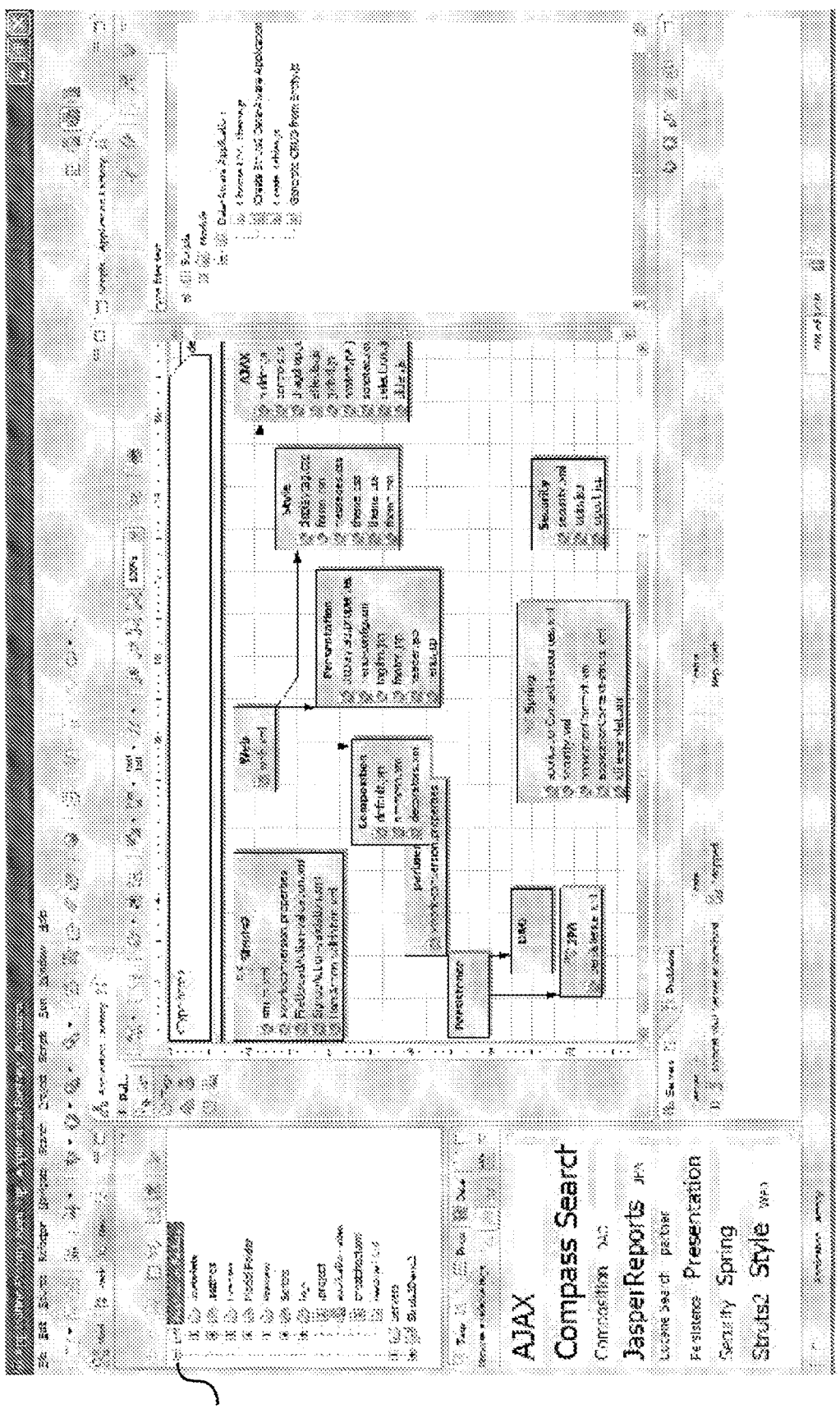
Figure 4C:
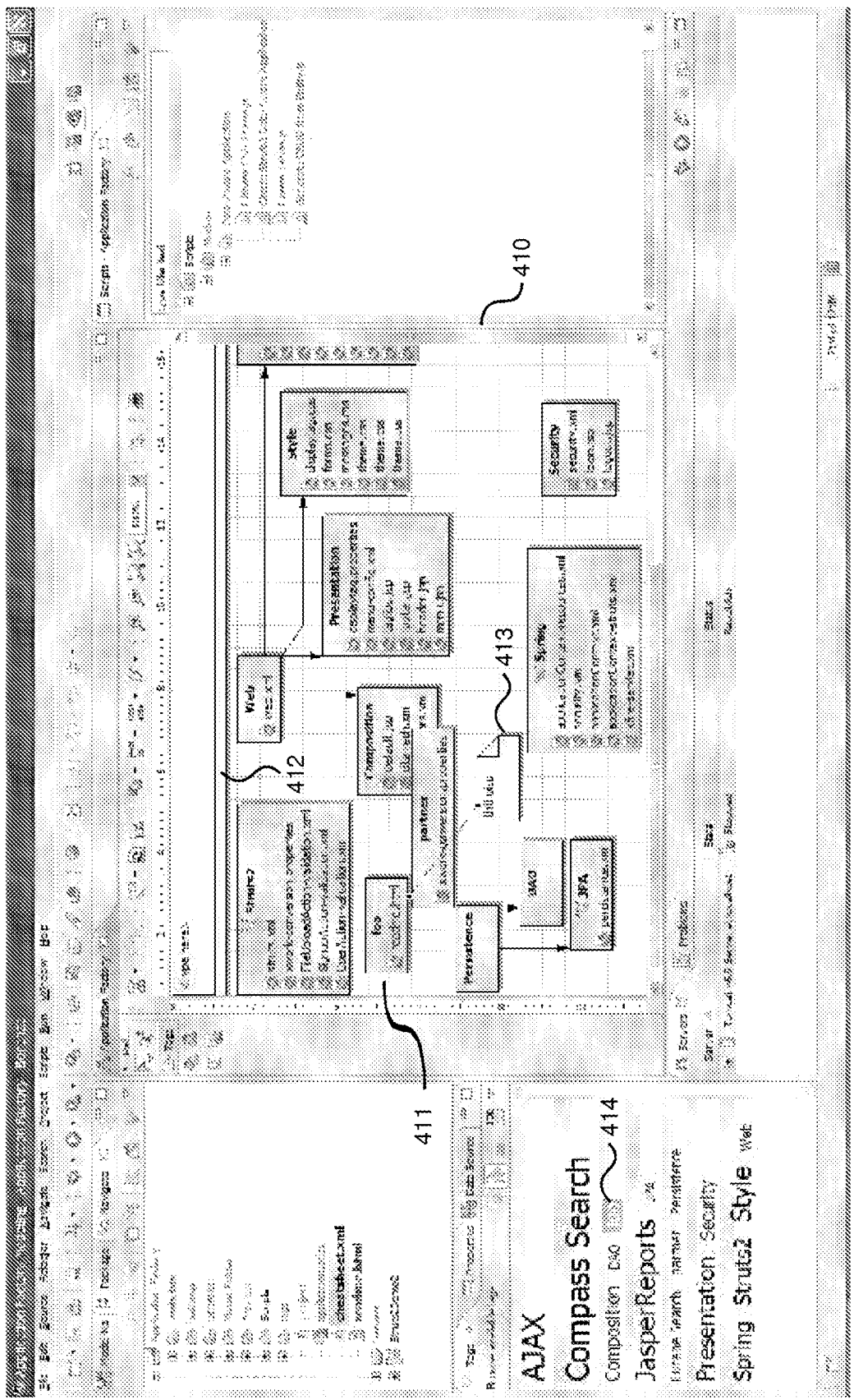
Figure 4D:
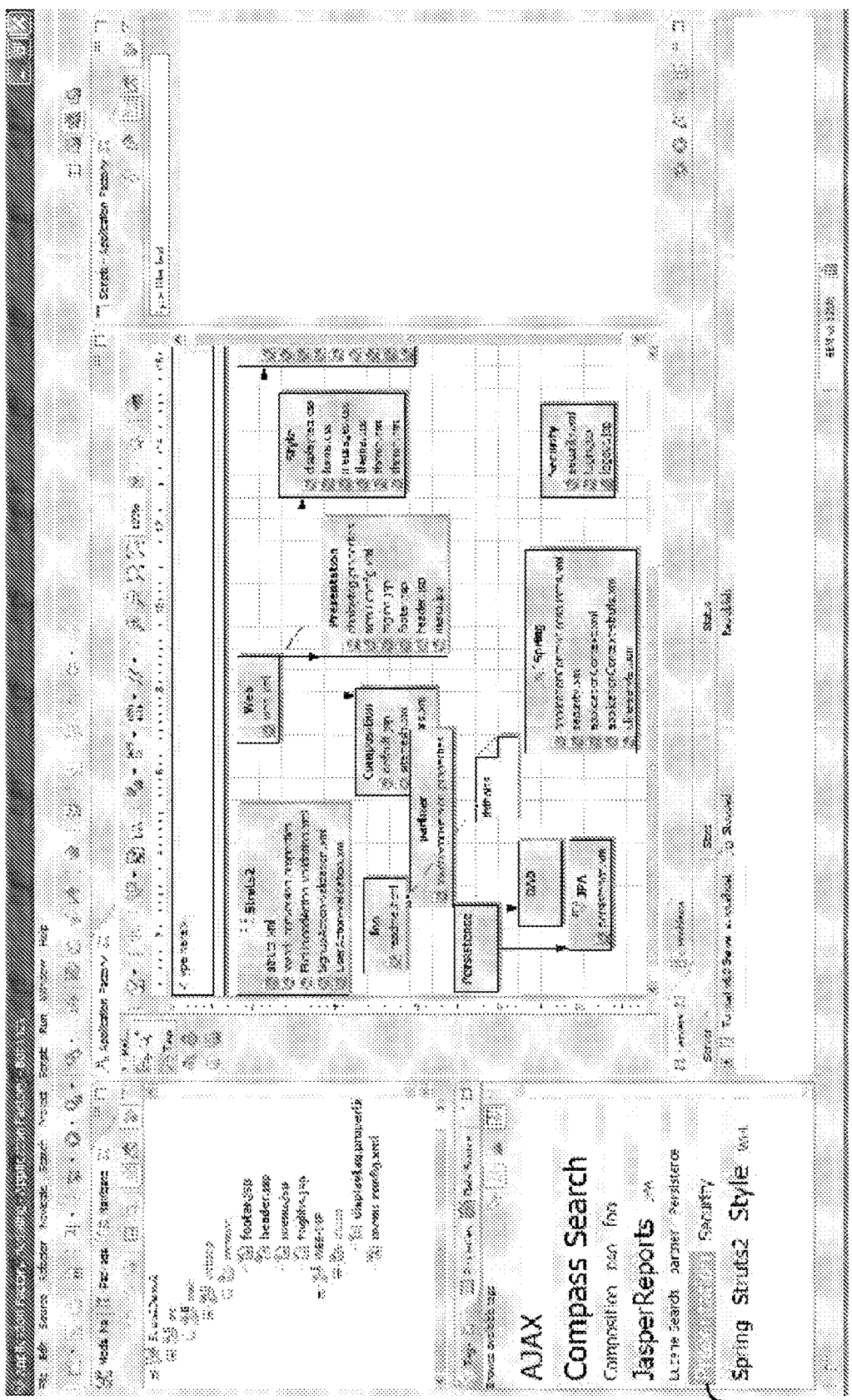

FIG. 4A is a bitmap screenshot illustrating the live application that is created. As shown, a live representation of the application is provided by the Tag tab 401. As shown in FIG. 4B, the navigator introduces the notion of a metadata project, shown in this example as Application Factories metadata project 403. The navigator pane presents the metadata project in tree or hierarchical view. The metadata project represents where all of the Application-specific metadata is captured. As shown in FIG. 4C, the user interface presents a tagging canvas 410 allowing the developer to easily edit the metadata by adding additional tags, such as shown as the addition of a new foo tag 411. Also, the developer at this point may append notes, such as shown by notes 412, 413. These may be linked together, for example as shown for note 413. Upon the developer's placement of the new foo tag, the tag view is updated to reflect foo tag 414. In the currently preferred embodiment, placement of tags is highly flexible (i.e., user configurable or free form). As illustrated in FIG. 4D, the developer may now use the Tag View in the IDE to navigate the application based on the application's own constructs, rather than based on the folder structure of source code files. For example as shown in the figure, the developer may select the "Presentation" tag 415 in the Tag View to navigate to Presentation-related facets of the application. Immediately in response to this action, the navigator pane updates to show the particular facets for the just-selected tag. In this manner, the present invention allows the developer to easily navigate the application based on the application's own structure.

Figure 4E:
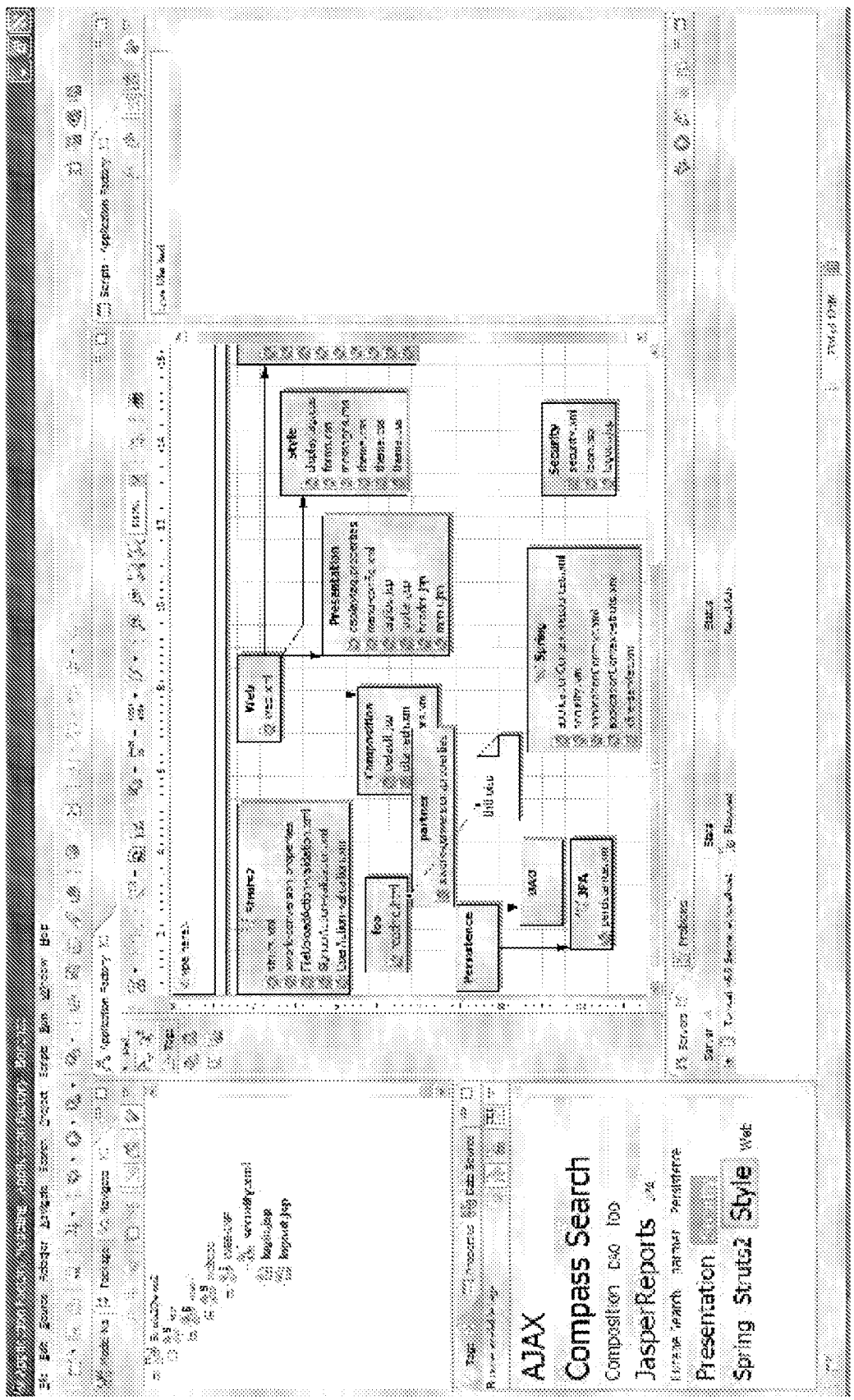

This approach is particularly important for complex applications. Consider, for instance, a 1,000-file application, with various bits and pieces of the application scattered across a dozen or more projects. In that scenario, navigation of the application using traditional file-based IDE technique is woefully inadequate and inefficient. Using the tag-based approach of the present invention, in contrast, the developer may immediately navigate to relevant pieces, such as the presentation portion of an application, the database portion of an application, and so forth. Suppose this application is a banking application that has been in development for two years and a developer has just been hired to work on security-related facets of the application. Instead of the new developer having to navigate among a thousand different files trying to sort out relevant code, he or she may simply use the tag navigator (e.g., select "Security" tag) to select the appropriate facets of the application that pertain to security-related matters, as illustrated in FIG. 4E. By using the metadata tagging facility of the present invention, the expert (producer) developer (i.e., the architect who has expert knowledge of the application) may offload his or her knowledge of the application back into the IDE, so subsequent (i.e., downstream) developers may immediately benefit from that. Additionally, since the metadata is maintained as a separate project, the tags are maintained in a repository that is subject to version control (i.e., with the benefits of auditing).

Figure 5A:
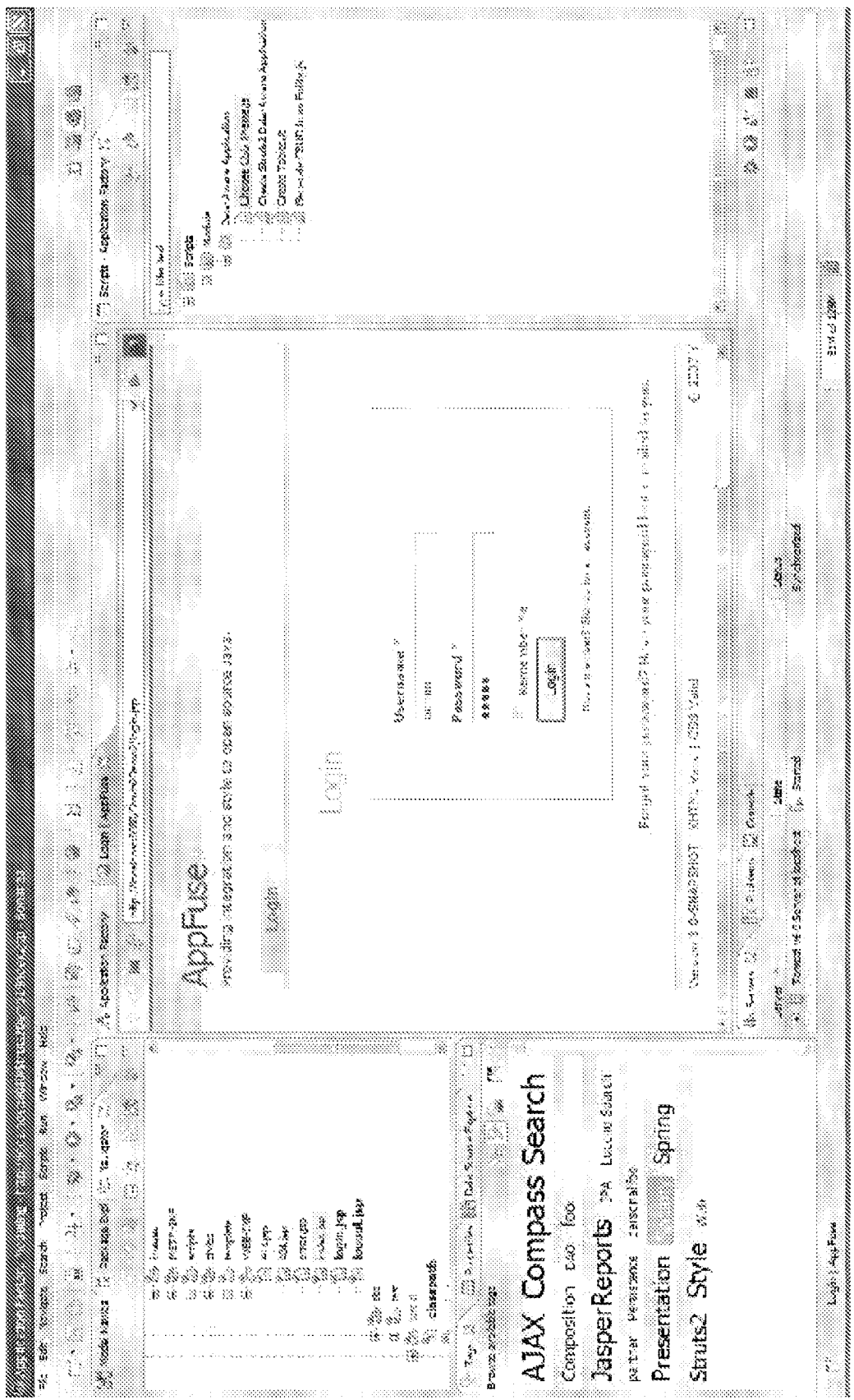
FIG. 5A-G are bitmap screenshots illustrating use of Application Factories with a bottom-up application framework for creating a sample application, for demonstrating Scripting and "Archaeology" features of the present invention.
Figure 5B:
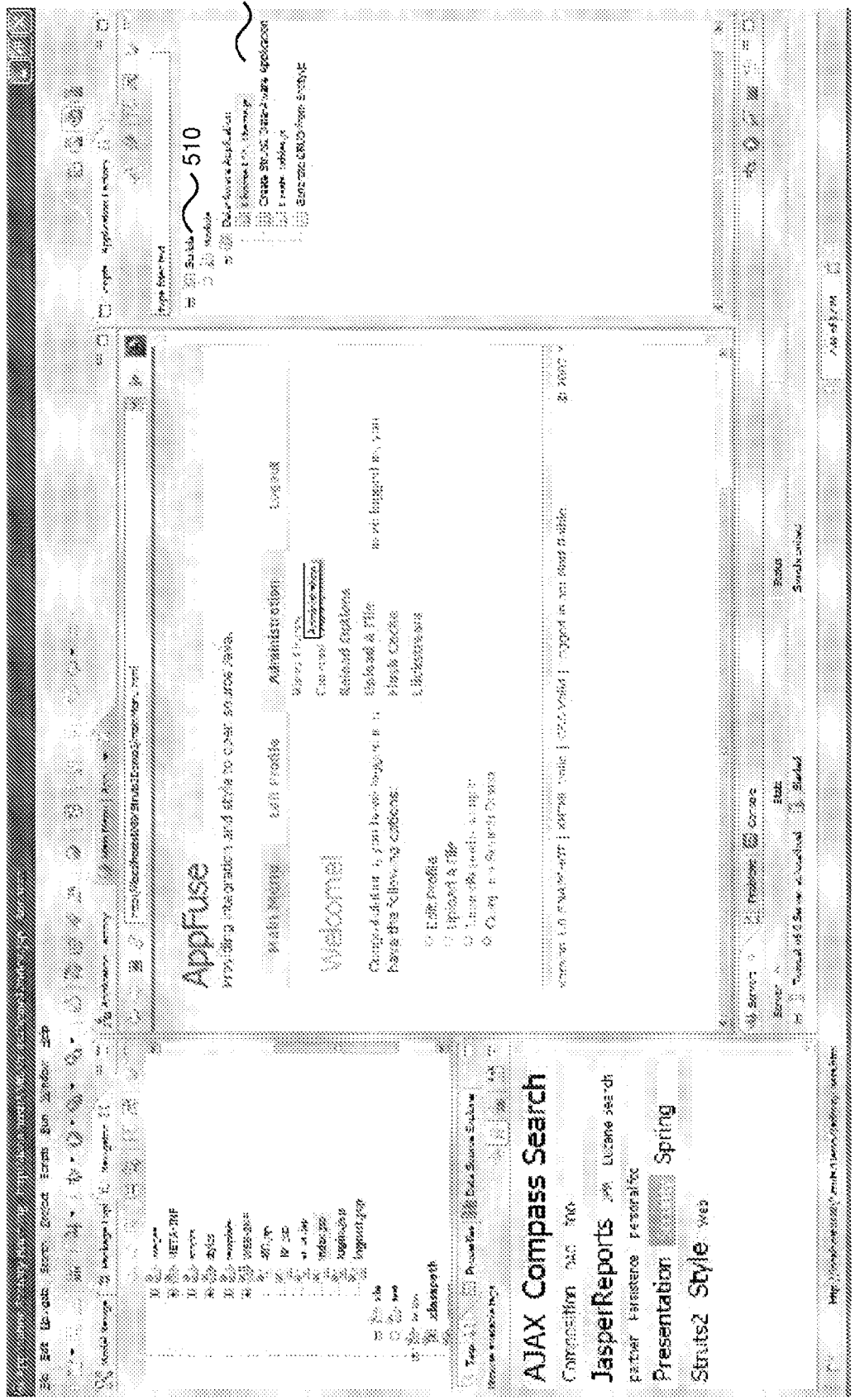

FIG. 5A is a bitmap screenshot illustrating running of the full-fledged framework application, in this example a bottom-up application named "AppFuse" that is an open source framework built using Java Struts. The example application in the figure presents an initial login screen as illustrated in FIG. 5A, whereupon after a successful logon the application displays its main user interface as illustrated in FIG. 5B. The following discussion will use this example application to demonstrate how to change behavior using Application Factories of the present invention.

Figure 5C:
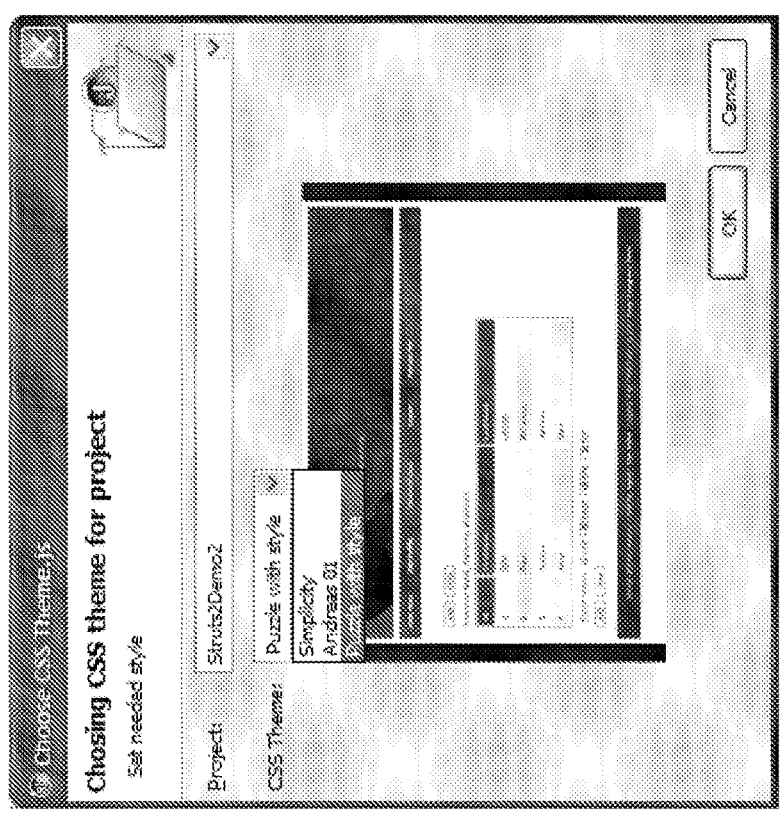
Figure 5D:
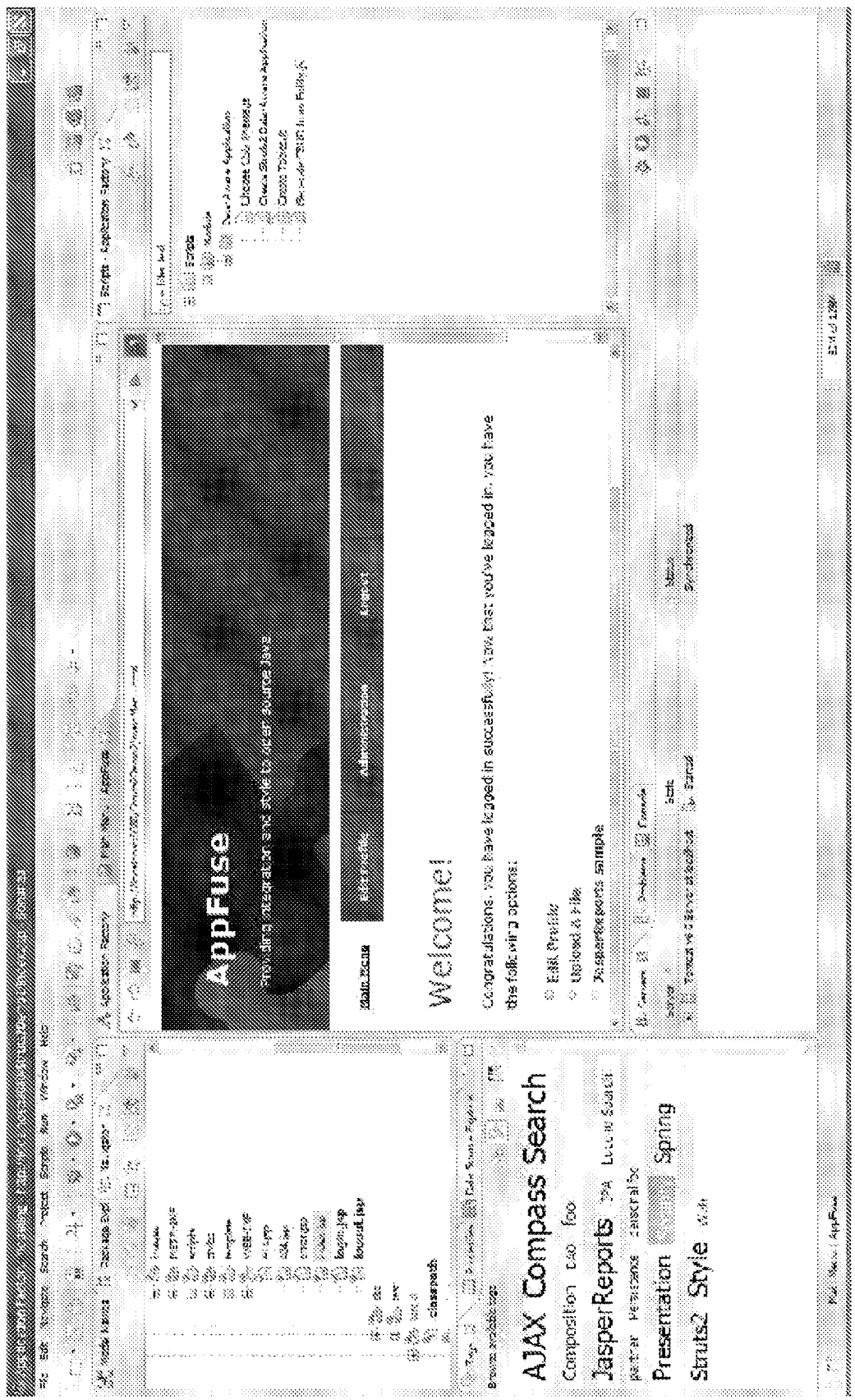
Figure 5E:
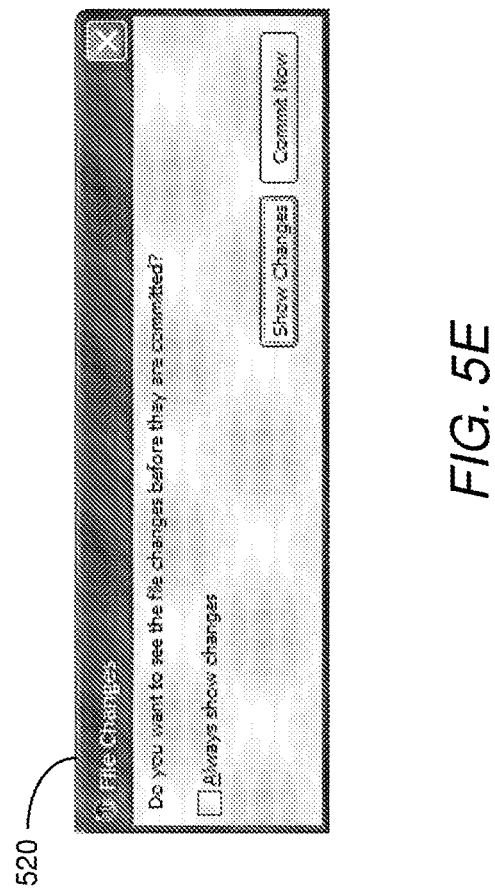

Consider the task of changing the style (i.e., Web application cascading stylesheet) for this example Web-based application. A traditional IDE by itself knows nothing about the application under development, and thus would not be able to help with this task. However using Application Factories of the present invention, once a given module is created the developer may add additional behavior that facilitates future development of the application. Thus in the present example of changing the application's style, the producing (architect) developer may use built-in support provided by the Application Factories to create behavioral scripts (e.g., Scripts 510, shown in FIG. 5B) that facilitate a desired action (e.g., changing style). For example, to facilitate the task of changing the style of the application, the producing developer may create the "Choose CSS Theme" script 511, as shown. (In the currently preferred embodiment, scripts are created using JavaScript.) The follow-on (consuming) developer may run a given script by selecting it (e.g., double clicking on it) in the user interface. For instance, upon the developer selecting the "Choose CSS Theme" script 511, the IDE launches the corresponding JavaScript applet, as demonstrated in FIG. 5C. Here, the JavaScript applet displays an initial dialog box that allows the developer to select a new style simply by filling in selections presented by the dialog box. Once the developer has entered the desired choices, the effect on the application may be determined by re-launching the application with its new style, as shown in FIG. 5D. If the developer is happy with this change, he or she may commit the change (i.e., to the underlying project files) as shown by the confirmation dialog box 520 in FIG. 5E. As also shown in FIG. 5E, the developer may invoke a "Show Changes" option to see exactly what source code is being changed.

Figure 5F:
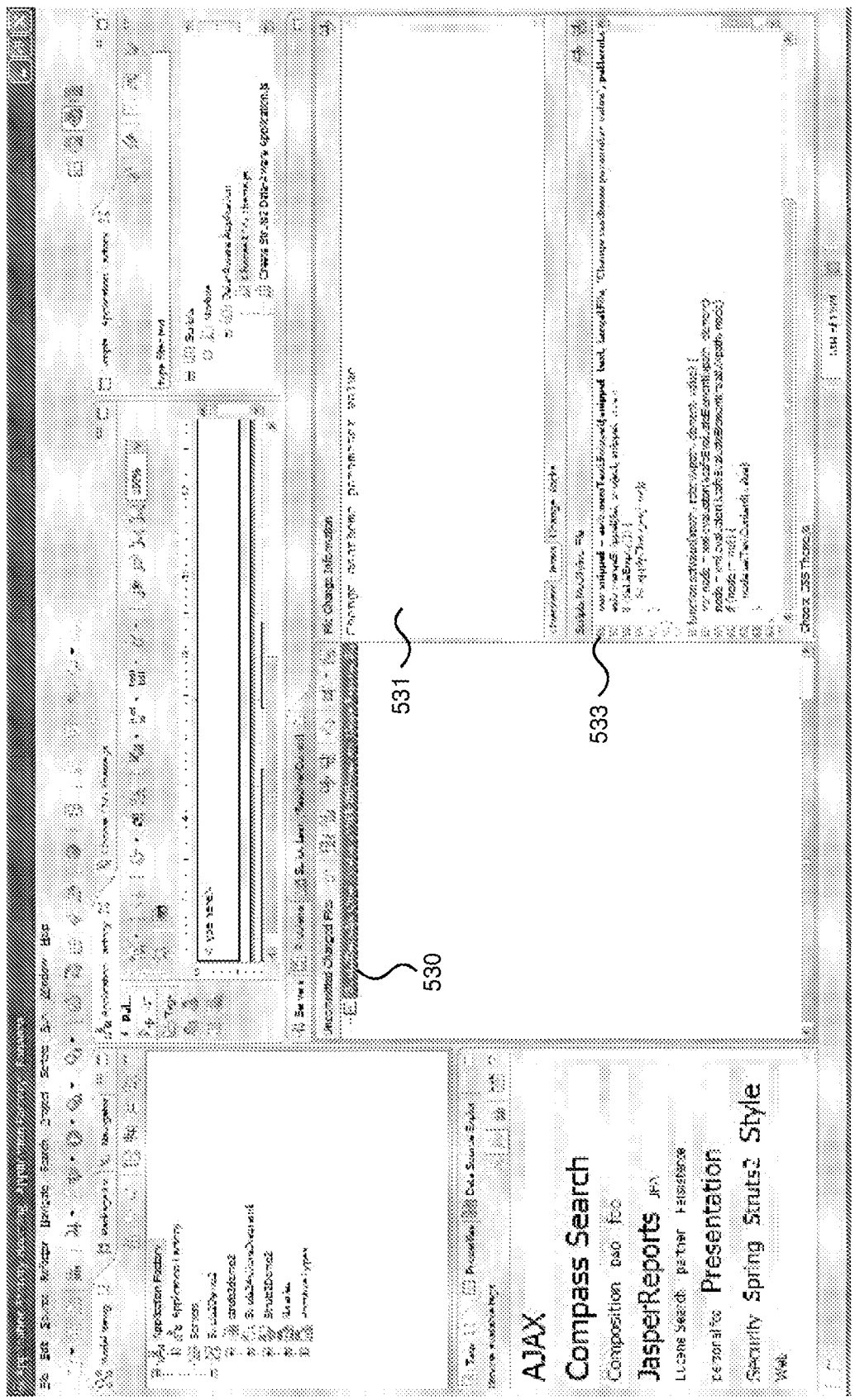

The use of scripts in the system is not static but is instead a dynamic, constantly evolving process. FIG. 5F illustrates a Scripts/Learn/Resolve mode that is used to modify and/or accept the scripts over time, for learning the appropriate behavior. The Scripts Learn/Resolve/Commit view is a tree-view list of files, associated script(s) and snippet(s) that need to be resolved. This view is similar to the VCS synchronization view in Eclipse. Along with the entry in the Scripts Learn/Resolve/Commit, a description for each change is displayed in a wrapped text format. The file list pane has a toolbar for various resolution options (commit all changes, discard all changes and so forth.) The file list uses different markers to indicate missing resources and the level of confidence for the change. Double-clicking on an entry in the file list tree view opens the script in the Script Editor in a right-hand pane. The Diff view is displayed below the file list and Editor panes.

As shown, the developer need not accept the provided scripts as they were originally written but may instead modify them as required. When the developer modifies a script, the system indicates the file that is changing (in the list 530), the reason why the file is changing (File Change Information 531), and the specific source code changes themselves, as shown by changed the source code 533.

Figure 5G:
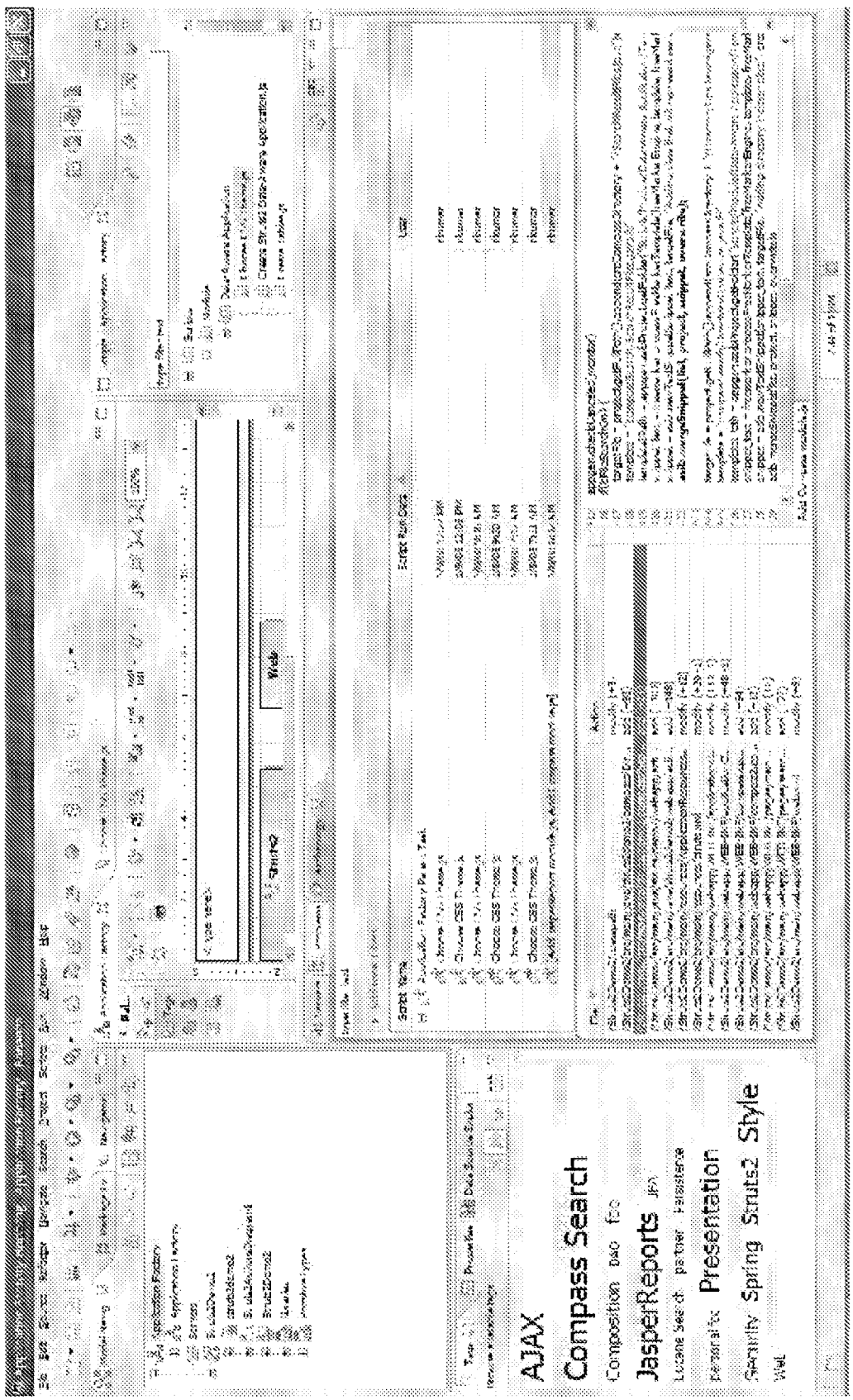

Similarly, the developer may invoke an "Archaeology" feature (accessed by right clicking on a metadata node and selecting "Archaeology") to determine why certain code came into being. As shown in FIG. 5G, the Archaeology future displays an audit list of changes made to the source code files. The Archeology view displays script runs for a file, runs for a single script and script runs for the Application Factory project. The Archeology view allows for navigation (browser style to navigate between filtering contexts). The archeology viewer functionality allows one to display script runs for a file, runs for a single script and script runs for the project. The script runs can be filtered by date, author and script name. Display details for each script run are also provided. Such details include the list of files affected by a selected script run, and the script associated with each file change (with the script scrolled to the appropriate line which changed the file).

The foregoing example demonstrates execution of a script that provides behavior which is very specific to this particular application under development and which has been provided by the module producer (e.g., architect or original developer). In other words, instead of merely providing IDE-specific tools, the application project now includes application-specific tools. In this manner, the producing developer can offload back into the IDE his or her knowledge, in the form of navigational aids and behavioral aids that capture developer intent. Any downstream developer may benefit from the use of these application-specific aides.

Producer Mode/Role

Figure 6:
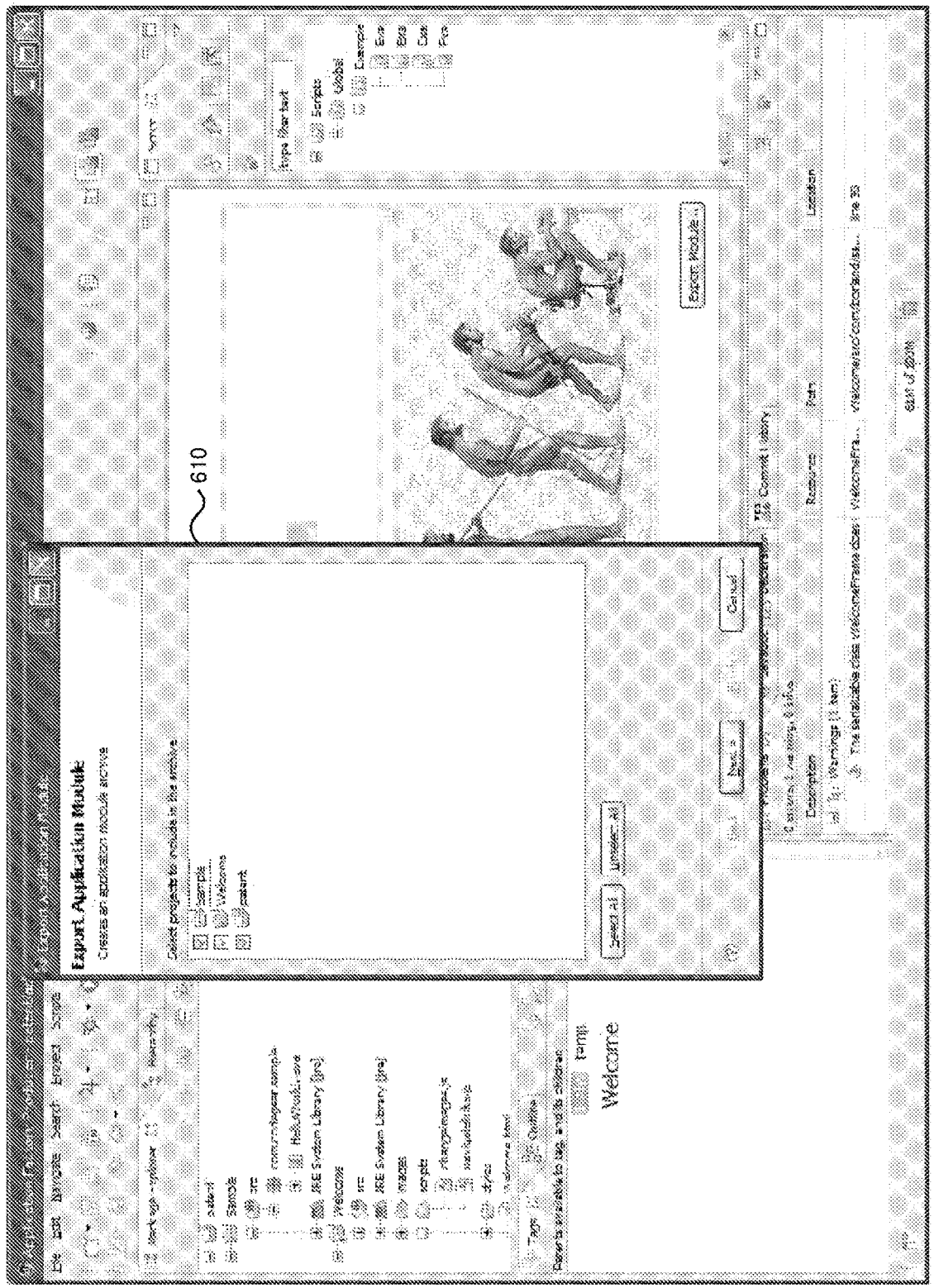
FIG. 6 shows an Application Factories Export dialog that is used to export one or more projects that are in the existing workspace.

To become a producer, a developer basically wraps logical groups of functionality into scripts, creates tags to completely reflect the application, adds tag metadata and creates a white board diagram and any "cheat sheet", and then exports the application with metadata into modules. Thus, the Producer mode substantially overlaps with the previously demonstrated Consumer mode, with creation and use of scripts, tags, and metadata. However, in Producer mode, the developer explicitly exports or publishes modules for use by others. A producer can publish modules using the Export Application Module wizard (File Export Application Factory Export Application Module). This wizard creates a Module ARchive (.MAR) file that includes all projects in the current workspace. Thus, an Application Module is created by exporting one or more projects. For example as shown in FIG. 6, an Export dialog 610 is used to export one or more projects that are in the existing workspace. The Modules can either be in folders on a drive or out on the Web as ATOM/RSS feeds. On Export, the user can choose to export it as Atom/RSS and on import the user can configure any number of feed locations to pull from.

Example: Welcome Application

Figure 7A:
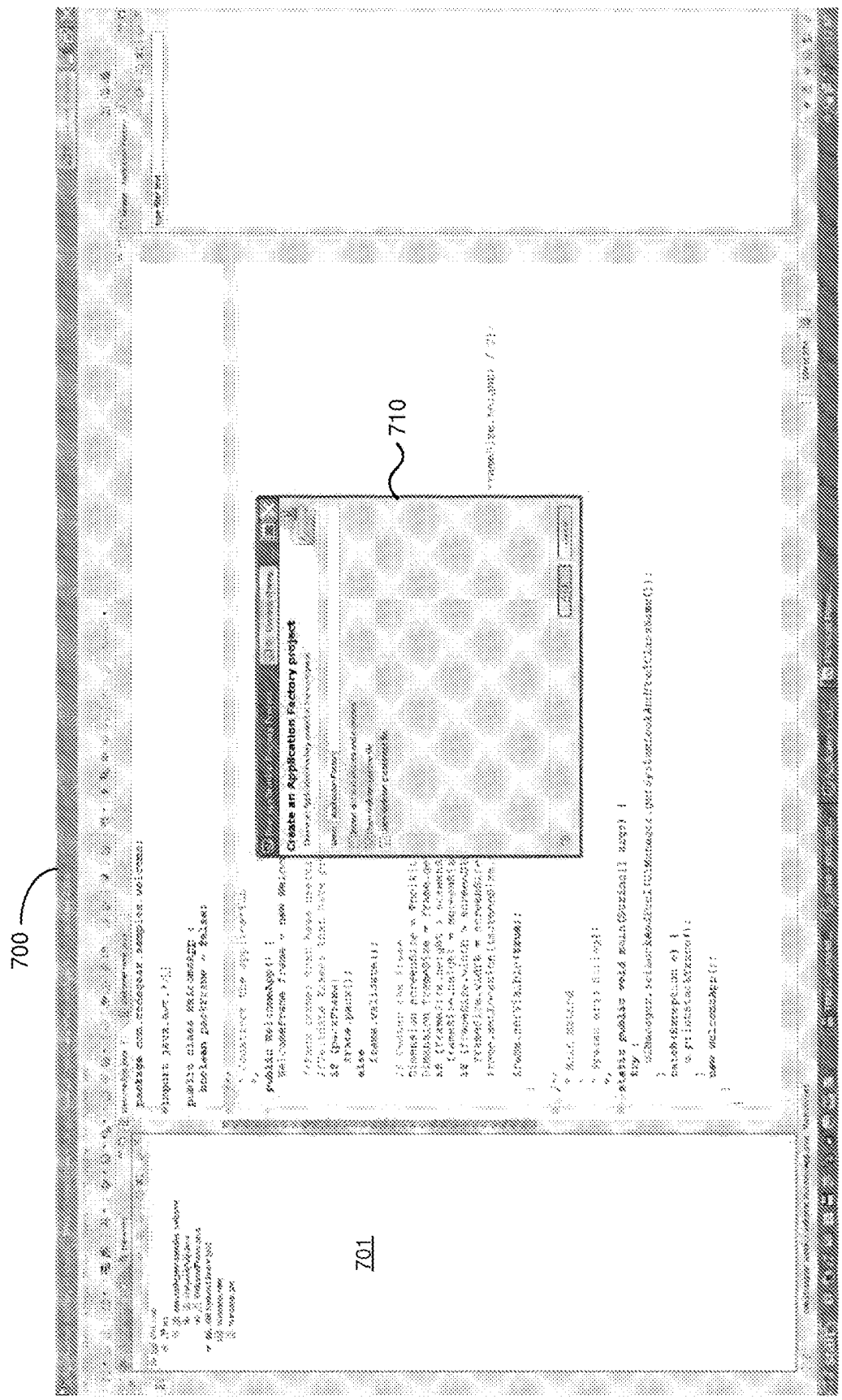
FIGS. 7A-T comprise a series of bitmap screenshots illustrating use of Application Factories to create a reusable sample ("Welcome") application.
Figure 7B:
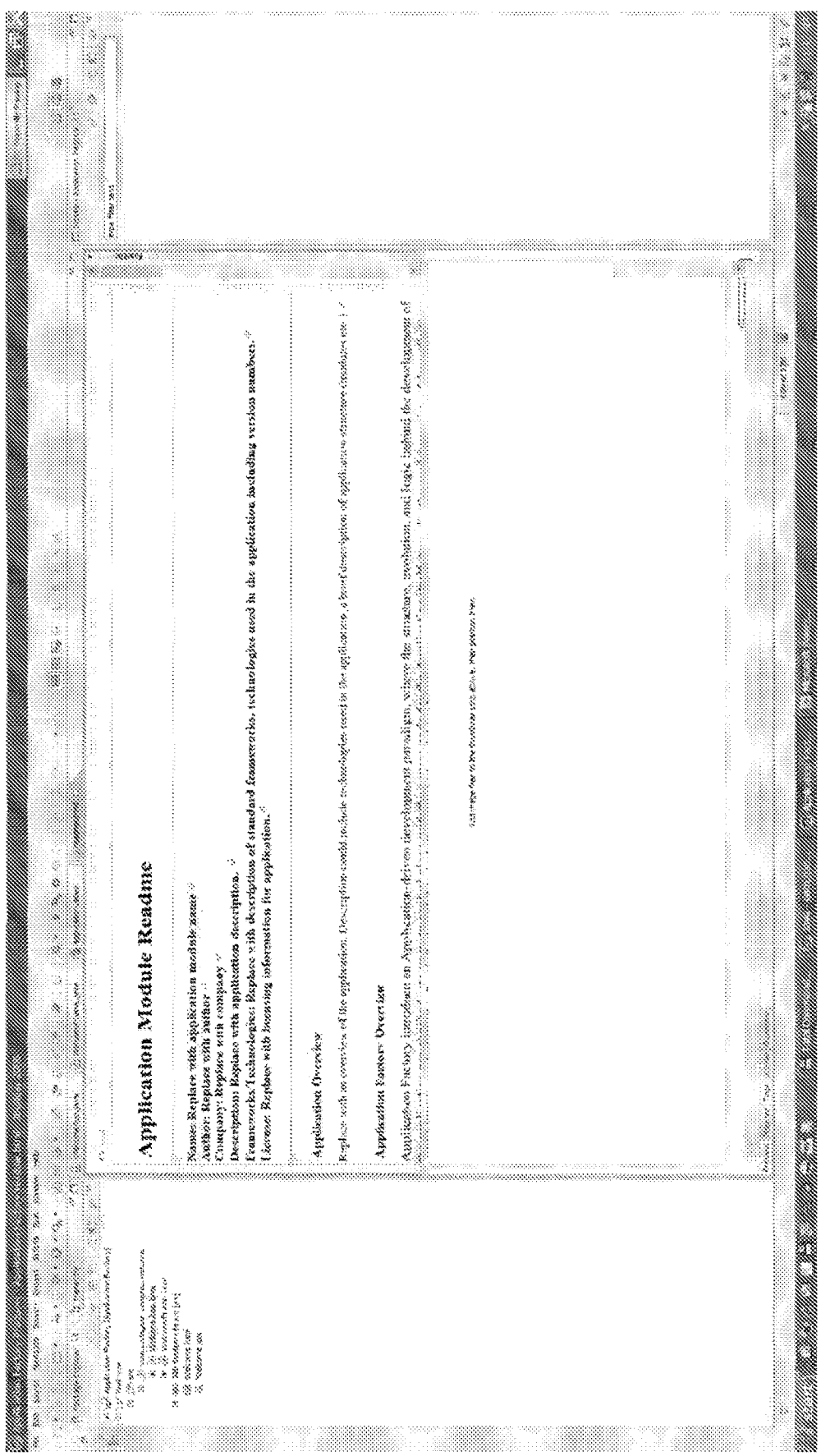
Figure 7C:
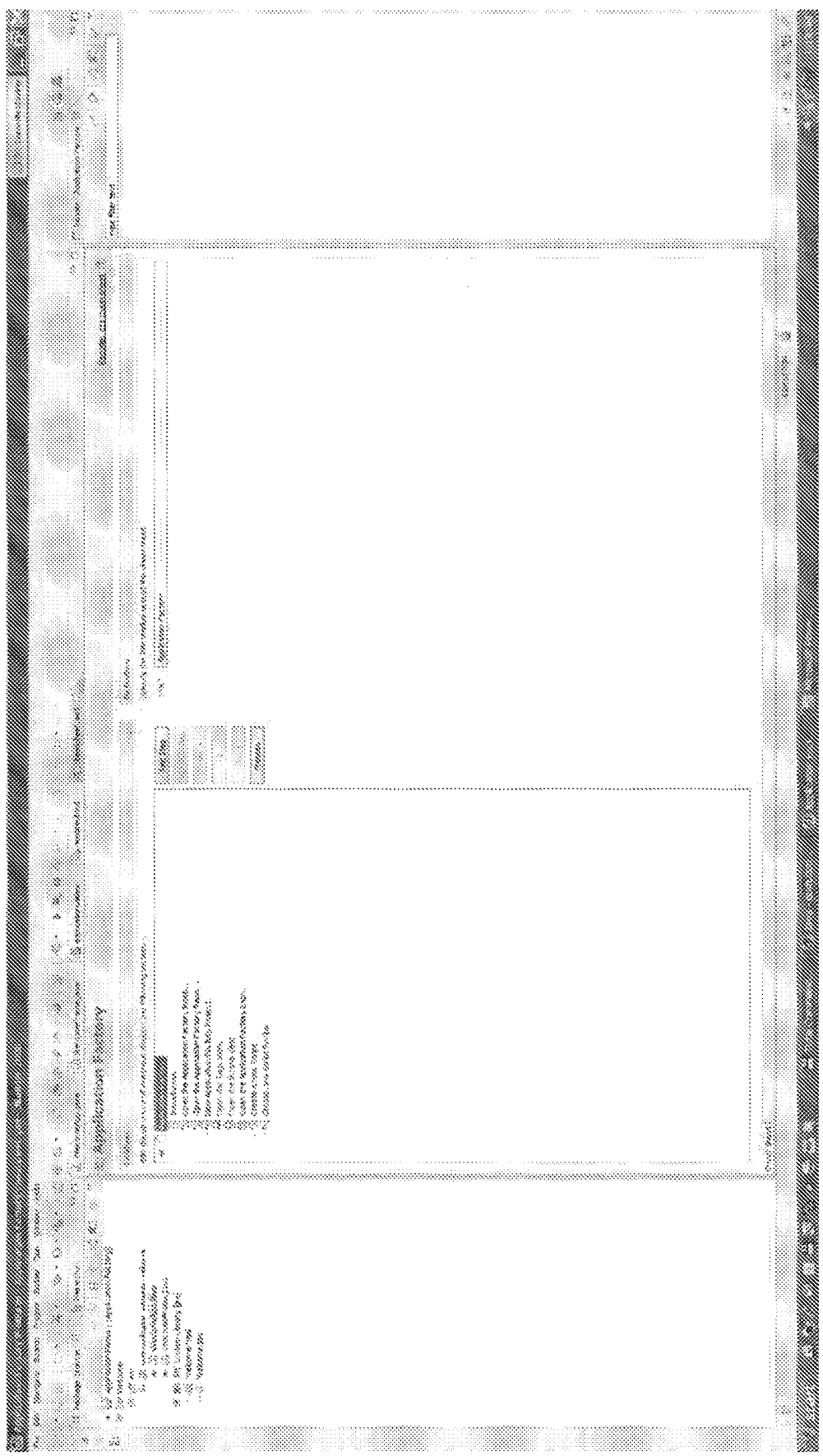
Figure 7D:
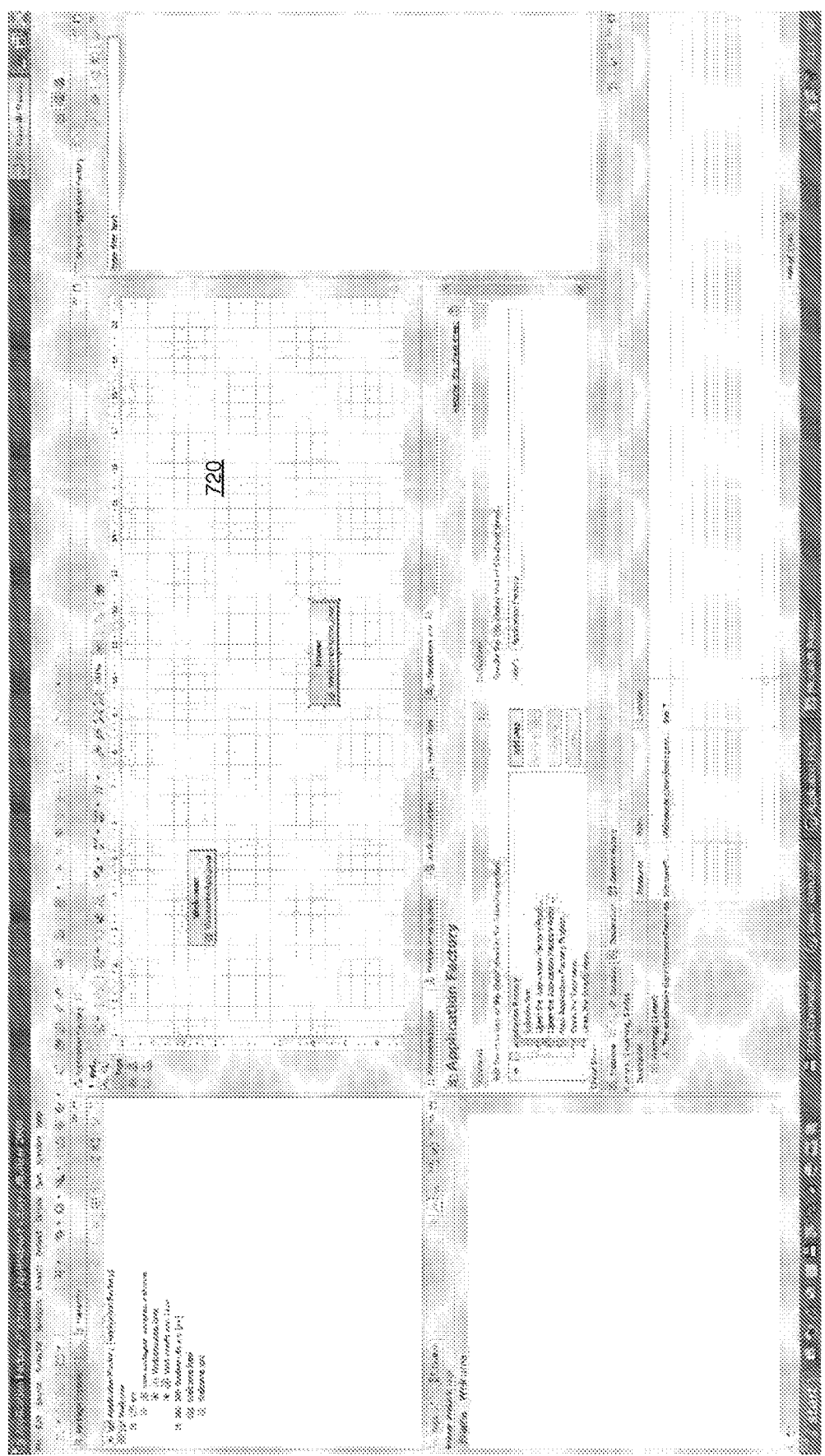
Figure 7E:
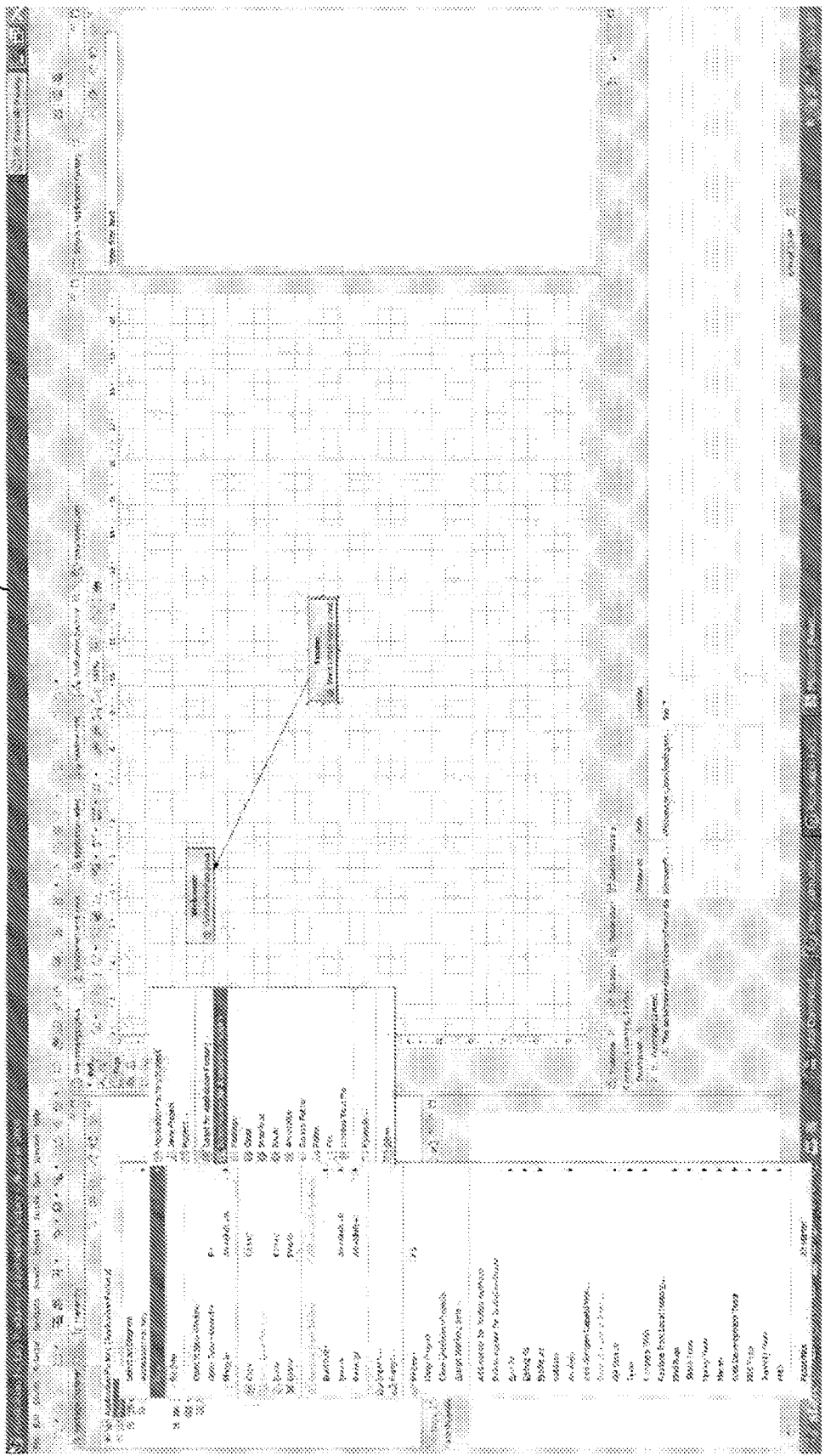
Figure 7F:
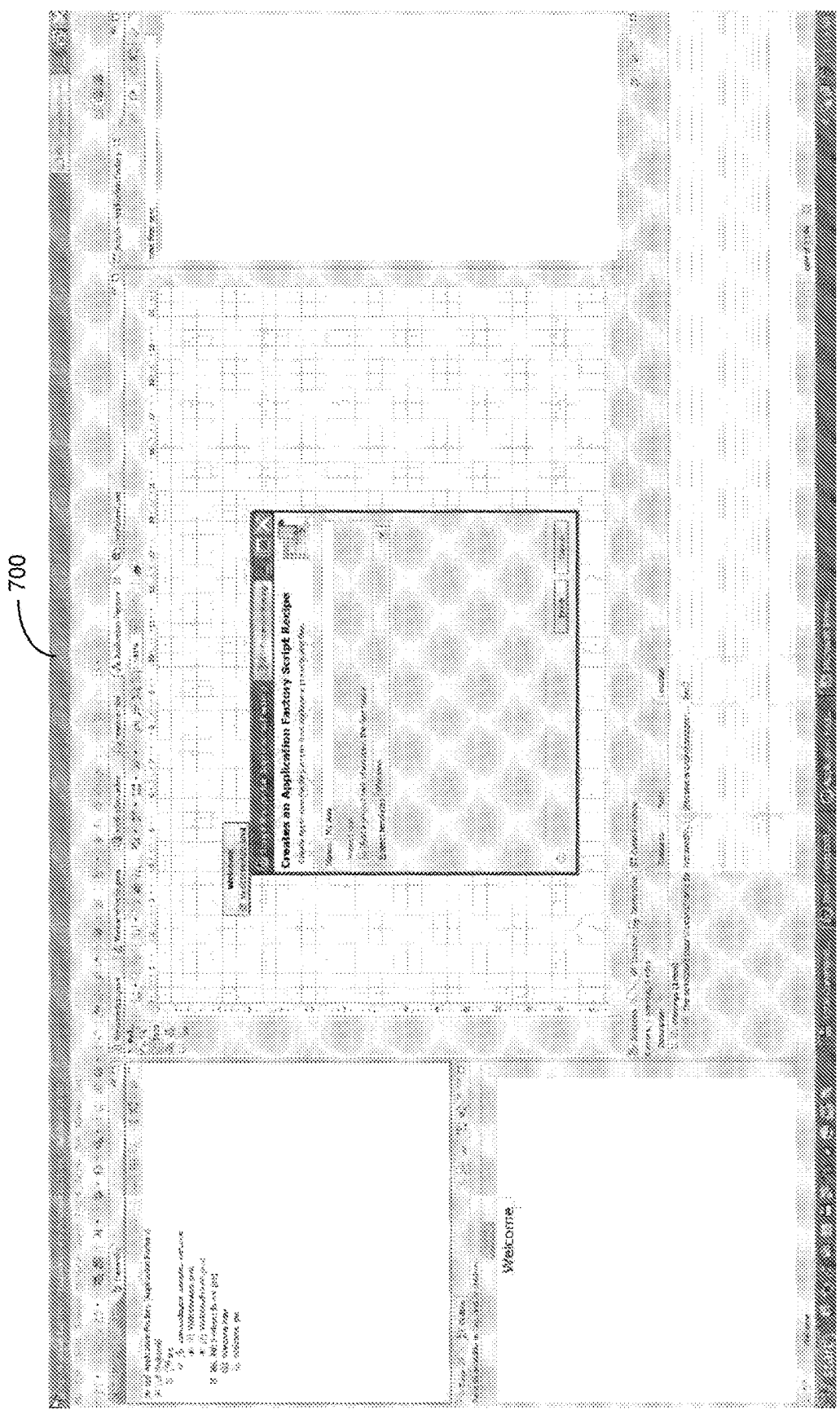
Figure 7G:
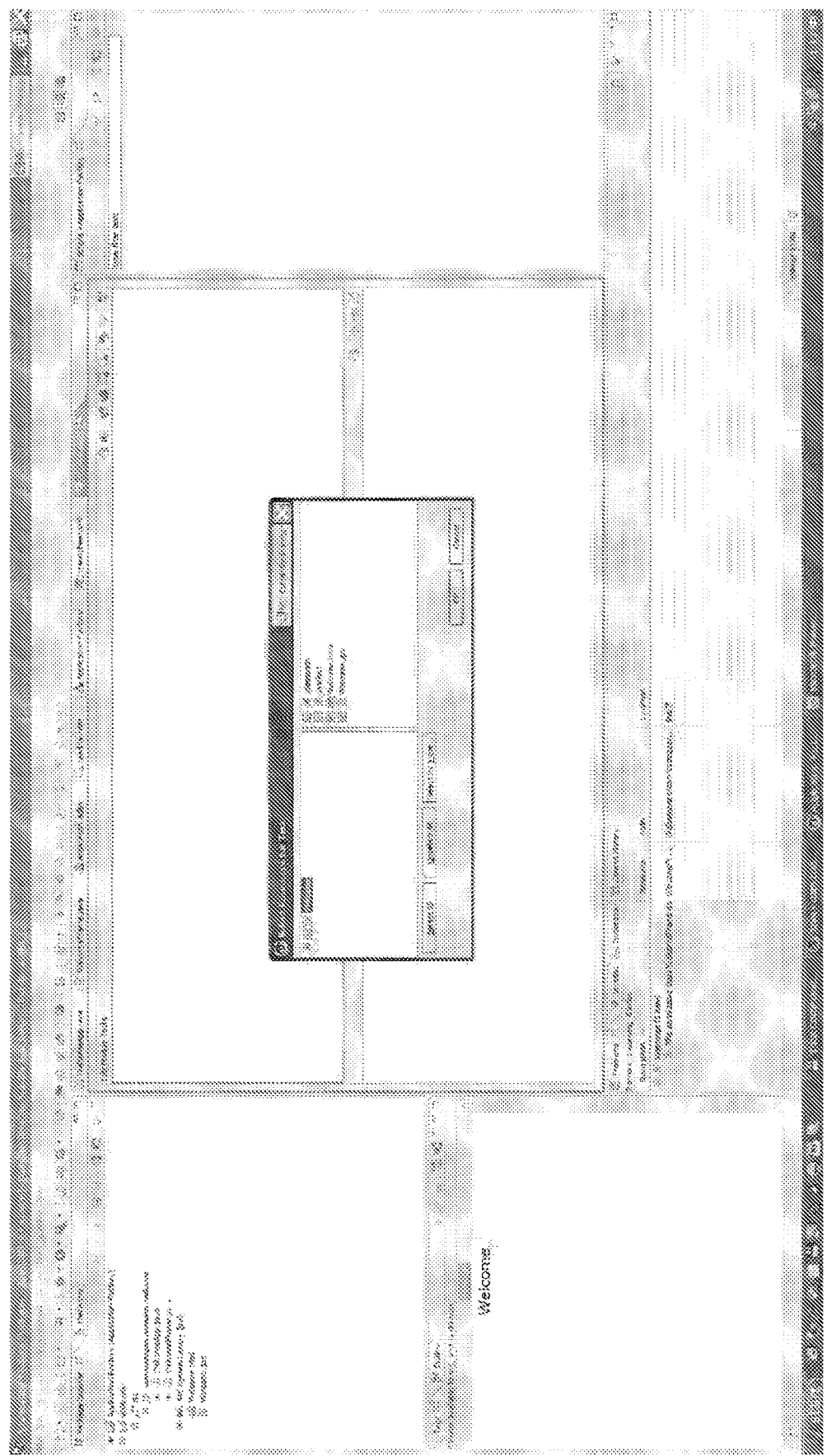
Figure 7H:
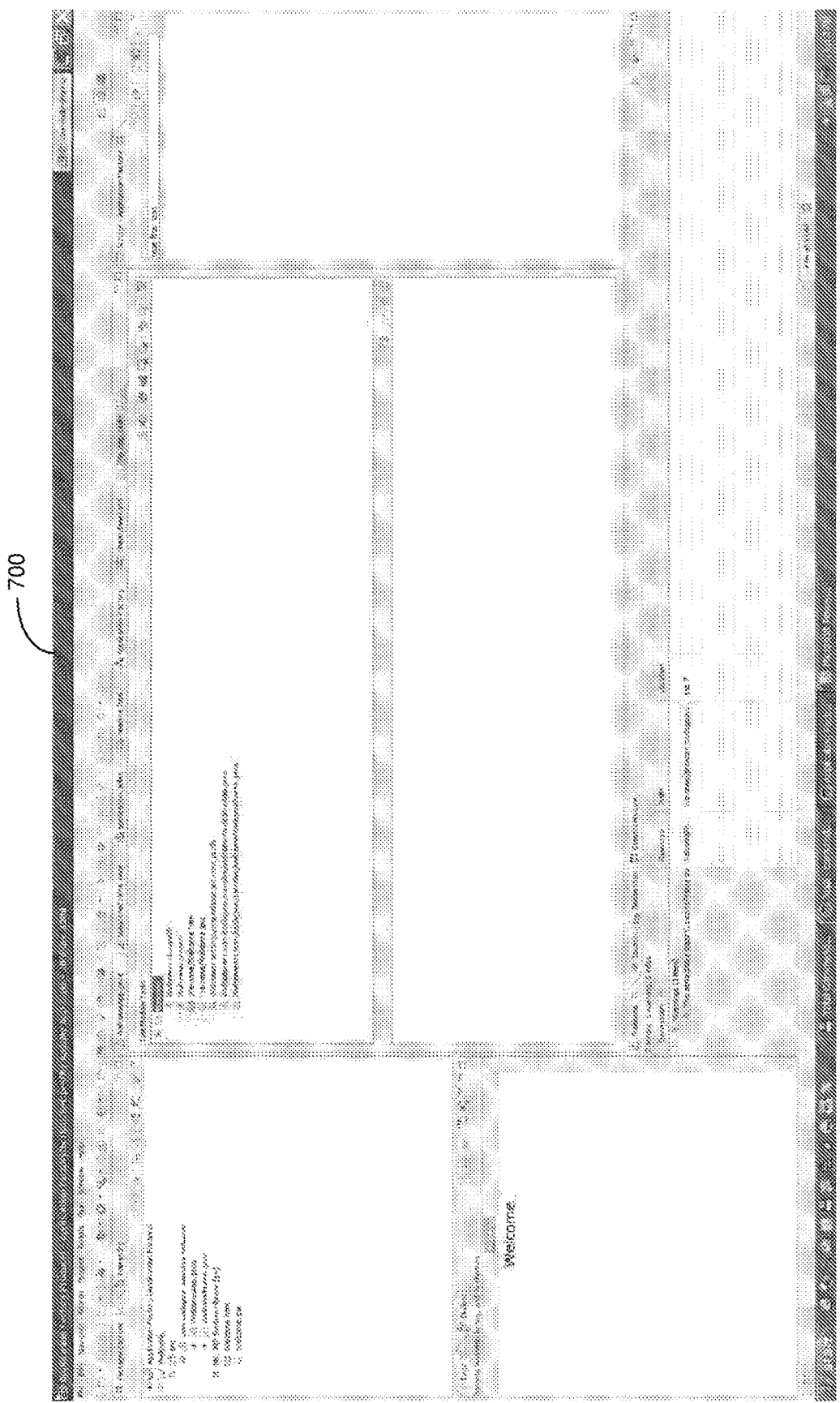
Figure 71:
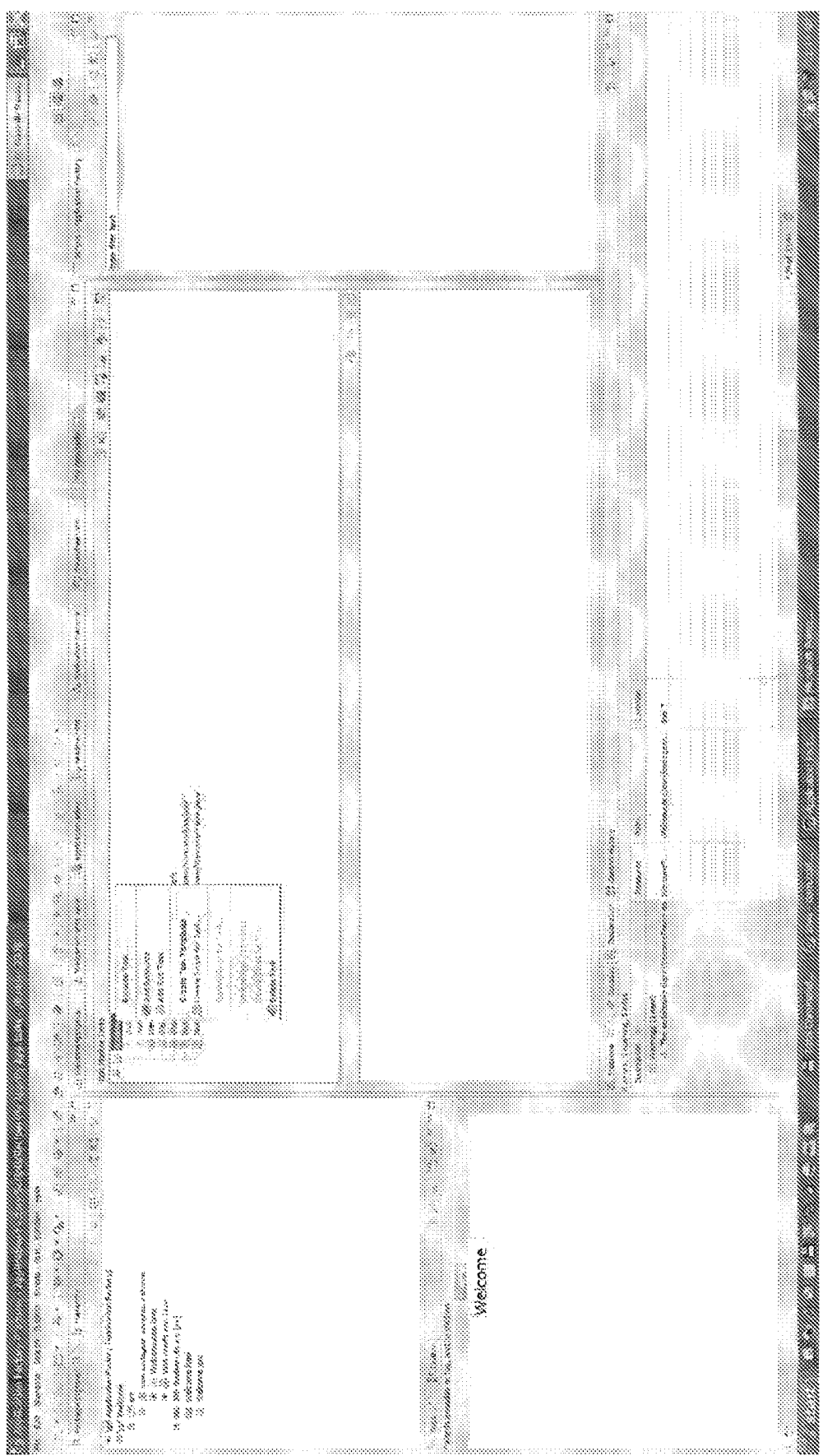
Figure 7J:
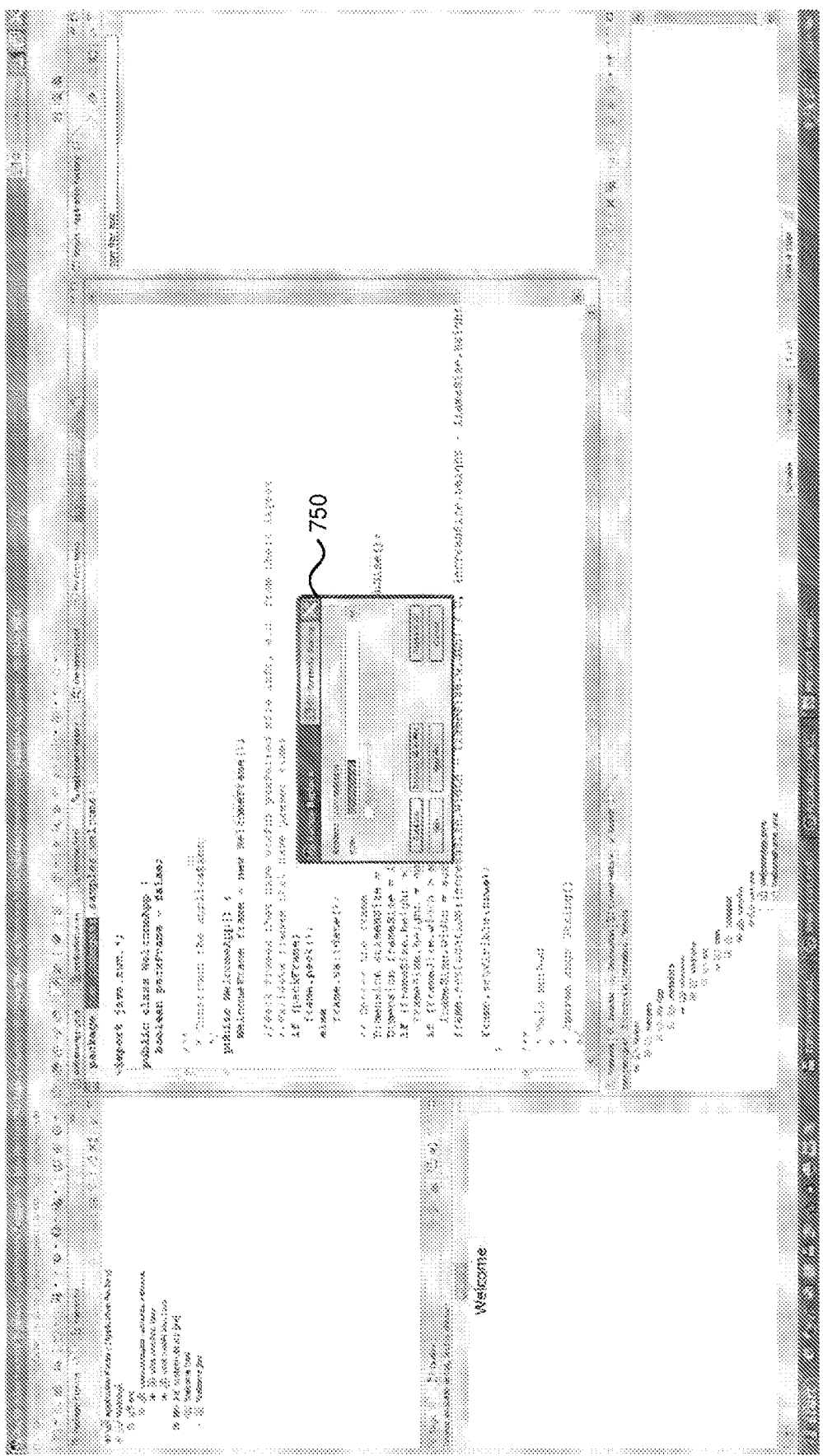
Figure 7K:
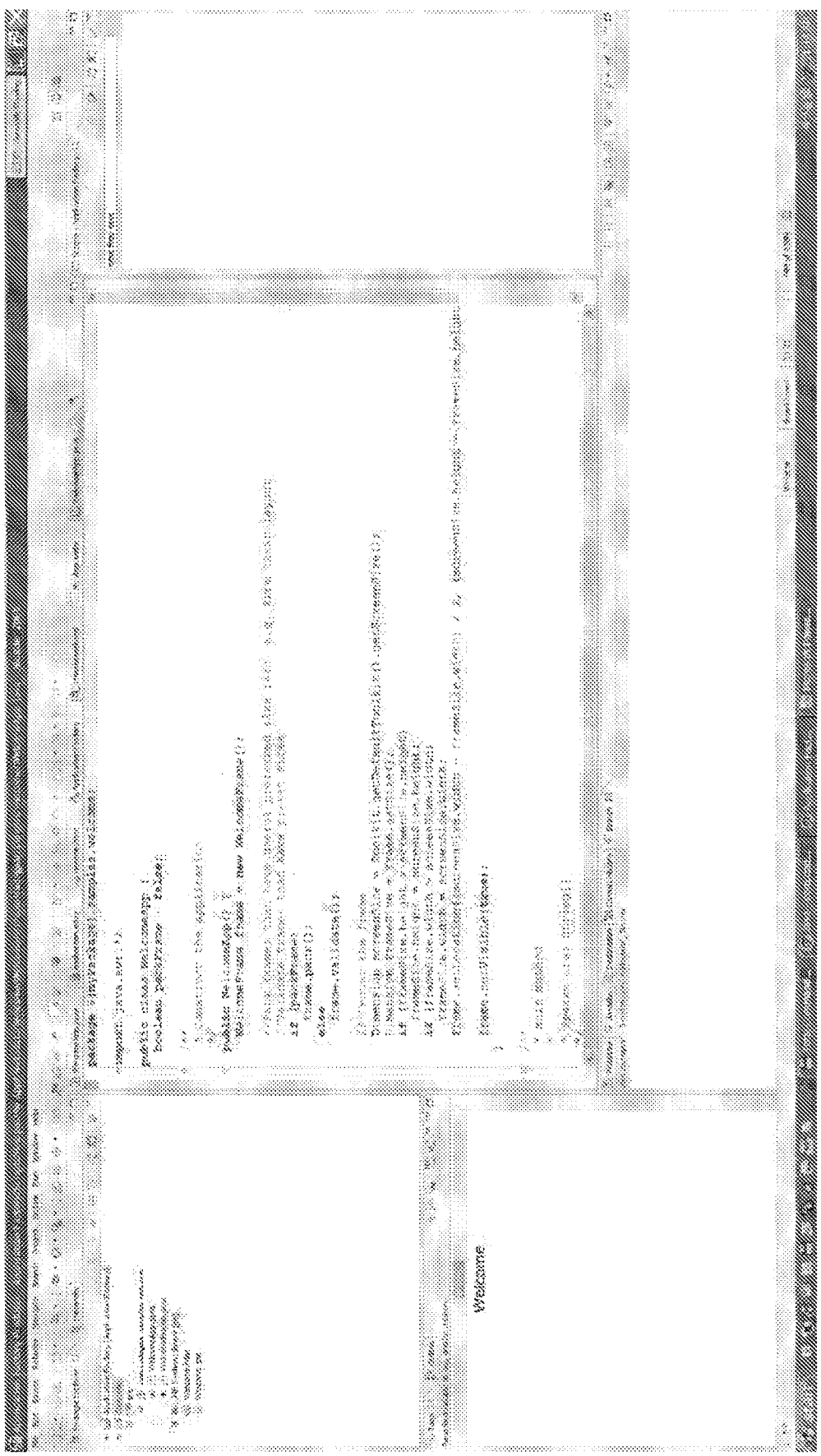
Figure 7L:
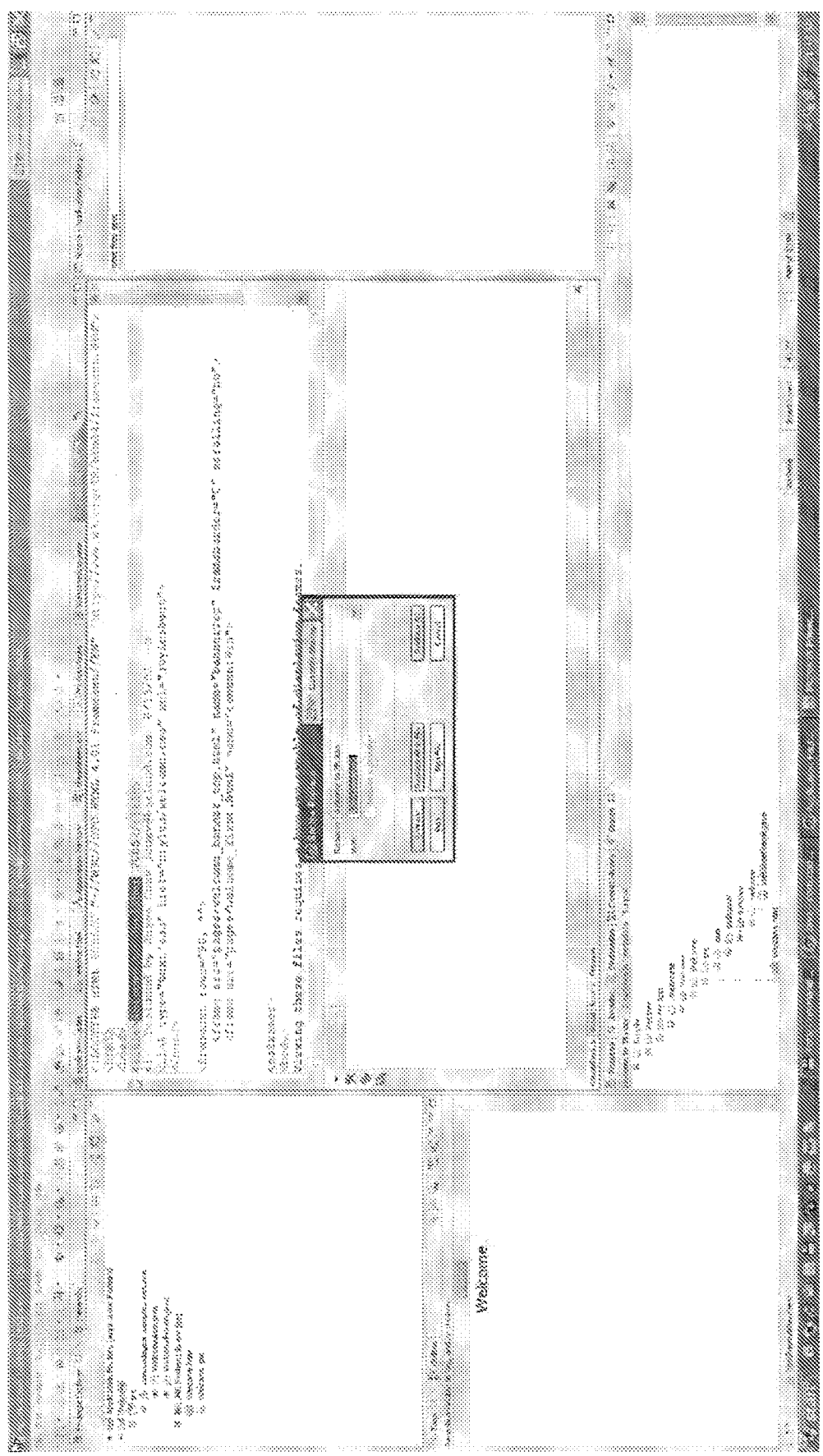
Figure 7M:
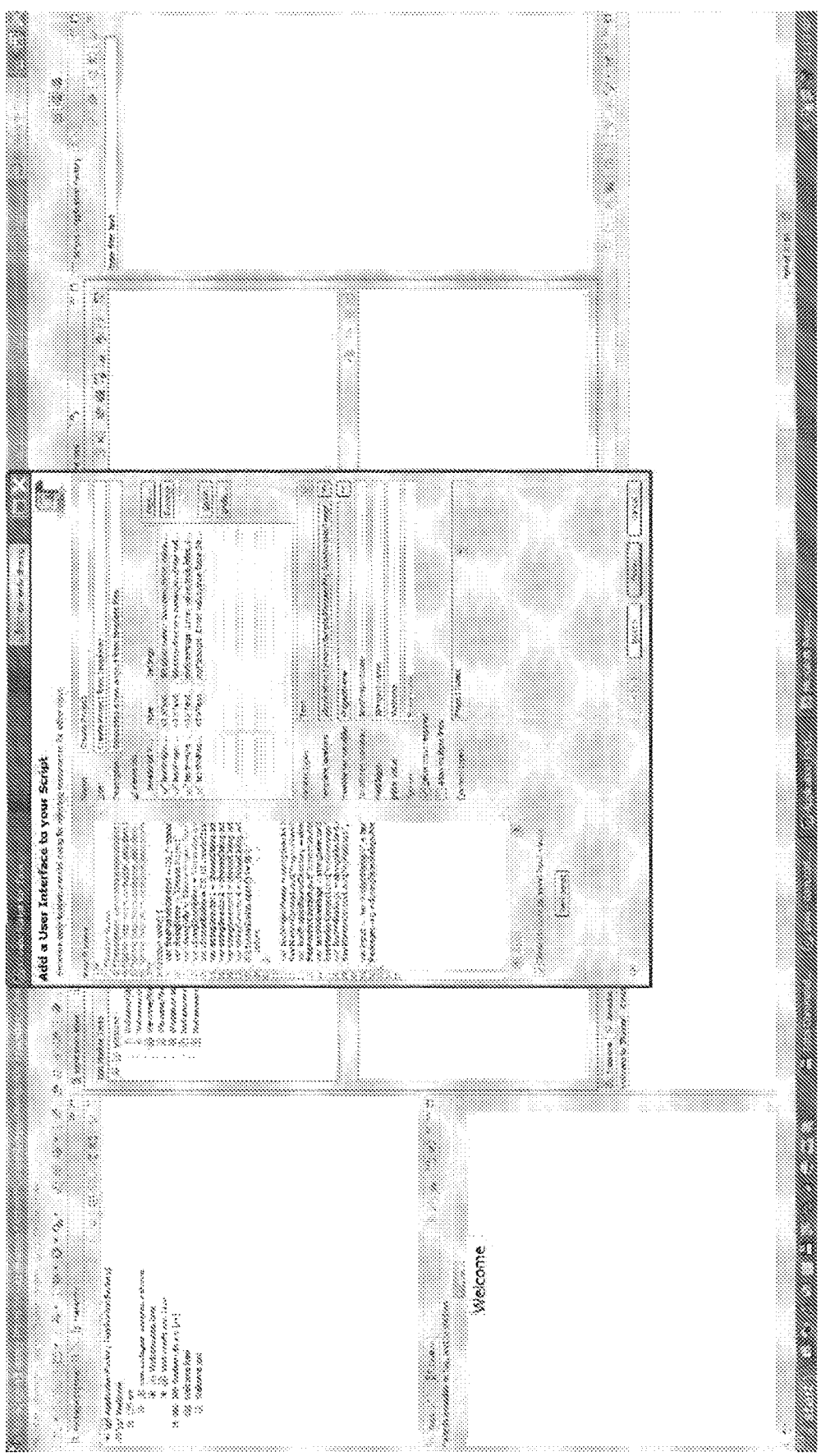
Figure 7N:
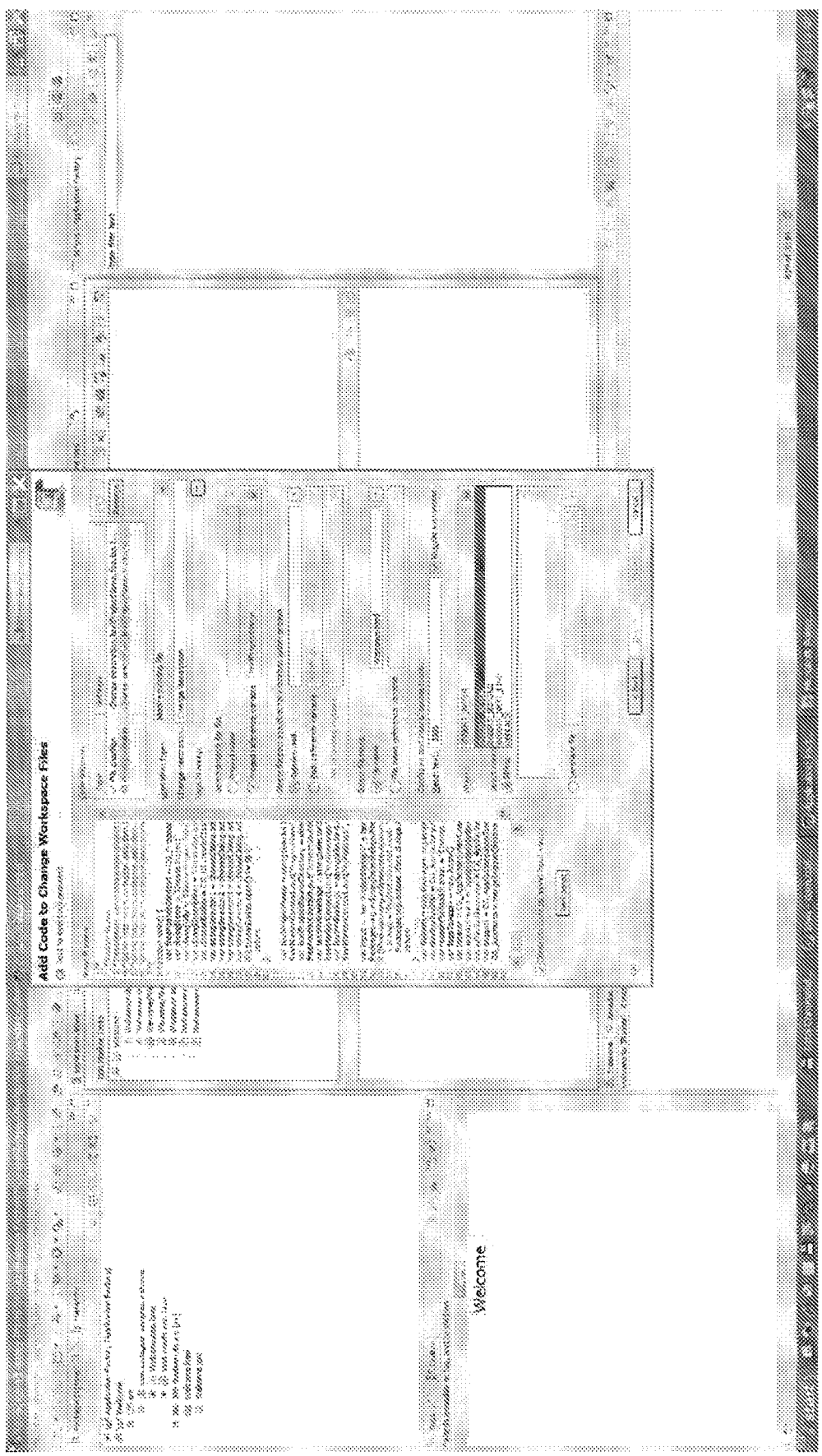
Figure 7O:
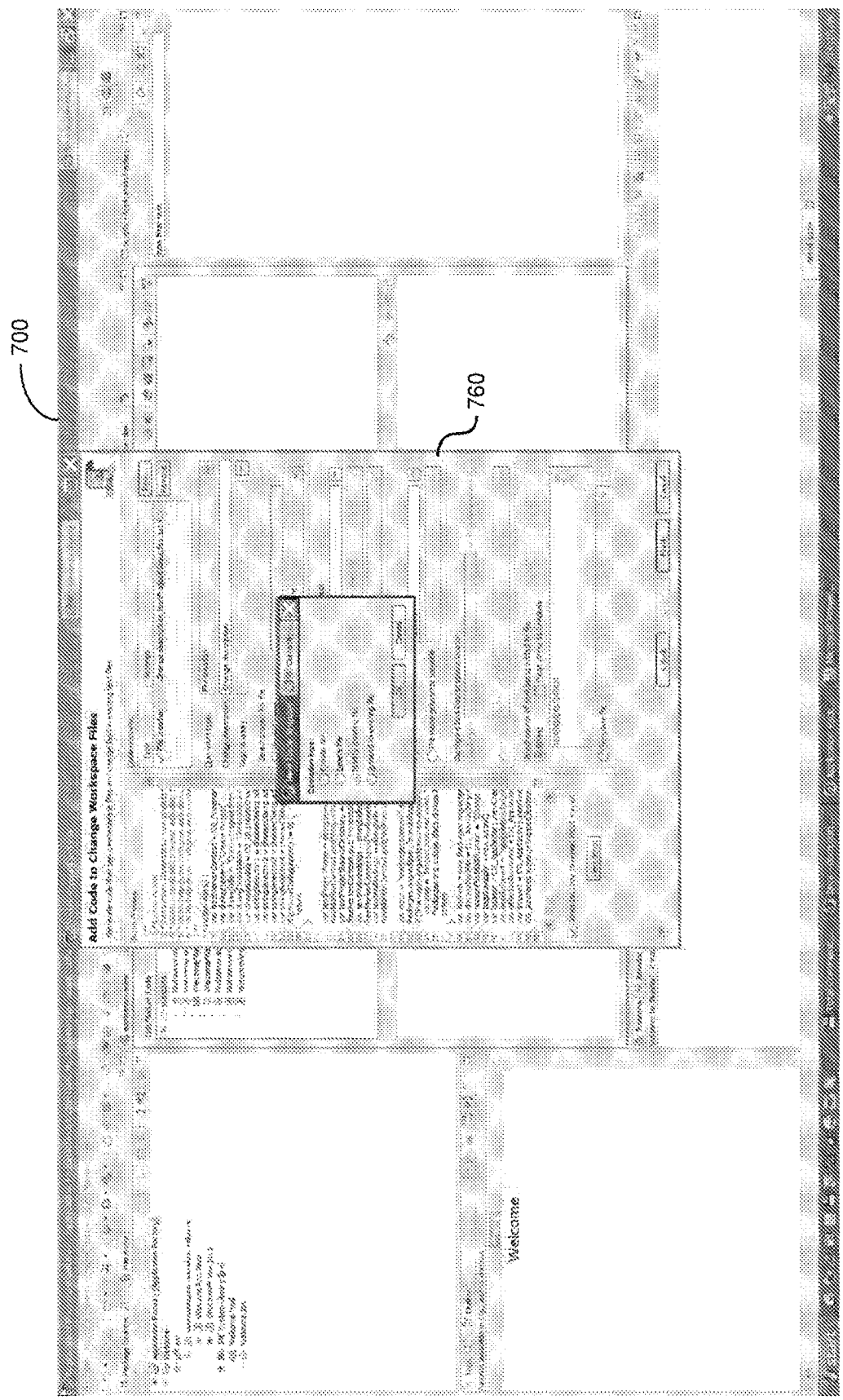
Figure 7P:
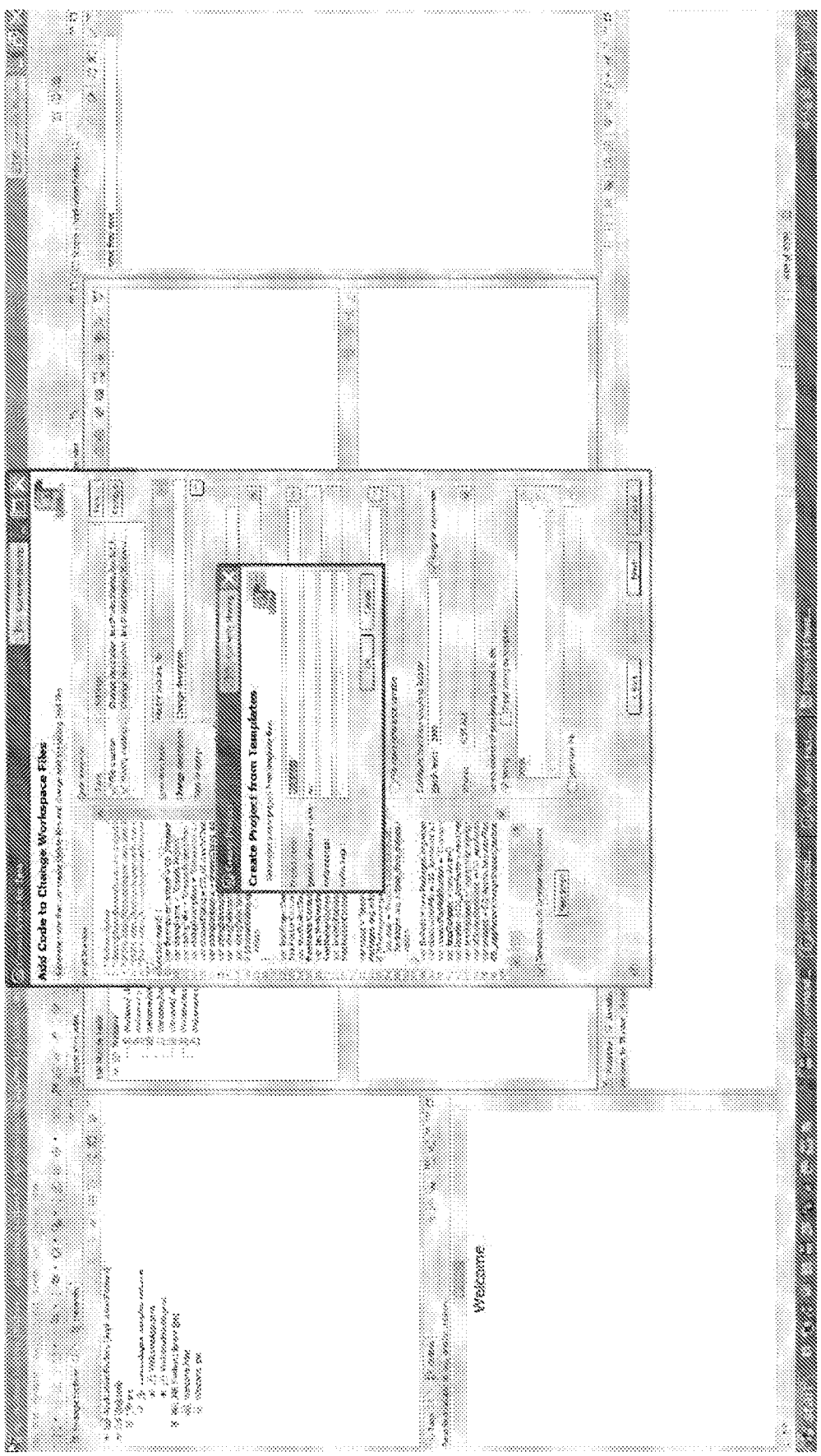
Figure 7Q:
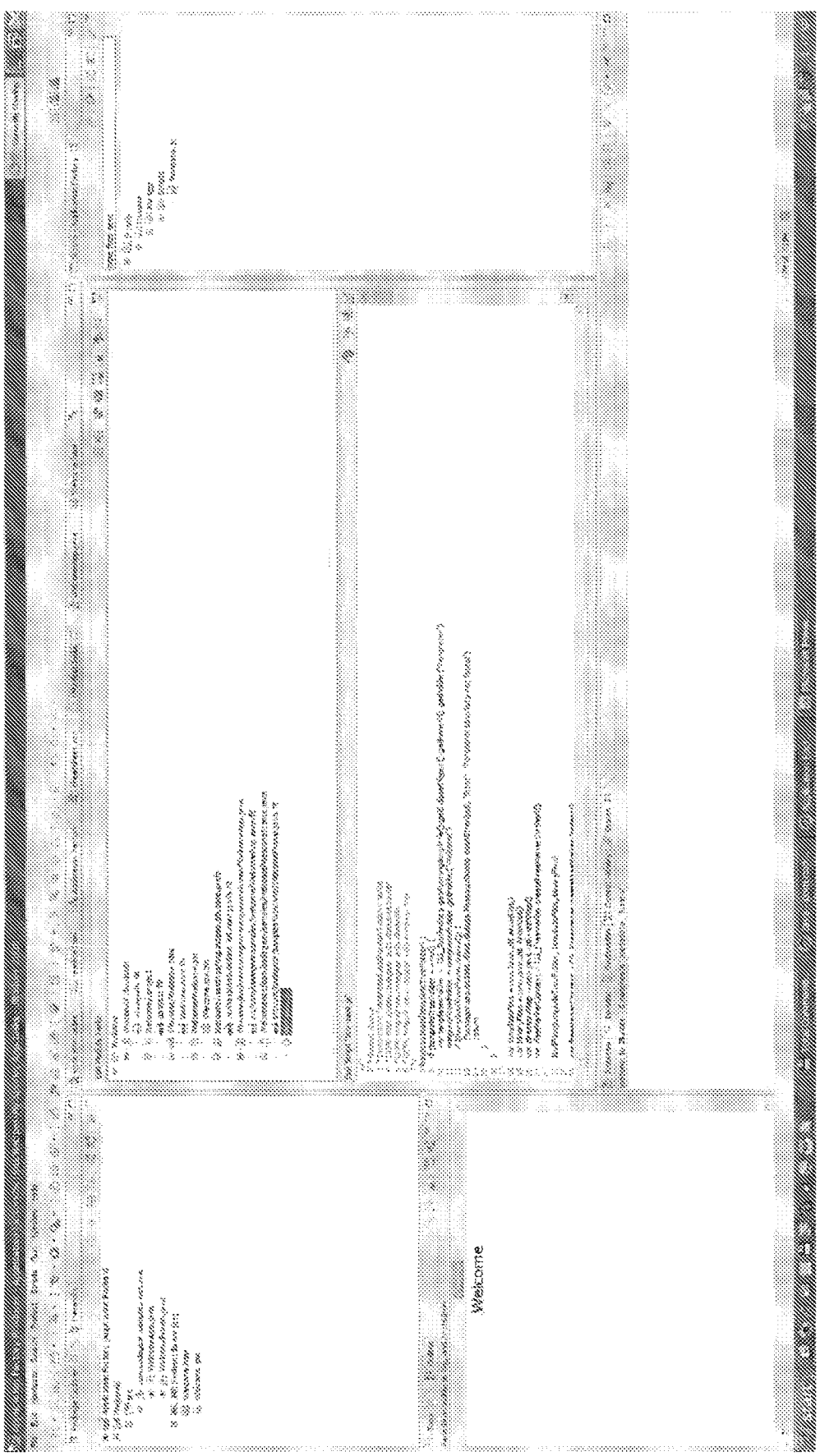
Figure 7R:
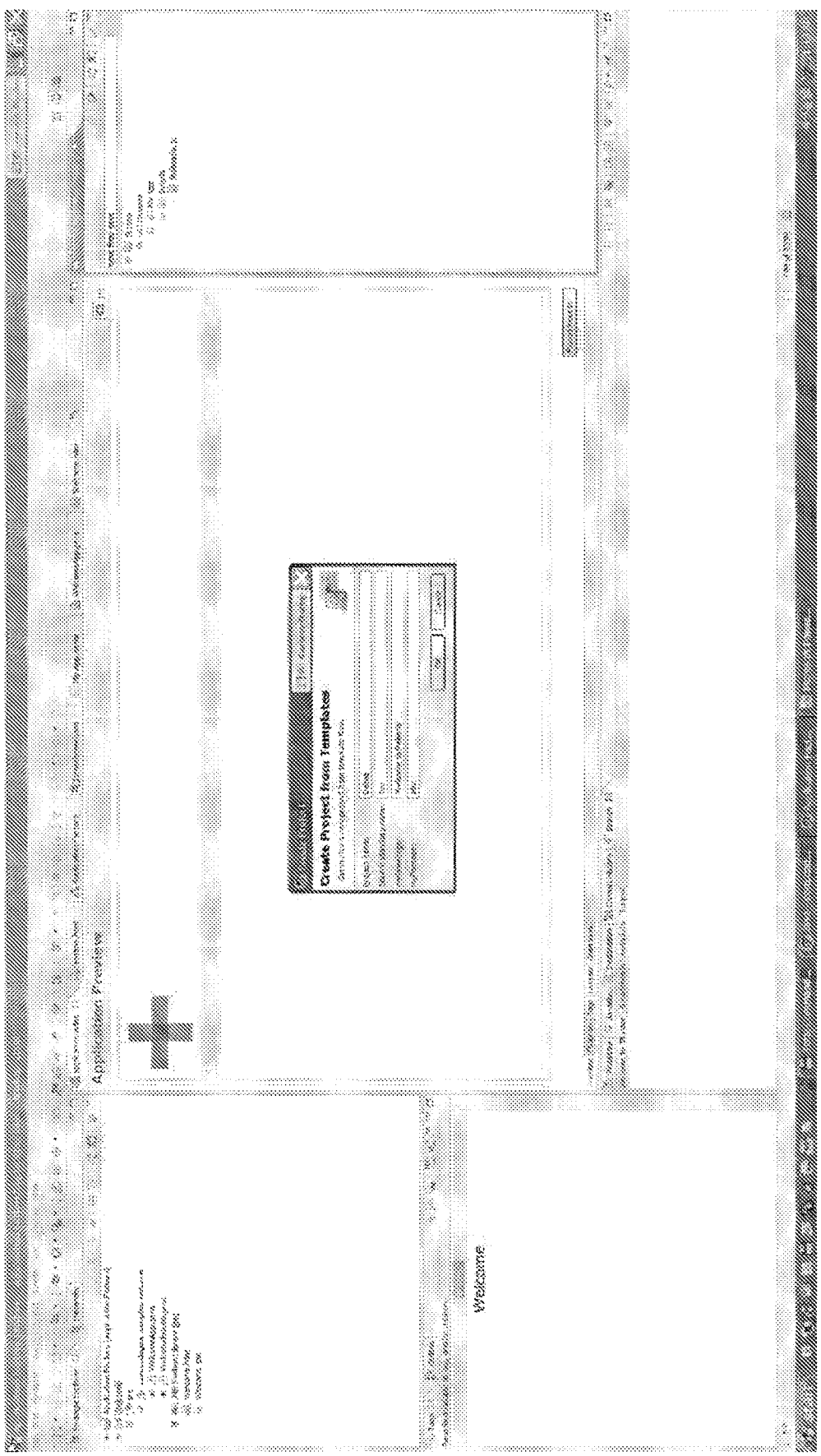
Figure 7S:
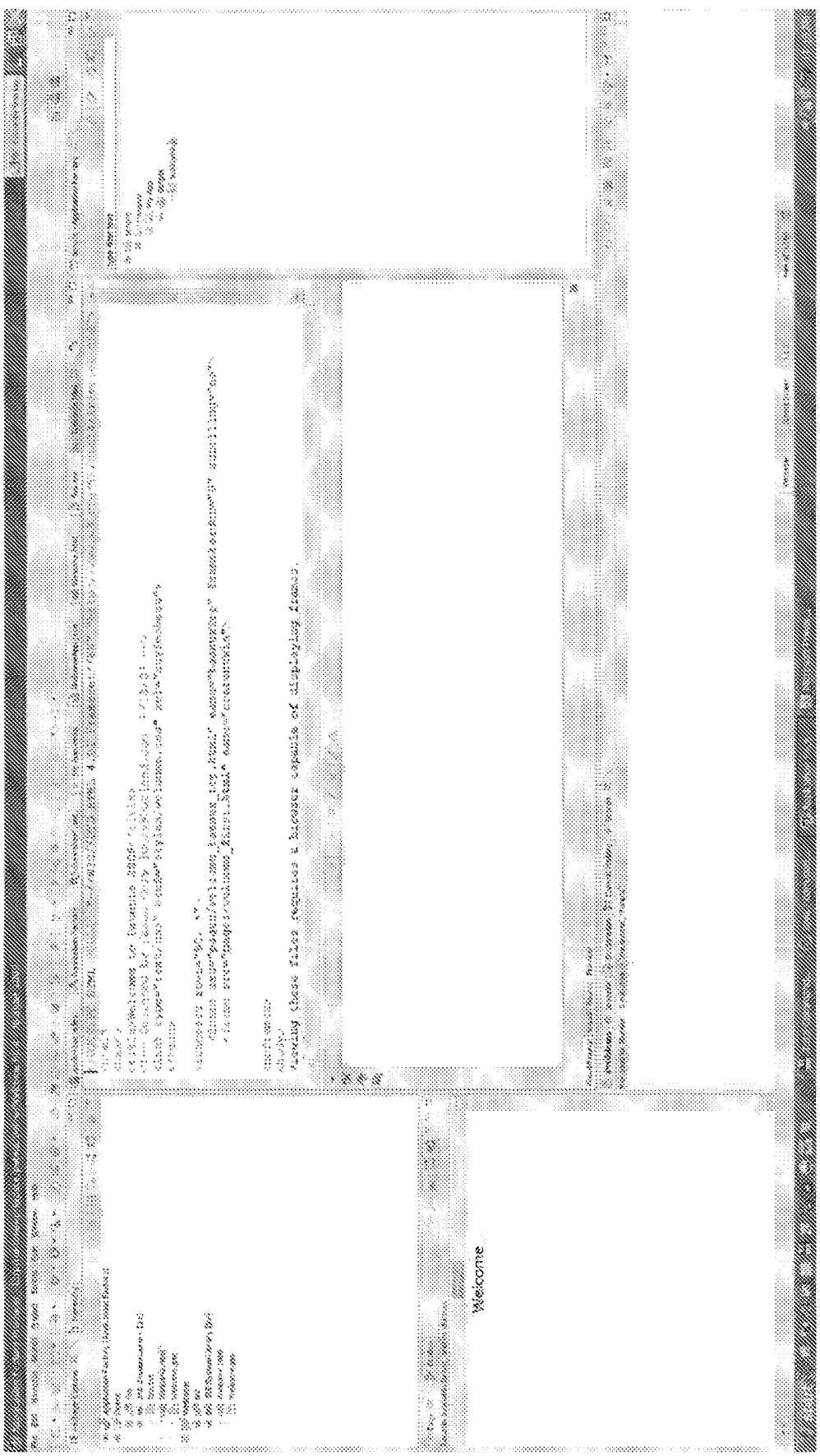
Figure 7T:
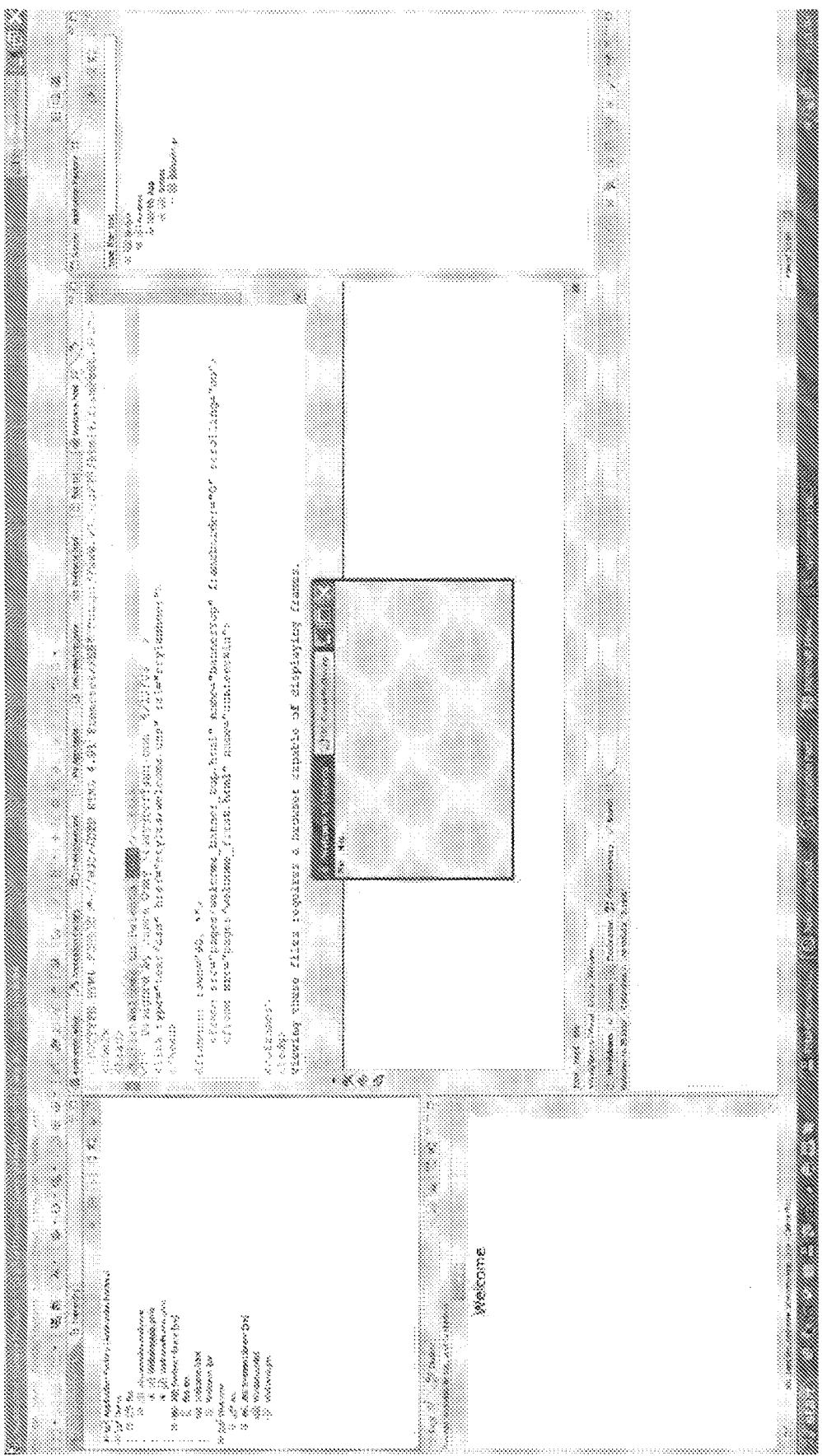

FIGS. 7A-T present a series of bitmap screenshots illustrating, from start to finish, use of Application Factories to create a reusable sample ("Welcome") application. FIG. 7A is a bitmap screen shot illustrating UI workspace 700 populated with an initial project, the "Welcome" Project 701, which is a simple sample application that displays a window. The goal is to create something that is reusable, but when it is reused it should be customizable. At this initial point, the user invokes the Application Factory project wizard 710. As shown in this example, the user selects (ticks) the "Open skeleton readme file" and "Open skeleton cheatsheet file" options. Upon the user selecting the wizard's "Finish" button the workspace 700 creates a new Application Factory, including with a skeleton readme file (FIG. 7B) and skeleton cheat sheet (FIG. 7C). Now, the user may create structure for the application by adding Tags in the Tag View 720, as shown in FIG. 7D. In this example, the user has created a Welcome tag and a Frame tag.

Now, the user wants to make the application reusable. To do this, the user instructs the workspace 700 to create a "recipe" script for the Application Factory. As shown in FIG. 7E, the user selects the menu command "Script Recipe for Application Factory." This script forms the application's "recipe," that is, containing all the necessary ingredients for re-creating the application. The workspace 700 now requests a user-provided name (FIG. 7F) for the script recipe, together with an indication of which resources or "ingredients" (FIG. 7G) from the current Welcome project are to be included in the recipe. In response to these inputs, the workspace 700 displays a list of Module Tasks as shown in FIG. 7H. The user may select the menu command "Create Script for Task," as shown in FIG. 7I, but doing so at this point will simply re-create the current application. Instead, the goal is to re-create a reusable application that is highly customizable.

To create a reusable application in accordance with the present invention, it is not sufficient just to capture and rerun the current recipe (i.e., the ingredients of what is to be re-created). Instead, users want to be able to use the development system in a manner that facilitates modification of the application as it is being re-created. In accordance with the present invention, this is achieved by introducing templates into the script recipe. This will now be demonstrated.

FIG. 7J illustrates this modification. The user invokes a Search/Replace 750 dialog to replace an existing code package, com.codegear, with a new pattern, ${myPackage}—a template parameter. FIG. 7K illustrates the completed operation. This introduces package customization in a template. FIG. 7L illustrates this repeated for placement of text strings, for example, replacing "Welcome to JBuilder" with the pattern ${myGreetings}. These sample modifications to the recipe show how the project is customized for future reuse of the application. The system modifies what it needs to change in the recipe to pick up the above customizations. With the customizations now completed for this sample application, the user instructs the workspace 700 to "Create Script for Task." In response, the workspace 700 creates a script that has the ability to re-creates the (sample) Welcome Project, and allows the user to customize the package names, the source folders, the project name, and the title of the application. FIG. 7M illustrates creation of the script. The script creation begins with the dialog shown in the figure, allowing the user to add a UI to the script. As shown, the script will guide the user through the creation of a valid (Eclipse-style) user interface for the IDE.

As shown in FIG. 7N, the "Add Code to Change Workspace Files" dialog provides an easy means to accomplish this task. Continuing with our example, the user will now add additional modifications. As shown in FIG. 7O, the workspace 700 displays a dialog 760 that allows the user to customize the project by creating a "modify code" snippet to modify an existing file, for example, the user wants to change the text string "2005" to "2008". This is an example of modifying an existing file. Similarly the user can create snippets for creating, deleting and appending to files. Completing the example, the user now tests the script, shown in FIG. 7P, to confirm that it runs in a satisfactory manner. At this point, the script shows, at FIG. 7Q, the UI which the end user will use to create/reuse this Welcome application—that is, a completely reusable and highly customizable application. Now, the Application Factory can be exported as a module. (Refer back to FIG. 6 and accompanying text for a discussion of the export process.) When the application is re-imported at a later time, a factory project is created in a new workspace and the initial script (Welcome.js) runs automatically, as it was configured to run during the export process. (For further description of the process of importing or consuming modules, refer to the prior discussion of Consumer mode and FIGS. 9A-C and accompanying text below.)

FIG. 7R illustrates the running of the Welcome.js script, whereupon the project is created with the previously illustrated customizations. The Project Explorer view, shown in FIG. 7S, illustrates that the previously illustrated customizations are picked up by the new application under development; notice a new project with the user specified project name and src folder name. Now when the user executes a test run of the application, the sample application picks up the customizations, as shown in FIG. 7T. The title string is what the user specified on import of the module. This example illustrates the process of taking an existing structure (application), introducing templates, and re-creating a customizable application for reuse.

Internal Operation

Figure 8:
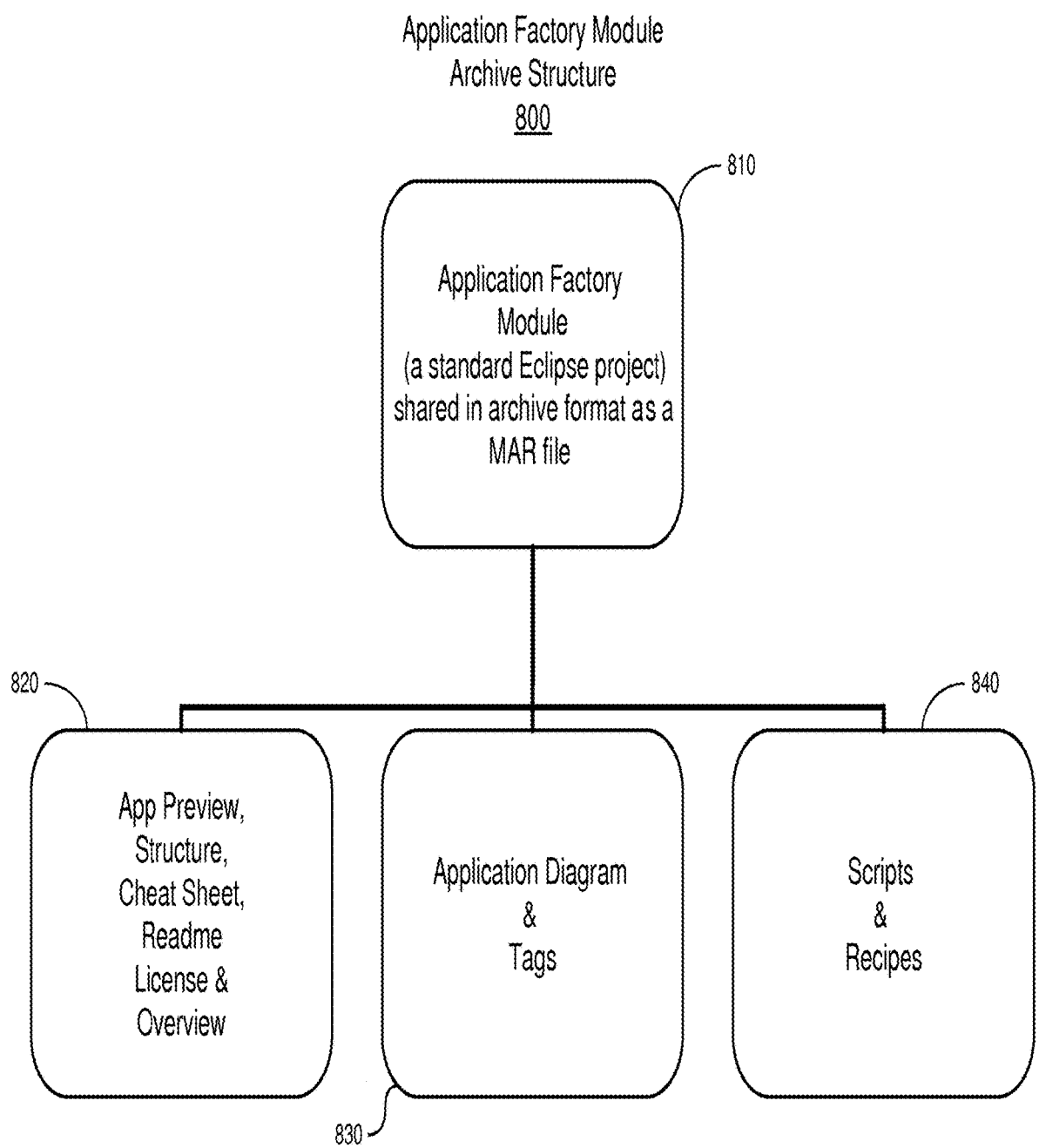
FIG. 8 is a high-level block diagram illustrating an Application Factory (Module) Archive Structure, which represents how an Application Factory module is structured in archival (persistent) storage.

FIG. 8 is a high-level block diagram illustrating an Application Factory (Module) Archive Structure 800, which represents how an Application can factory module is structured in archival (persistent) storage. The archive comprises an Application Factory module stored as a standard Eclipse project in a .MAR file 810, a Module ARchive. As shown, the module itself stores three sets of information. A first set of information, shown at 820, powers the preview portion of the application, which includes App Preview, Structure, Cheat Sheet, Readme, License, and Overview. In other words, these are items of the module that can be previewed without reference to code. The second set of information, shown at 830, is core information representing the created application. The same structures that were in preview mode in information set 820 are represented in active mode as Application Diagram and Tags in the second information set 830 (i.e., in a form supporting interaction with the user). The third set of information, shown at 840, represents behavioral aspects of the module—scripts (e.g., Welcome.js) and recipes (e.g., the recipe that created Welcome.js).

Figure 9A:
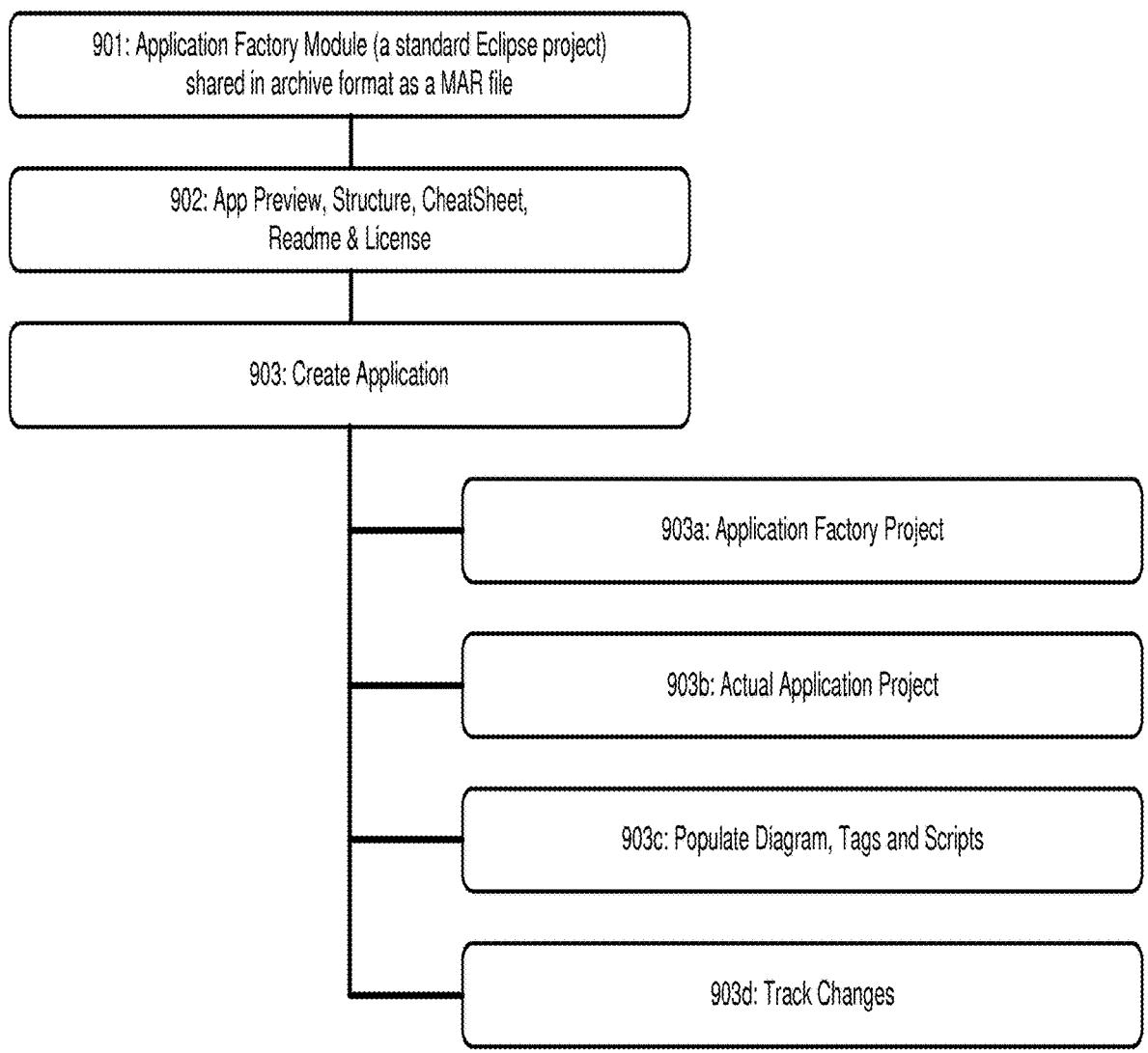
FIGS. 9A-C are high-level block diagrams illustrating the basic process of Application Factory module consumption, including illustrating use of Tags and Application Diagram resources and use of Scripts.

With an understanding of how the Application Factory module is structured, one can now examine how the module is consumed internally. FIG. 9A is a high-level block diagram illustrating Application Factory module consumption 900. Here, the user (i.e., consumer) begins by pointing his or her viewer at the Application Factory module (a MAR file) through any desired means, as indicated at 901. This loads the module archive, whereupon the user may now observe its various views, such as Application Preview, Structure, Cheat Sheets, or the like, as indicated at 902. At this point, the user is now ready to create an application (i.e., spawn a new application) from the Application Factory module. The "Create Application" process, at 903, yields the following results. First, at 903*a*, an empty Application Factory project is created in the workspace. Next (during typical use), at 903*b*, the import script runs, whereupon an actual application project is created (e.g., shopping cart application, accounting program, etc.). Upon creation of the application project, the system immediately proceeds to populate the newly created application factory project with the diagrams, tags, and scripts specified by the consumed Application Factory module archive, as indicated at 903*c*. All associated links are preserved (e.g., the Welcome tag will point to Welcome.java, Frame tag will point to Frame.java, and so forth). The scripts are similarly carried over from the archive, and are available in the Script View. Now when the user runs the scripts, changes to the application are automatically tracked (i.e., archaeology captured), as indicated at 903*d*.

Figure 9B:
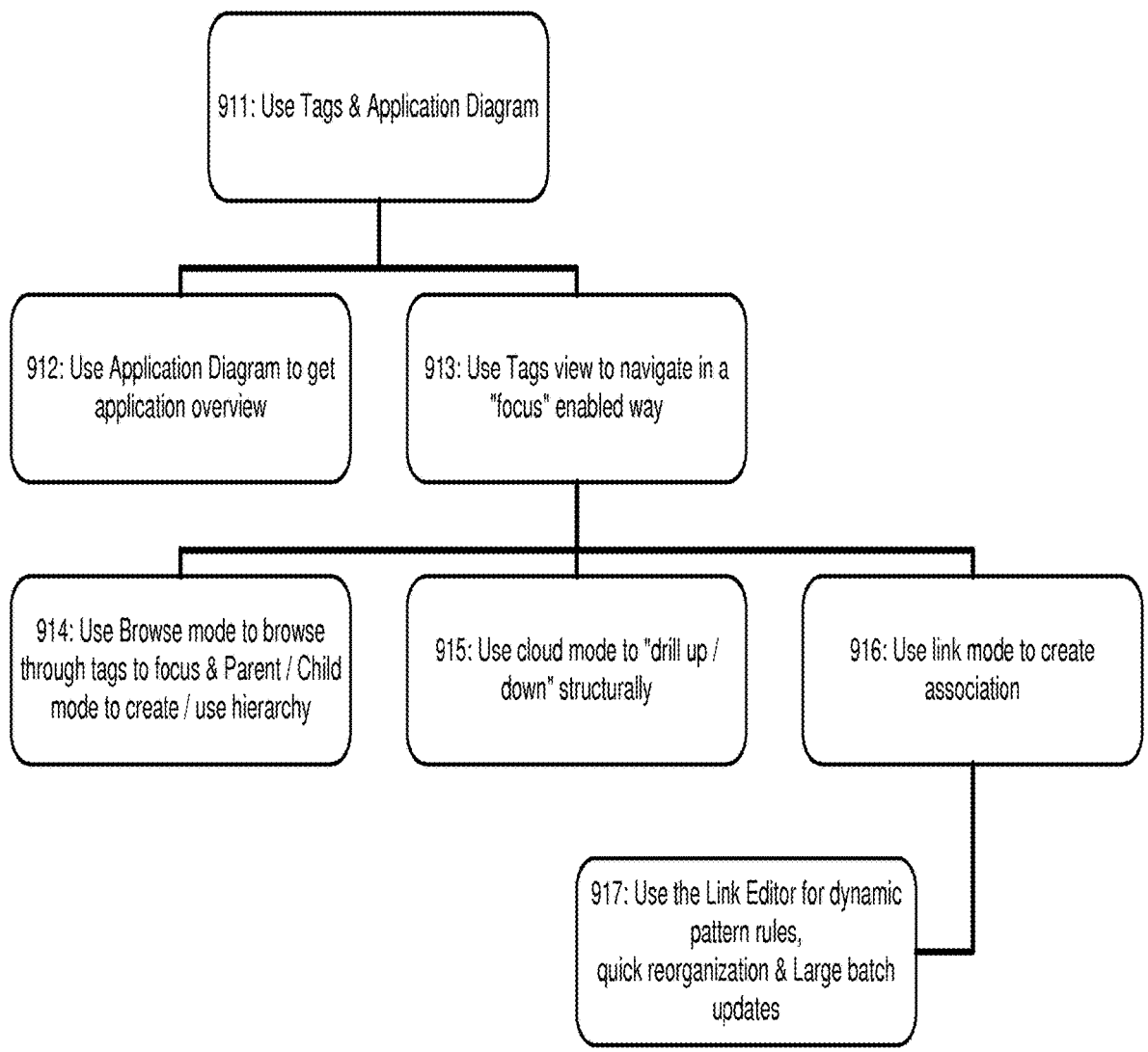

Once an application has been created, two sets of resources are available: (1) Tags and Application Diagram, and (2) Scripts and Archaeology. FIG. 9B is a block diagram illustrating use of Tags and Application Diagram resources, beginning at 911. These are used for the organization, structure, and navigation of the application. The Application Diagram, at 912, is used to provide an overview of the application. As previously described, the user developer need not navigate the project blindly using a file/folder-based approach but instead uses Tags to navigate in a focused, application-centric manner, as indicated at 913. In other words, the user navigates the project based on the organization of the module creator (which is captured by the system), thereby navigating the application in a much more application friendly way. Here, current and downstream users are able to view/navigate all of the styling features of an application together, for example, as they are related through organization and context (as specified by tagging). Specifically, the following navigation is provided. The user may employ browse mode, at 914, to browse through available tags, or use parent/child mode to create or use a hierarchy of the tags. The user may use cloud mode, at 915, to drill up or drill down through the tags representing the application's structure. Or, the user can use a link mode to create associations through tags, at 916. This latter mode is used in conjunction with a Link Editor, at 917, for creating dynamic pattern rules and quickly reorganizing tags, as well as preparing large batch updates.

Figure 9C:
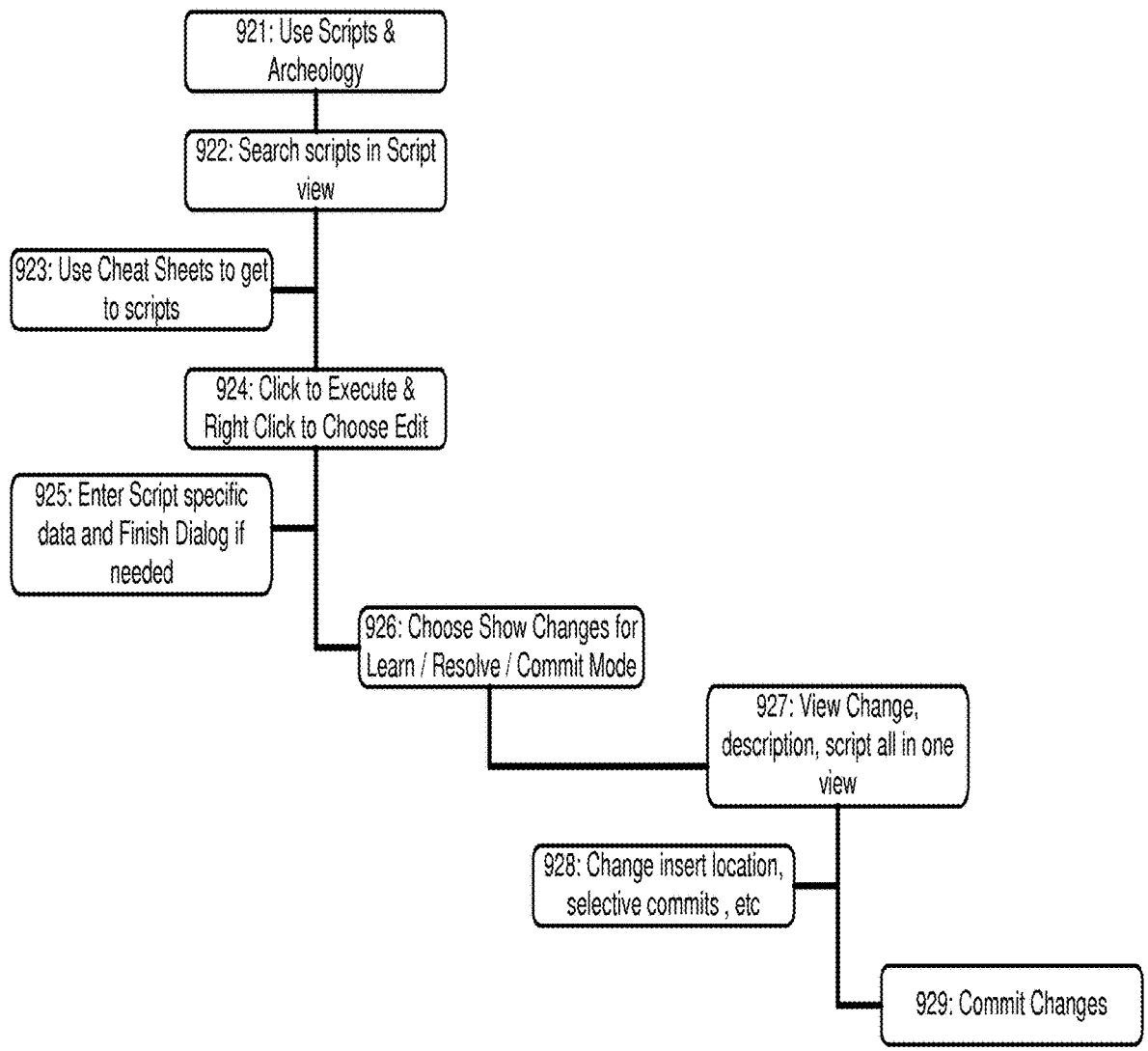

FIG. 9C is a block diagram illustrating use of Scripts. Scripts and Archaeology, at 921, comprise the scripts or instructions used to create reusable applications, as well as the means to track changes (i.e., archaeology) that result. As previously described, the system includes a Script View for searching and viewing scripts, as indicated at 922. Additionally, the user developer may use Cheat Sheets, at 923, to get at relevant scripts. Clicking a script, at 924, launches execution of that script; or, the user may right-click the script to edit it (i.e., modify the behavior of that tool). Upon execution of the script, at 925, the user (consumer) enters any specific data required by the script (e.g., application title). Once the script has completed execution, the system now enters Learn/Resolve/Commit mode, at 926, to allow the user to fine tune these changes (instead of blindly putting a lot of changed code into the workspace). At 927, the user sees the changes being made as well as the code that actually makes the changes. The user can modify either the changed code or the script that led to the code change, at 928. Once the user is happy with the final result, the changes are committed at 929. Throughout this process, all of these modifications are persisted using Archaeology (e.g., showing all changes made by a script run).

Figure 10:
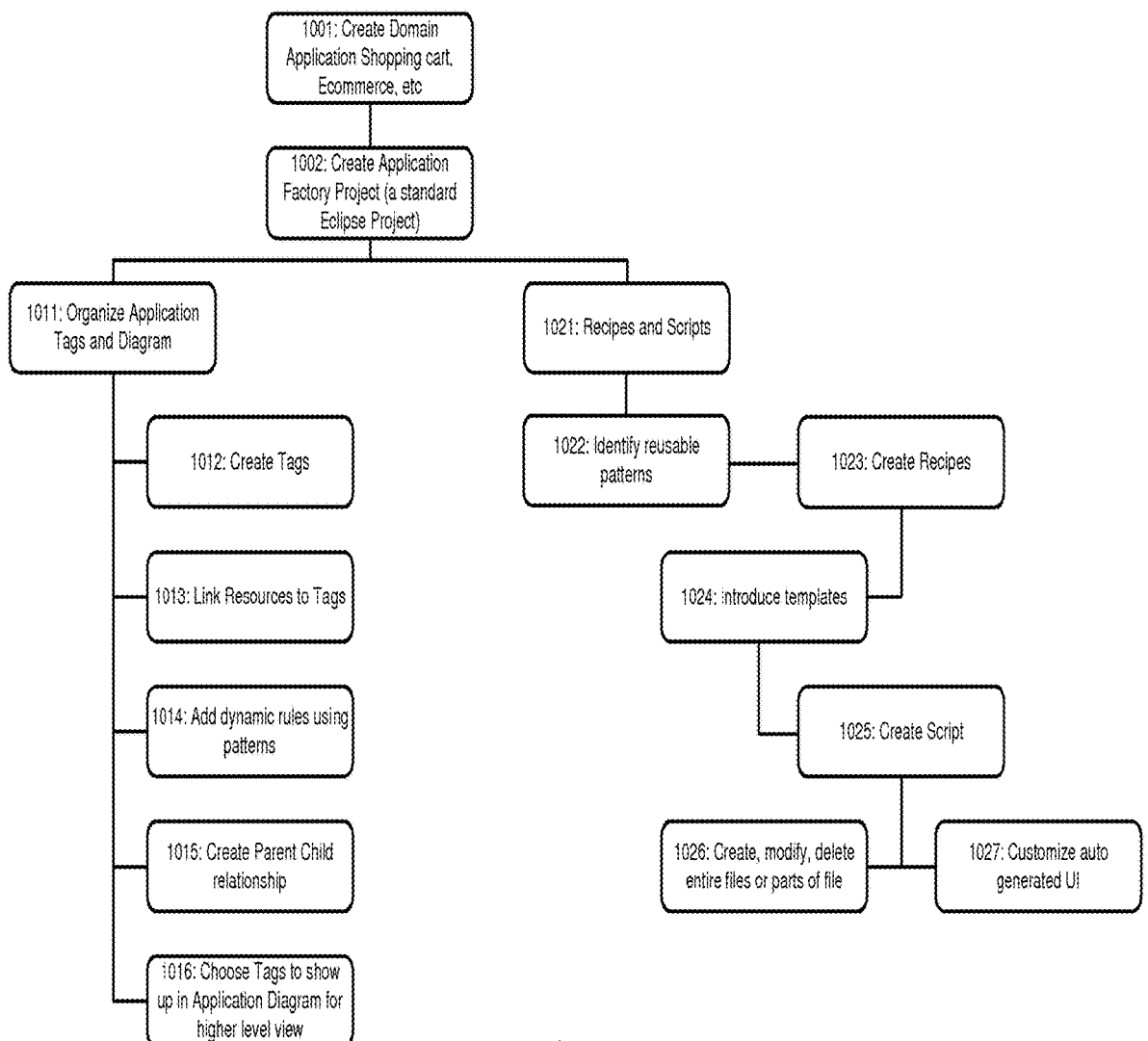
FIG. 10 is a high-level block diagram illustrating the basic process of Application Factory module production.

FIG. 10 is a high-level block diagram illustrating Application Factory module production 1000. Production of an Application Factory module of course starts with one's own application (i.e., the producer's base application, such as a shopping cart, e-commerce, accounting application, etc.), as indicated at 1001. Now, the user developer (producer) memorializes that application by creating an Application Factory project, at 1002, thus creating a reusable version that encapsulates the knowledge and experience of the developer. At this point, two sets of resources are created (which correspond to the previously mentioned ones under consumption): (1) Tags and Application Diagram, and (2) Recipes and Scripts. Blocks 1011-1016 illustrate organization of the application's Tags and Diagram, including creating Tags (1012), linking resources to Tags (1013), adding dynamic rules using patterns (1014), creating parent/child hierarchy or relationship (1015), and choosing the Tags for display in the Application Diagram (1016).

Blocks 1021-1027 illustrate use of Recipes and Scripts. The first step in creating Recipes is identifying reusable patterns in one's code base, as indicated at 1022, for example something as simple as changing a package name. A more complex example would be for instance changing a payment system from PayPal to MasterCard. Once reusable patterns are identified, the user developer (producer) proceeds to create one or more corresponding Recipes, at 1023. This includes gathering all the input required for producing a script (e.g., one that modifies a pattern within an existing file). Certain input or parameters will be fixed while others will be changing. Input subject to change is handled by creating a template, at 1024, which contains a pattern that will be substituted with the real value by the downstream user developer (Consumer). After creation of the templates, the user developer (Producer) creates a script, at 1025. Different options are available at this point. The user developer can create a script that auto generates a customized user interface, as indicated at 1027. Or, as indicated at 1026, the developer may create a script that creates, modifies, or deletes entire files or parts thereof (e.g., such as the file modification example, previously described above). Thus in this manner, the developer has created his or her program code (base application) and scripts that enhance the feature set of that code, including creating new pieces of code or adapting existing code for new functionality.

Advantages

Application Factories of the present invention provide architects with many tools that enable them to build Application Modules that are as rich as needs dictate. Basic design of an Application Module can be done through wizards. These wizards are particularly useful for applications that have clearly defined and bounded functionality, such as CRUD applications, reports, certain kinds of AJAX functionality, POJO persistence and retrieval and the like. The included scripts can be written by hand or automatically generated. Palettes that offer management of existing artifacts enable architects to mine existing Modules for features they want, so that reuse is maximized. In addition, various portions of the Modules can be made read-only or read/write depending on whether the architect wishes to allow developers to change and update the templates and the Module design.

The Application Factories approach to creating templates easily and capturing the intent and knowledge of developers who implement an application provides a new model for designing software. It creates the possibility of rapidly deployable applications that consist of configuration data, templates, and some code. Starting from this base, a developer can customize and build the application and have it ready for roll-out in a matter of hours, thereby greatly reducing the cost and overhead associated with the complexity of today's applications. The benefits of this approach are clear for developers that rely on frameworks, such as Struts or Spring, or on enterprise software such as Tomcat. The senior designers can create Application Factory artifacts as they code, and so preserve their thinking for the use by other developers. This approach enables tutoring and mentoring as well.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed:

1. A computer-implemented method for facilitating creation of a reusable application, the method comprising:

during development of the reusable application, receiving a plurality of artifacts associated with source code of the reusable application, wherein an artifact of the plurality of artifacts comprises information related to the development of the reusable application;

maintaining the plurality of artifacts as metadata for the source code of the reusable application, the metadata comprising at least one script guiding subsequent developers in use and modification of the source code for the reusable application; and generating an application module comprising the source code of the reusable application and the metadata, wherein the application module is configured for use by a developer for facilitating creation of a new version of the reusable application, wherein the metadata is attached to the source code, and wherein the metadata is accessible by the developer during the creation of the new version of the reusable application for accessing the information related to the development of the reusable application such that during the creation of the new version of the reusable application instructions that specify coding sequences that facilitate creation of the new version of the reusable application are executed based on the metadata, the application module comprising:

a first set of information comprising a preview portion of the reusable application for previewing without reference to code of the reusable application;

a second set of information comprising an active portion mode of the reusable application; and a third set of information comprising the metadata comprising the at least one script.

2. The method of claim 1, wherein the artifact comprises knowledge of an original developer of the reusable application.

3. The method of claim 1, further comprising:
creating a recipe for the reusable application, the recipe comprising a list of application resources and the at least one script guiding the developer in use and modification of the source code of the reusable application.

4. The method of claim 1, wherein the artifact comprises the at least one script.

5. The method of claim 4, wherein the at least one script comprises JavaScript maintained in a metadata project alongside the reusable application.

6. The method of claim 4, further comprising:
after executing the at least one script, presenting, to the developer, changes made by the at least one script for selectively acceptance or rejection by the developer prior to committing the changes to the source code of the reusable application.

7. The method of claim 1, wherein the application module is generated at an application factory in an integrated development environment.

8. The method of claim 1, further comprising:
consuming the application module at an integrated development environment accessible by the developer.

9. The method of claim 8, further comprising:
providing application-centric navigation of the application module based on the metadata; and
facilitating filling in input data into a template and executing the at least one script to create the new version of the reusable application based on a recipe.

10. The method of claim 1, wherein the metadata is tag-based and further comprises a description of the reusable application.

11. The method of claim 10, wherein the description of the reusable application comprises a plurality of tag-based descriptions of the reusable application.

12. The method of claim 11, wherein the plurality of tag-based descriptions comprises a plurality of descriptive tags presenting a hierarchical view of the reusable application.

13. The method of claim 12, wherein the plurality of descriptive tags comprises links facilitating application-centric navigation of various portions of the reusable application.

14. The method of claim 1, wherein the metadata further comprises a plurality of templates facilitating pattern-based replacement of portions of the reusable application subject to change upon creation of the new version of the reusable application.

15. A non-transitory computer readable storage medium having computer readable program code stored thereon for causing a computer system to perform a method for facilitating creation of a reusable application, the method comprising:
during development of the reusable application, receiving a plurality of artifacts associated with source code of the reusable application, wherein an artifact of the plurality of artifacts comprises information related to the development of the reusable application;
maintaining the plurality of artifacts as metadata for the source code of the reusable application, the metadata comprising at least one script guiding subsequent developers in use and modification of the source code for the reusable application; and
generating an application module comprising the source code of the reusable application and the metadata, wherein the application module is configured for use by a developer for facilitating creation of a new version of the reusable application, wherein the metadata is attached to the source code, and wherein the metadata is accessible by the developer during the creation of the new version of the reusable application for accessing the information related to the development of the reusable application such that during the creation of the new version of the reusable application instructions that specify coding sequences that facilitate creation of the new version of the reusable application are executed based on the metadata, the application module comprising:
a first set of information comprising a preview portion of the reusable application for previewing without reference to code of the reusable application;
a second set of information comprising an active portion mode of the reusable application; and
a third set of information comprising the metadata comprising the at least one script.

16. The non-transitory computer readable storage medium of claim 15, wherein the artifact comprises knowledge of an original developer of the reusable application.

17. The non-transitory computer readable storage medium of claim 15, the method further comprising:
creating a recipe for the reusable application, the recipe comprising a list of application resources and the at least one script guiding the developer in use and modification of the source code of the reusable application.

18. The non-transitory computer readable storage medium of claim 16, wherein the artifact comprises the at least one script.

19. A computer system comprising:
a data storage unit; and
a processor coupled with the data storage unit, the processor configured to:
during development of a reusable application, receive a plurality of artifacts associated with source code of the reusable application, wherein an artifact of the plurality of artifacts comprises information related to the development of the reusable application;
maintain the plurality of artifacts as metadata for the source code of the reusable application, the metadata comprising at least one script guiding subsequent developers in use and modification of the source code for the reusable application; and
generate an application module comprising the source code of the reusable application and the metadata, wherein the application module is configured for use by a developer for facilitating creation of a new version of the reusable application, wherein the metadata is attached to the source code, and wherein the metadata is accessible by the developer during the creation of the new version of the reusable application for accessing the information related to the development of the reusable application such that during the creation of the new version of the reusable application instructions that specify coding sequences that facilitate creation of the new version of the reusable application are executed based on the metadata, the application module comprising:

a first set of information comprising a preview portion of the reusable application for previewing without reference to code of the reusable application;
a second set of information comprising an active portion mode of the reusable application; and
a third set of information comprising the metadata comprising the at least one script.

\* \* \* \* \*